US005099269A

United States Patent [19]

Johdai et al.

[11] Patent Number: 5,099,269

[45] Date of Patent: Mar. 24, 1992

[54] COPYING APPARATUS PROVIDED WITH A ROLL-UP TYPE SHEET REFEEDING UNIT

[75] Inventors: Akiyoshi Johdai; Keichi Kinoshita, both of Osaka, Japan

[73] Assignee: Minolta Camera Kabushiki Kaisha, Osaka, Japan

[21] Appl. No.: 479,393

[22] Filed: Feb. 13, 1990

[30] Foreign Application Priority Data

| | | | |
|---|---|---|---|
| Feb. 14, 1989 | [JP] | Japan | 1-35945 |
| Feb. 14, 1989 | [JP] | Japan | 1-35946 |
| Feb. 14, 1989 | [JP] | Japan | 1-35947 |
| Feb. 14, 1989 | [JP] | Japan | 1-35948 |
| Feb. 14, 1989 | [JP] | Japan | 1-35949 |
| Feb. 14, 1989 | [JP] | Japan | 1-35950 |
| Feb. 14, 1989 | [JP] | Japan | 1-35951 |
| Feb. 14, 1989 | [JP] | Japan | 1-35952 |
| Feb. 14, 1989 | [JP] | Japan | 1-35953 |
| Feb. 23, 1989 | [JP] | Japan | 1-44538 |

[51] Int. Cl.[5] .......... G03B 27/52

[52] U.S. Cl. .......... 355/24; 355/26; 355/318; 271/186

[58] Field of Search .......... 355/24, 26, 318, 319, 355/321, 322, 323, 324, 325; 271/3, 186, 65, 185, 225

[56] References Cited

U.S. PATENT DOCUMENTS

| | | | |
|---|---|---|---|
| 3,862,802 | 1/1975 | Till | 355/23 |
| 4,496,142 | 1/1985 | Iwasaki | 271/3 |

FOREIGN PATENT DOCUMENTS 61-101333 5/1986 Japan .

OTHER PUBLICATIONS

Xerox Disclosure Journal, vol. 8, No. 3, May/Jun., 1983, p. 253.

*Primary Examiner*—L. T. Hix
*Assistant Examiner*—D. Rutledge
*Attorney, Agent, or Firm*—Willian Brinks Olds Hofer Gilson & Lione

[57] ABSTRACT

A sheet refeeding apparatus which comprises a belt laid between a first and a second shafts, wherein as the belt is wound around the first shaft, copy sheets ejected from a copying machine are wound around the first shaft together with the belt, and as the belt is wound around the second shaft, the sheets wound around the first shaft are fed out thereof back to the copying machine. In collecting sheets, the first shaft is rotated in the same direction as that of the rotation of a photosensitive drum, and a sheet turn-over section is disposed upstream of the belt with respect to sheet conveying direction. Marks are provided for the belt to recognize the position of the belt. An initial position mark is given to the belt, and the mark functions as a standard for a return of the belt to the initial position on a supply of power for the apparatus or on the completion of a sheet refeeding operation. Further, when a sheet is detected being fed out of the belt during the return of the belt to the initial position, it is judged that a paper jam has occurred, and the returning operation is discontinued. The sheet refeeding apparatus comprises an ejection path through which sheets are ejected directly outside of the apparatus, an ejection path cover which is capable of opening and closed, and a switch for requesting coercive ejection of sheets. The switch is operative from the outside only when the cover is in an open state, and when the switch is operated, sheets are ejected onto the cover. Furthermore, the drive of the belt is controlled, when collecting sheets, to reduce the intervals among the sheets, when feeding the sheets out of the collecting section back to the copying machine, to gain the intervals among the sheets and when ejecting the sheets outside of the apparatus, to keep the intervals among the sheets as they were collected. The coercive ejection is allowed only when a sheet which is unnecessary for the sheet refeeding is included.

23 Claims, 41 Drawing Sheets

COPYING APPARATUS PROVIDED WITH A ROLL-UP TYPE SHEET REFEEDING UNIT

BACKGROUND OF THE INVENTION

1. Field of the Invention

The present invention relates to an image forming apparatus provided with a sheet refeeding unit, wherein copy sheets ejected from an image forming section are collected to be fed back to the image forming section for duplex or composite copying.

2. Description of prior Art

A conventional sheet refeeding apparatus is so constructed that copy sheets which obtained an image are collected on a horizontally or vertically disposed tray in the stack condition, and thereafter the sheets are fed out thereof one after another by a roller such as a rubber roller. However, copy sheets are apt to curl because of the heat of a fixing device in a copying machine, and accordingly it is difficult to guide and place such copy sheets onto the tray. Also, the conditions of copy sheets and the rubber roller are changeable depending on temperature and humidity, so that it is difficult to feed collected copy sheets exactly one by one in any condition. Therefore, there have been a fear of occurring such a trouble as a paper jam and double feeding in such a sheet refeeding apparatus.

Under the circumstances, a roll-up type sheet refeeding apparatus which comprises a belt supported on one roll or two rolls, which is driven to wind copy sheets ejected from a copying machine on the roll so that the copy sheets may be stored between the layers of the wound belt and driven to unwind from the roll so that the copy sheets are fed out, was proposed in U.S. Pat. No. 3,862,802 (corresponding to Japanese Patent Publication No. 57-42861), Japanese Patent Laid-Open publication No. 58-188260 and Japanese Patent Laid-Open Publication No. 59-39561 (corresponding to U.S. Pat. No. 4,496,142). In this type of apparatus, the collecting and refeeding of copy sheets are surely performed. However, here is a problem that copy sheets fall into a habit of bending because of the wind on the roll together with the belt. If the direction of the bending habit is the same as that of the curvature of a photosensitive drum, a copy sheet fed back to an image transfer section from the refeeding apparatus will be hard to separate from the surface of the photosensitive drum, and therefore a paper jam may occur at the transfer section frequently.

Incidentally, sheet refeed is generally required for an operation in a duplex copying mode wherein a copy sheet is subjected to copying operations to obtain images on its both sides and an operation in a composite copying mode wherein a copy sheet is subjected to copying operations to obtain images on its one side. When a roll-up type sheet refeeding apparatus as described above is attached to a copying machine which is operative both in the duplex copying mode and in the composite copying mode, the direction of the bending habit of copy sheets will be the same as that of the curvature of the photosensitive drum in either the duplex or composite copying mode, since the direction of winding copy sheets is fixed in the both modes, and therefore the occurrence of a paper jam becomes a problem.

Also, there are other problems with regard to this type of sheet refeeding apparatus. One of the problems is how to take timing of returning the belt to the initial position where a sheet collecting operation is available. A return of the belt to the initial position in advance of a sheet collecting operation is necessary to make good use of the belt. However, it takes some time to return the belt, and if the timing of returning the belt is not taken properly, an operator may have to be wait unreasonably.

Further, another problem is how to detect collected copy sheets. For instance, even if the belt is made of transparent material so that sheets received on the belt can be detected by a sensor, the detection will be difficult since the diameter of the roll of the belt fluctuates heavily. Even if mechanical means of detecting sheets is used, the structure will be complicated for the same reason. Furthermore, it will also be a problem how to comply with such troubles as an operator misoperates the apparatus to collect sheets although the sheets are not supposed to be collected, and a sheet remains in the apparatus on starting a copying operation. Such troubles are made in the following cases.

(1) The previous operator forgot to take sheets out of the sheet refeeding apparatus.

(2) The operator selected the duplex or the composite copying mode by mistake and a copying operation of a first image has been performed in the misselected mode.

(3) A supply of power for the apparatus is discontinued during a sheet collecting operation. It is substantially impossible to take sheets out of the belt by hand in such a case.

SUMMARY OF THE INVENTION

It is, therefore, an object of the present invention to provide a roll-up type sheet refeeding apparatus wherein copy sheets to be fed back to an image carrying member in an image forming apparatus is so collected in a winding belt that the copy sheets will separate from the image carrying member easily after they are fed back thereto and obtain another image, thereby preventing the occurrence of a paper jam.

Another object of the present invention is to provide a roll-type sheet refeeding apparatus wherein the position of the belt is exactly recognized mainly in order to stop rewind of the belt at a specified position accurately for a return of the belt to the initial position.

Another object of the present invention is to provide a roll-up type sheet refeeding apparatus wherein a return of the belt to the initial position is performed during an usual wait, that is, during preparation for a copying operation so that an operator will not have to wait unnecessarily.

Also, another object of the present invention is to provide a roll-up type sheet refeeding apparatus wherein it is judged in an exact and easy way whether all the sheets have been fed out of a belt, even without detecting the sheets directly, in order to take timing of stopping the refeeding operation.

Further, another object of the present invention is to provide a roll-up type sheet refeeding apparatus wherein sheets remained in the belt because of a misselection of an operation mode or forgetting to operate the apparatus to perform a sheet refeeding operation are able to be ejected outside easily and quickly.

Furthermore, another object of the present invention is to provide a roll-up type sheet refeeding apparatus wherein sheets remained in the belt are checked whether to be ejected coercively or not, and only when the remained sheets are judged to be ejected, coercive ejection is available.

In order to attain the objects above, an image forming apparatus according to the present invention has a belt in a sheet collecting means, whose winding direction for collecting sheets is the same as that of the rotation of an image carrying member in an image forming apparatus. Copy sheets rolled in the belt falls into a bending habit, and the sheets fed out thereof back to an image transferring section. In the image transferring section, each of the sheets comes into contact with the image carrying member with its bulged side facing the surface of the image carrying member. Therefore, the sheet separates from the image carrying member easily after the transferring operation.

A sheet refeeding operation is necessary for duplex copying wherein a sheet obtains images on its both sides and composite copying wherein a sheet obtains images on its one side. Accordingly, in either the duplex or the composite copying mode, copy sheets need to be turned over. In the present invention, sheet turn-over means which is operated selectively to or not to turn over sheets is disposed in a copy sheet path connecting the transferring section to the sheet collecting section. Thereby, each copy sheet is collected in the roll of the belt with its printed side inward in a case of composite copying. In other words, each sheet is collected in the roll of the belt with its side to obtain an image upon when it is fed back to the transferring section outward. Therefore, in both cases, the direction of the bending habit into which sheets fell in the roll of the belt is opposite the curvature of the image carrying member when they are fed back to the transferring section. Accordingly, the sheets separate from the image carrying member easily.

A sheet refeeding apparatus according to the present invention comprises a plurality of marks provided for the belt for recognizing the position of the belt; means for detecting the marks on the belt; means for measuring travel of the belt; and means for judging the position of the belt by comparing a signal from the belt mark detecting means with a signal from the belt travel measuring means. A timer, a pulse counter which counts pulses accompanying travel of the belt or the like is used as the belt travel measuring means. Preferably, at least two belt marks which have different patterns may be given to the belt in accordance with a stop position. The position of the belt may be judged in various ways. It is an example that the position of the belt is judged by comparing detection timing of one of the belt marks and detection timing of the other belt mark with travel of the belt.

With this arrangement, the position of the belt is detected, which enables the belt to stop at a specified position accurately and enables effective use of the belt.

Especially, it is preferable that the judgment of the position of the belt is used for stopping the belt at the initial position in rewind of the belt which is performed prior to a sheet collecting operation. A return of the belt to the initial position is performed on a supply of power for the sheet refeeding apparatus or on the completion of a sheet refeeding operation. After a supply of power for the apparatus started, it takes the apparatus some time to arrange copying conditions (copy waiting time). Also, after a sheet refeeding operation was completed, the apparatus performs a copying operation of a second image. Accordingly, if the belt is returned to the initial position during the time, it is not necessary to arrange special time for a return of the belt, and the effectiveness of the apparatus is improved.

A sheet refeeding apparatus according to the present invention further comprises an initial position mark provided for the belt; and means for judging that a paper jam has occurred when a sheet is detected being fed out of the sheet collecting means during rewind of the belt. On a supply of power for the sheet refeeding apparatus, the belt is rewound until the belt mark detecting means detects the initial position mark on the belt. In ordinary cases, no sheets are fed out of the belt during rewind of the belt. However, if the sheet detecting means detects any sheet being fed out of the sheet collecting means at that time, the sheet can be judged to be the remains of the previous operation. Accordingly, it is judged from a signal generated from the sheet detecting means that a paper jam has occurred. As soon as a paper jam is detected in this way, the rewinding motion of the belt is stopped, and the occurrence of a paper jam is indicated. The sheet may be removed from the sheet refeeding apparatus by the operator, or may be transported to the image forming apparatus once and ejected therefrom without being subjected to a copying operation.

With the arrangement above, the existence of any remained sheet in the sheet collecting means is certainly checked on a supply of power for the apparatus, and an operator can be informed of the existence of the remained sheet in an early stage. Accordingly, troubles such as loss of the sheet collecting means in storing capacity and the existence of unrelated sheets are preventable. Further, it is judged from the detection of the initial position mark on the belt that all the sheets have been fed out of the sheet collecting means as well as that the belt has been returned to the initial position, and accordingly the finish cf rewind of the belt can be performed at good timing.

A sheet refeeding apparatus according to the present invention further comprises a sheet ejection section for ejecting copy sheets being fed out of the sheet collecting means from the sheet refeeding apparatus directly outside; and diverting means for guiding copy sheets being fed out of the sheet collecting means selectively to the sheet ejection section or to the image forming apparatus. The diverting means includes a cover member for a copy sheet path along which copy sheets are fed out of the sheet collecting means, which is capable of opening and closed, and when the cover member is put in an open state to disclose the copy sheet path, copy sheets fed out of the sheet collecting means are guided to the sheet ejection section. With this arrangement, remained sheets are ejected from the sheet refeeding apparatus easily, directly and rapidly without going through the image forming apparatus.

A sheet refeeding apparatus according to the present invention further comprises means for detecting the cover member be in a closed state; means for requesting ejection of copy sheets from the sheet collecting means directly outside of the sheet refeeding apparatus; and means for controlling the drive means to feed copy sheets out of the sheet collecting means when the ejection request means is operated, and not to feed copy sheets out of the sheet collecting means when the cover member is detected be in a closed state by the detecting means even if the ejection request means is operated. Also, a sheet refeeding apparatus according to the present invention comprises a first control means for operating the sheet refeeding apparatus either in a refeeding mode wherein copy sheets are collected in the sheet collecting means and thereafter fed therefrom back to the image forming apparatus or in an ejection mode wherein copy sheets collected in the sheet collecting means are ejected therefrom outside of the sheet refeeding apparatus through an open place of the cover member without being fed to the image forming apparatus; and second control means for permitting a selection of the ejection mode and inhibiting a selection of the refeeding mode when the cover member is in an open state.

The cover member is preferably so made that it also functions as a guide member of copy sheets during a sheet collecting operation and a sheet refeeding operation, and when the guide member is put in an open state, the sheet ejection section is activated. That is, when the cover member is put in an open state, a selection of the refeeding mode is inhibited, while a selection of the ejection mode is permitted. Sheet ejection is put into execution by the operation of a switch or the like. When execution of the sheet ejection is ordered, copy sheets are fed out of the belt and ejected outside of the sheet refeeding apparatus without going through the image forming apparatus. Since a selection of the refeeding mode is inhibited when the cover member is in an open state, the occurrence of a paper jam due to misoperation is preventable. Further, it is preferable that the cover member also functions as a tray during an ejecting operation of copy sheets. However, it may only have the function of covering and uncovering the copy sheet path.

A sheet refeeding apparatus according to the present invention comprises means for controlling the drive of the belt, when collecting copy sheets, to reduce the intervals among the copy sheets, when feeding copy sheets out of the sheet collecting means in the refeeding mode, to gain the intervals among the copy sheets to a specified value, and when feeding copy sheets out of the sheet collecting means in the coercive ejection mode, to keep the intervals among the copy sheets as they were collected. Copy sheets are collected in the sheet collecting means with the intervals among them reduced so that the storing capacity of the sheet collecting means will increase. When the copy sheets are fed out thereof, the intervals should be gained to the original intervals. When copy sheets used in the previous operation remain in the sheet collecting means, and coercive ejection is executed, the copy sheets are ejected outside of the apparatus, keeping the reduced intervals for the purpose of saving time. Thereby, the remained sheets are ejected from the apparatus rapidly. With regard to ways of ejecting copy sheets in the coercive ejection mode, there may be a way of opening the cover member so that the copy sheets can go out through the open place and a way of transporting the copy sheets to the image forming apparatus once so that the sheets can be ejected outside through the sheet path in the image forming apparatus.

Further, a sheet refeeding apparatus according to the present invention comprises means for ejecting copy sheets collected in the sheet collecting means therefrom without subjecting the copy sheets to an image forming operation any more; means for checking the existence of copy sheets in the sheet collecting means; and control means for inhibiting the operation of the ejection means when there are no copy sheets in the sheet collecting means. In the apparatus, the sheet existence checking means includes a sensor for detecting any sheet existing in the sheet collecting means on a supply of power for the sheet refeeding apparatus; a device for generating a paper jam signal when the sensor detects a sheet existing in the sheet collecting means; and a device for generating a sheet existence signal when a predetermined number of copy sheets have been collected in the sheet collecting means during an operation in a mode wherein copy sheets are collected in the sheet collecting means and thereafter fed therefrom to the image forming apparatus or when the mode is canceled before the predetermined number of copy sheets are collected therein, and for extinguishing the sheet existence signal when all the copy sheets have been fed out of the sheet collecting means. Also, in the sheet refeeding apparatus, the control means permits the operation of the ejection means when either the paper jam signal or the sheet existence signal is generated.

When the paper jam signal is generated, it is judged that copy sheets used in the previous operation are remained in the sheet collecting means on a supply of power for the apparatus. When the sheet existence signal is generated, it is judged that a copying operation of a second image to copy sheets fed from the sheet collecting means is now being performed. If the copying operation is discontinued in the middle, the sheet existence signal is kept on generating. Accordingly, when either the paper jam signal or the sheet existence signal is generated, copy sheets which are in the sheet collecting means at that time are unnecessary for the next copying operation. Therefore, in the present invention, only when such unnecessary sheets exist in the sheet collecting means, the sheets can be ejected outside without being subjected to a further copying operation.

With the arrangement above, only unnecessary sheets which are the remains of the previous operation are ejected outside coercively, and unnecessary rewind of the belt is never performed. Further, it is preferable that execution of the coercive sheet ejection is under an operator's will and that the coercive sheet ejection is put into execution when the operator operates the sheet ejection request means such as a switch. With regard to ways of ejecting copy sheets coercively, there may be a way of opening the cover member for the refeeding apparatus so that the copy sheets can go out through the open place and a way of transporting the copy sheets to the image forming apparatus once so that the copy sheets can be ejected through the sheet path in the image forming apparatus.

BRIEF DESCRIPTION OF THE DRAWINGS

These and other objects and features of the present invention will be apparent from the following description taken in conjunction with the preferred embodiments thereof with reference to the accompanying drawings.

DETAILED DESCRIPTION OF THE PREFERRED EMBODIMENTS

Preferred embodiments of sheet refeeding apparatuses according to the present invention are hereinafter described in reference to the accompanying drawings.

Figure 1:
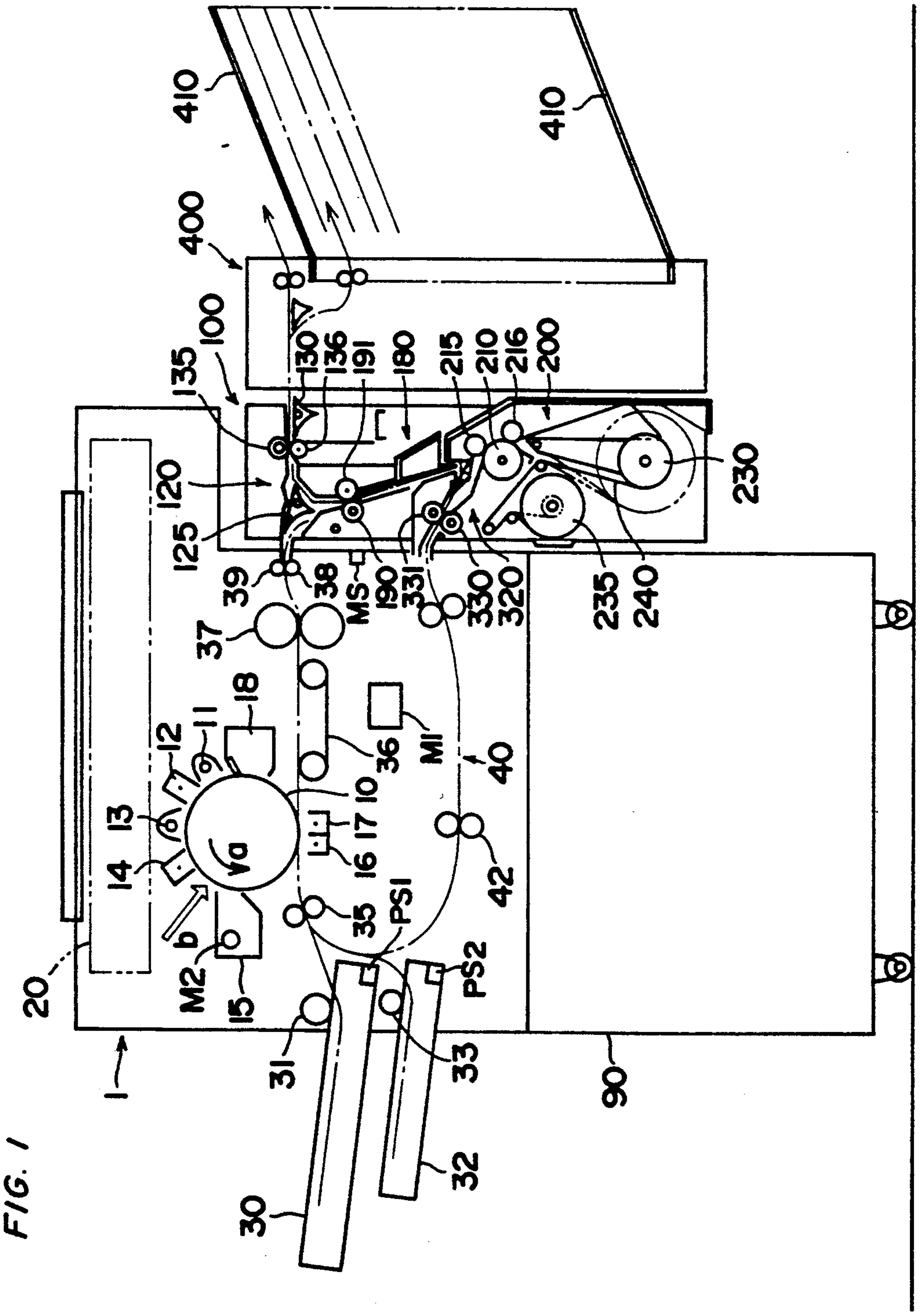
FIG. 1 is a schematic view of a copying machine provided with a sheet refeeding unit according to the present invention.

As shown in FIG. 1, a sheet refeeding unit 100 which is an embodiment of the present invention is attached to a copying machine 1, fastened to the right part which comprises an ejection section and a receiving section where sheets fed back from the refeeding unit 100 are received, and the refeeding unit 100 is removable from the copying machine 1. Further, a sorter 400 is attached to the refeeding unit 100 at the right side, and the sorter 400 is removable from the refeeding unit 100.

Constitution and Operation of the Copying Machine

The copying machine 1 has a well-known copying function, and it is mounted on a desk 90. Approximately in the center of the copying machine 1, a photosensitive drum 10, which is driven to rotate in the direction of the arrow (a), is disposed Around the photosensitive drum 10, a main eraser lamp 11, a sub-electric charger 12, a sub-eraser lamp 13, a main electric charger 14, a developing device 15 based on a magnetic brush method, a transfer charger 16, a separation charger 17 and a cleaning device 18 are arranged. The photosensitive drum 10 is electrified and sensitized while passing the eraser lamps 11 and 13 and the electric chargers 12 and 14. Then, the photosensitive drum 10 is exposed to light of an optical scan system 20 coming from the direction of the arrow (b), so that an electrostatic latent image is formed thereon.

Copy sheets are stored in feed cassettes 30 and 32 which are put upon the other. In this embodiment, A4-sized sheets are stored in the upper cassette 30, and B5-sized sheets are stored in the lower cassette 32. Each of the cassettes 30 and 32 has a magnet or a projection, and the magnets or the projections are detected by sensors PS1 and PS2, which are provided for the copying machine 1, respectively. The cassettes 30 and 32 are distinguished based on the decoding of the magnets or the projections, and thus the respective sizes of copy sheets stored in the cassettes 30 and 32 are judged. Simultaneously, the sensors PS1 and PS2 detect the existence of sheets in the cassettes 30 and 32 respectively.

Copy sheets in the upper cassette 30 and copy sheets in the lower cassette 32 are fed out thereof into the copying machine 1 one after another by a feed roller 31 and a feed roller 33 respectively. Then, a fed sheet is guided to a timing roller 35 by a guide member not shown in the drawings, and here the sheet comes to a standstill once. The sheet is fed to a transfer section in synchronization with the formation of an image on the photosensitive drum 10. Next, a toner image is transferred onto the sheet by the discharge from the transfer charger 16, and the sheet is removed from the surface of the photosensitive drum 10 by the AC discharge of the separation charger 17. Thereafter, the sheet is supplied to a fixing device 37 through a conveyer belt 36. After the fixation of the image on the sheet, the sheet is transported to the refeeding unit 100 through ejection rollers 38 and 39. Further, after the transference of the image, the photosensitive drum 10 is subjected to the operations of the cleaning device 18 and the eraser lamp so that the residual toner and charge can be removed and erased therefrom. Thus, the photosensitive drum 10 gets ready for the next copying operation.

In the lower part of the copying machine 1, a sheet refeeding path 40 comprising transport rollers 41 and 42, etc., which leads to the timing roller 35 from the refeeding unit 100, is installed. Each copy sheet is fed into the refeeding path 40 from the refeeding unit 100, with the printed side up in a case of the duplex copying and with the printed side down in a case of the composite copying. The sheet is transported to the timing roller 35 and supplied to the transfer section again.

Incidentally, a main motor M1 drives the feed rollers 31 and 33, the timing roller 35, the conveyer belt 36, the fixing device 37, the ejection rollers 38 and 39, the transport system in the refeeding path 40 and the transport system in the refeeding unit 100. A developing motor M2 drives the above-mentioned image forming elements including the photosensitive drum 10 and the developing device 15.

Constitution and Operation of the Sheet Refeeding Unit

Figure 2:
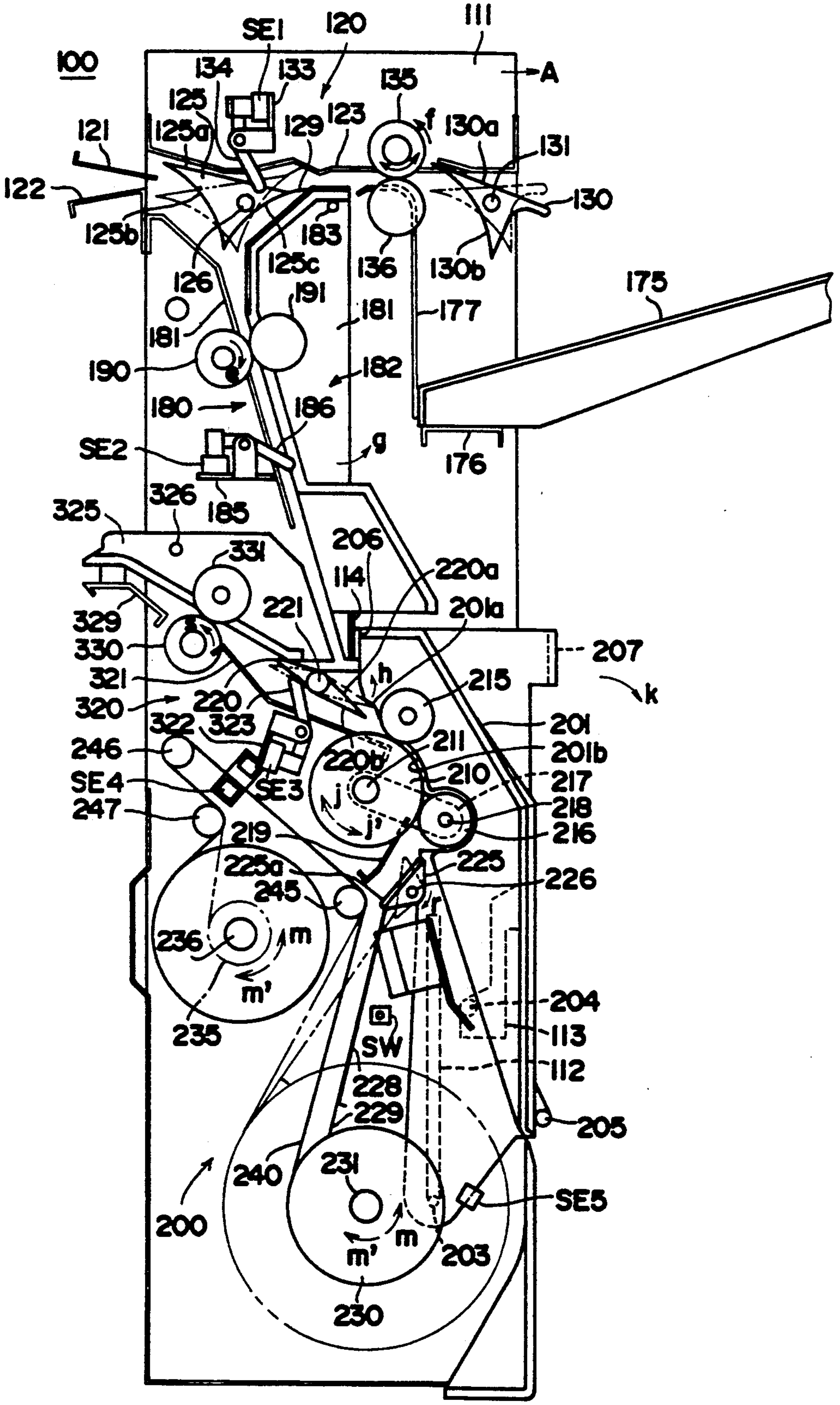
FIG. 2 is an internal constitution view of the sheet refeeding unit.

As shown in FIG. 2, the refeeding unit 100 comprises a sheet diverting section 120 for receiving sheets from the copying machine 1 and diverting the travel of the sheets depending on copying mode, a roll-up type sheet collecting section 200 for collecting copy sheets each of which gained an image on one side for the duplex/composite copying, an intermediate transport section 180 for transporting copy sheets into the sheet collecting section 200, and a refeeding section 320 for feeding copy sheets one by one out of the sheet collecting section 200 to the refeeding path 40. It is judged from an on/off signal transmitted from a microswitch MS whether or not the sheet refeeding unit 100 is attached to the copying machine 1.

Further, either a copy tray 175 or the sorter 400 is selectively attached to the sheet refeeding unit 100. FIG. 2 shows a state that the copy tray 175 is attached thereto, and FIG. 1 shows a state that the sorter 400 is attached thereto. The sorter 400, which has a conventional constitution and function, comprises a plurality of bins 410 arranged one upon another among which copies are distributed. In using the sorter 400, the uppermost bin 410 also functions as a copy tray in a case of non-sorting operation.

Sheet Diverting Section

The sheet diverting section 120 comprises guide plates 121, 122 and 123, diverting members 125 and 130, ejection rollers 135 and 136, etc. The diverting member 125 has a guide surface 125*a* for guiding copy sheets toward the ejection rollers 135 and 136, an arched guide surface 125*b* for guiding copy sheets coming from the copying machine 1 toward intermediate transport rollers 190 and 191, and an arched guide surface 125*c* for guiding copy sheets from the ejection rollers 135 and 136 toward the intermediate transport rollers 190 and 191. A resin flexible film 129 is adhered to the arched surface 125*c*. The flexible film 129 extends the edge to the guide plate 123. Therefore, copy sheets coming from the left are guided to the right in FIG. 2 [in the direction of the arrow (A)], but copy sheets coming from the right are directed along the surface 125*c* of the diverting member 125.

Figure 6:
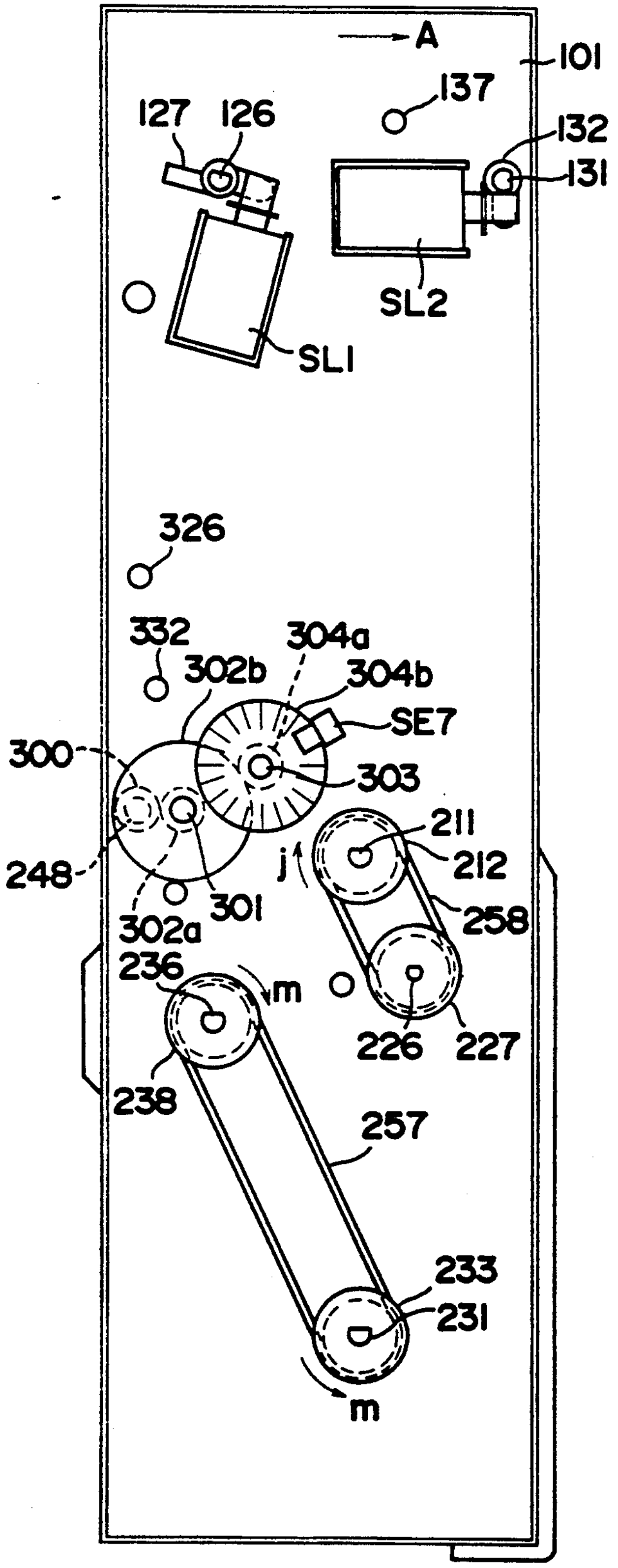
FIG. 6 is a front view of a front frame.
Figure 7:
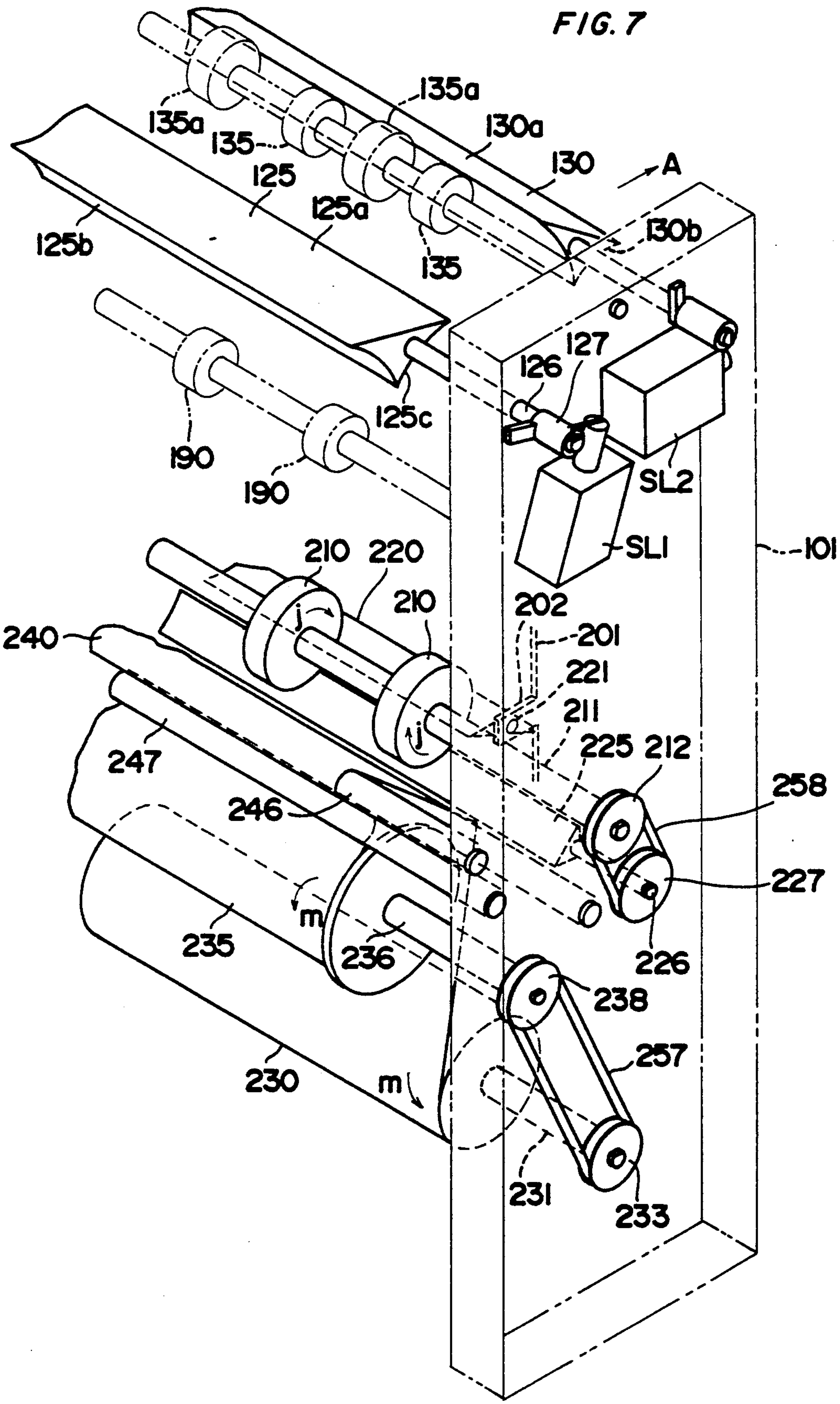
FIG. 7 is a perspective view of a part of the initial constitution of the sheet refeeding unit from the side of the front frame.

The diverting member 125 is so fitted on a shaft 126 laid between a front frame 101 and a rear frame 111 of the refeeding unit 100 that the diverting member 125 is capable of turning on the sheet 126. As shown in FIGS. 6 and 7, the shaft 126 is connected to a plunger of a solenoid SL1 mounted on the front frame 101 via an arm 127. When the solenoid SL1 is off, the diverting member 125 is in the position shown by the two-dot and a chain line in FIG. 2 by the elasticity of a spring not shown in the drawings. When the solenoid SL1 is turned on, the diverting member 125 is put in the position shown by the solid line.

The other diverting member 130 has a guide surface 130*a* for guiding copy sheets toward the copy tray 175 or the sorter 400, and an arched guide surface 130*b* for making copy sheets travel along the right side of the sheet refeeding unit 100. The diverting member 130 is so fitted on a shaft 131 laid between the frames 101 and 111 that the diverting member 130 is capable of turning on the shaft 131. The shaft 131, as shown in FIGS. 6 and 7, is connected to a plunger of a solenoid SL2 via an arm 132. When the solenoid SL2 is off, the diverting member 130 is in the position shown by the two-dot and a chain line in FIG. 2 by the elasticity of a spring not shown in the drawings. When the solenoid SL2 is turned on, the diverting member 130 is put in the position shown by the solid line. Further, the diverting member 130 is removable from the frames 101 and 111. When the sorter 400 is not attached to the refeeding unit 100, the diverting member 130 is removed.

The copy tray 175 is supported by a plate 176 at an end. The leading edge of a sheet ejected through the ejection rollers 135 and 136 is regulated by a regulation plate 177. When the copy tray 175 is attached to the sheet refeeding unit 100, the diverting member 130 is removed from the unit 100. When the sorter 400 is attached to the unit 100, the copy tray 175 and the support plate 176 are removed, and the diverting member 130 is provided with the unit 100.

Meanwhile, a photosensor SE1 is disposed on the guide plate 123 via a bracket 133. The actuator 134 of the sensor SE1 projects in a path which is formed of the diverting member 125, the guide surface 125*a* and the guide plate 123, and each sheet passing through the path is detected by the sensor SE1.

Figure 4:
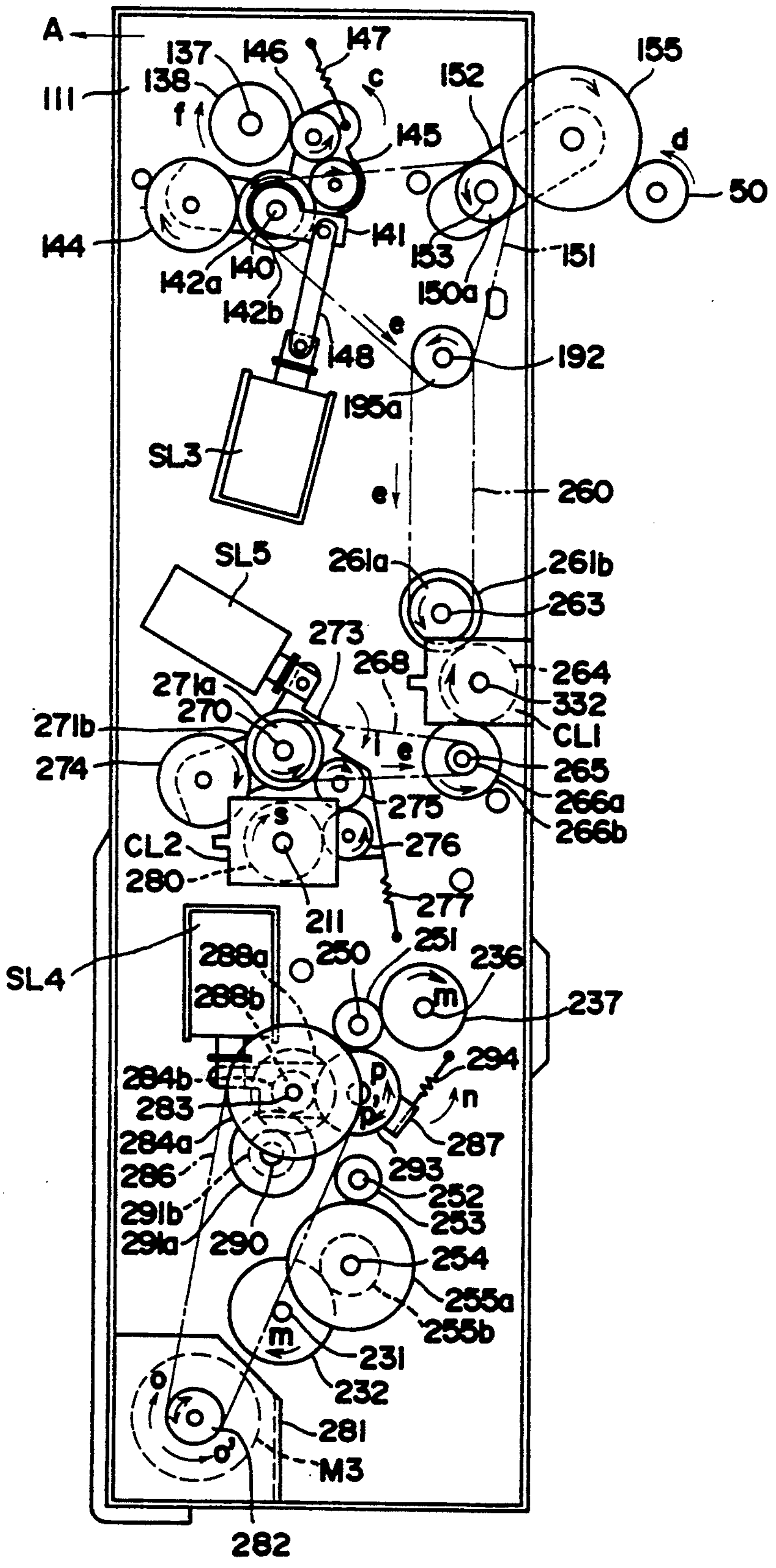
FIG. 4 is a rear view of a rear frame.
Figure 5:
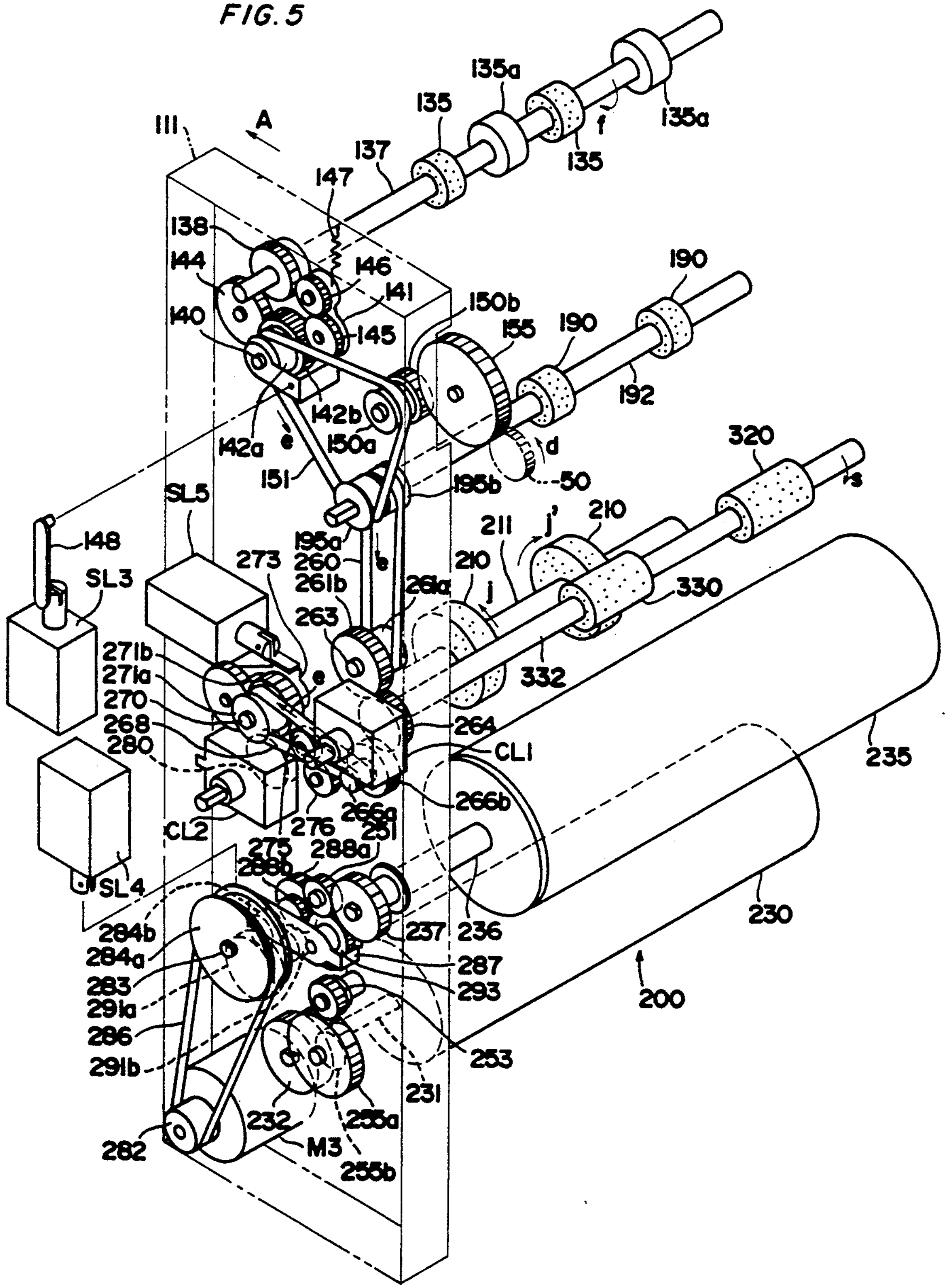
FIG. 5 is a perspective view of a drive mechanism from the side of the rear frame.

Stiffen rollers 135*a*, which are a little larger than the upper ejection rollers 135, are fitted on the same shaft of the upper ejection rollers 135 (refer to FIG. 5), and the upper ejection rollers 135 are driven to rotate forward and backward for switchback of copy sheets in a case of the composite copying as well as for ejection of copy sheets. The drive mechanism is herewith described referring to FIGS. 4 and 5.

A bracket 141 is pivoted on a shaft 140 fixed on the rear frame 111. The shaft 140 is further so fitted with a timing pulley 142*a* and a gear 142*b* that they are rotated on the shaft 140 in a body. Gears 144, 145 and 146 are rotatably fitted in the bracket 141. The gear 144 engages with the gear 142*b*, and the gear 145 engages with the gears 142*b* and 146. A gear 138 is fitted on the end portion of the supporting shaft 137 of the upper ejection rollers 135. The bracket 141 is urged in the direction of the arrow (c) by a coil spring 147 and also connected with a plunger of a solenoid SL3 via a lever 148, the solenoid SL3 is mounted to the rear frame 111. When the solenoid SL3 is off, the bracket 141 is turned in the direction of the arrow (c) by the elasticity of the coil spring 147, and accordingly the gear 146 engages with the gear 138. When the solenoid SL3 is turned on, the bracket 141 is turned in the direction reverse to the arrow (c), and accordingly the gear 144, not the gear 146, comes into engagement with the gear 138.

A timing belt 151 is wound around the timing pulley 142*a* and other timing pulleys 150*a* and 195*a*. The timing pulley 150*a* is so fitted in a bracket 152 fixed on the rear frame 111 that the pulley 150*a* is rotated on a shaft 153. A gear 150*b* which is rotated together with the pulley 150*a* engages with a gear 155 which is rotatably fitted in the bracket 152 a the end. Further, the gear 155 engages with a gear 50 fitted on the supporting shaft of the lower ejection rollers 38 in the copying machine 1 at the end. The other timing pulley 195*a* is fitted on a shaft 192 supporting the intermediate transport rollers 190 at the end.

With the constitution above, the transport system in the sheet diverting section 120 is driven by the main motor M1 in the copying machine 1. Specifically, the gear 50 is driven by the main motor M1 to rotate in the direction of the arrow (d) all the time, and the rotation is transmitted to the gears 155 and 150*b* and the pulley 150*a*, so that the timing belt 151 is rotated in the direction of the arrow (e). Further, this rotation of the timing belt 151, when the solenoid SL3 is off, is transmitted to the pulley 142*a* and the gears 142*b*, 145, 146 and finally to the gear 138, and accordingly the upper ejection rollers 135 and the stiffen rollers 135*a* are rotated in the direction of the arrow (f). At that time, the gear 144 idles. When the solenoid SL3 is turned on, the bracket 144 is pivoted, and the gear 144 engages with the gear 138. Accordingly, the rollers 135 and 135*a* are rotated in the direction reverse to the arrow (i). In this case, the gear 146 idles.

Furthermore, the lower ejection rollers 136 rotate following the rotation of the upper ejection rollers 135.

Intermediate Transport Section

The intermediate transport section 180 comprises a guide plate 181, a guide frame 182 and the intermediate transport rollers 190 and 191 The guide frame 182 is pivoted on a pin 183, and it is usually in the position shown by the solid line in FIG. 2 by the gravity. When the guide frame 182 is pivoted in the direction of the arrow (g), an intermediate transport path comes to an open state, which enables a jammed sheet to be removed easily. The intermediate transport rollers 190 are driven by the timing belt 151 to rotate in the same direction as the belt 151 itself rotates [in the direction of the arrow (e)]. The other rollers 191, which are fitted on the guide frame 182, are in contact with the roller 190 and rotate following the rollers 190.

Also, a photosensor SE2 is disposed on the guide plate 181 via a bracket 185. The actuator 186 of the sensor SE2 projects in the intermediate transport path, and the sensor SE2 detects each sheet passing the path.

Sheet Transporting Operation by Means of the Sheet Diverting Section and the intermediate transport Section When copies are to be ejected from the copying machine 1 in a case of single side copying and when copies are to be ejected therefrom after a copying operation of a second image in a case of duplex/composite copying, the solenoids SL1 and SL2 are both off, and accordingly the diverting members 125 and 130 are kept in the positions shown by the two-dot and a chain lines in FIG. 2. Also, the solenoid SL3 is off, so that the ejection rollers 135 and 136 are rotated forward. When the sorter 400 is attached, each copy sheet transported to the diverting section 120 from the copying machine 1 through the ejection rollers 38 and 39 is guided by the guide plate 123, the guide surface 125*a* of the diverting member 125 and the guide surface 130*a* of the diverting member 130, and provided with a transporting force by the ejection rollers 135 and 136, and thereby the sheet is transported into the sorter 400. Meanwhile, when the copy tray 175 is attached, the diverting member 130 is removed, and each copy sheet is directly ejected onto the copy tray 175 through the ejection rollers 135 and 136.

When copy sheets each of which gained an image on one side are to be ejected from the copying machine 1 in a case of duplex copying, the solenoid SL1 is turned on, and thereby the diverting member 125 is put in the position shown by the solid line in FIG. 2. Accordingly, each copy sheet is guided by the upper portion of the guide plate 181 and the arched surface 125*b* of the diverting member 125 and transported to the sheet collecting section 200 through the intermediate transport rollers 190 and 191.

When copy sheets each of which gained an image on one side are to be ejected from the copying machine 1 in a case of composite copying, the solenoid SL1 is kept off, and the solenoid SL2 is turned on. Thereby, the diverting member 125 is in the position shown by the two-dot and a chain line, and the diverting member 130 is positioned as shown by the solid line. The solenoid SL3 is off first, and thereby the ejection rollers 135 and 136 are rotated forward. Accordingly, a copy sheet is transported in the direction of the arrow (A) as in a case of single side copying, and the copy sheet is led to the space between the refeeding unit 100 and the sorter 400 through the arched surface 130*b* of the diverting member 130. However, when the copy tray 175 is attached, and the diverting member 130 is removed, the copy sheet is guided onto the tray 175.

Thereafter, when a specified period of time has passed since the trailing edge of the sheet was detected by the sensor SE1, the solenoid SL3 is turned on, and thereby the ejection rollers 135 and 136 are switched to rotate backward. The specified period is a time required for the trailing edge of the sheet to move from the detection point of the sensor SE1 to an arbitrary point between the edge of the film 129 and the nip portion of the ejection rollers 135 and 136. When the ejection rollers 135 and 136 are driven to rotate backward, the copy sheet starts reversing [traveling in the direction reverse to the arrow (A)]. Then, the sheet is guided by the film 129 and transported into the sheet collecting section 200 through the intermediate transport rollers 190 and 191.

Next, when the leading edge of the next sheet is detected by the sensor SE1, the solenoid SL3 is turned off, and the ejection rollers 135 are switched to rotate forward.

In both cases of duplex copying and composite copying, when a predetermined number of copy sheets per original, which was set by an operator, are stored in the sheet collecting section 200, the drives of the rollers 135 and 190 are discontinued, and the diverting members 125 and 130 are put back to the positions shown by the two-dot and a chain lines respectively.

Sheet Collecting Section

The sheet collecting section 200 comprises a guide cover 201, guide rollers 210, pinch rollers 215 and 216, a guide plate 219, diverting members 220 and 225, a scraper 228, a belt winding bobbin 230, a belt rewinding bobbin 235, a belt 240, idle rollers 245, 246 and 247, etc. Basically, a copy sheet transported downward from the intermediate transport rollers 190 and 191 is nipped between the guide rollers 210 and the pinch rollers 215 and 216 and transported down to the bobbin 230. In this moment, the bobbin 230 is driven to rotate in the direction of the arrow (m), and the sheet becomes wound around the bobbin 230 together with the belt 240. When feeding copy sheets out of the sheet collecting section 200, the upper bobbin 235 is driven to rotate in the direction of the arrow (m), and the belt 240 is becoming rolled up around the bobbin 235. Simultaneously, the scraper 228 scrapes each sheet from the belt 240 so that the sheet can be transported upward. Then, the sheet is fed into the refeeding section 320, guided by the guide rollers 210 rotating in the direction of the arrow (j').

As shown in FIG. 7, the diverting member 220 has pins 221 at both ends, and it is pivoted on a tabs 202 protruding from the guide cover 201 via the respective pins 221. The diverting member 220 is also urged in the direction of the arrow (h) by a spring not shown in the drawings. The right end in FIG. 2 of the diverting member 220 is usually in contact with a step 201*a* of the guide cover 201, and the diverting member 220 is kept in the position shown by the two-dot and a chain line in FIG. 2. The elasticity of the spring for urging the diverting member 220 is set weak enough that the diverting member 220 is turned to the position shown by the solid line in FIG. 2 when the leading edge of a sheet transported by the intermediate transport rollers 190 and 191 pushes a guide surface 220*a* of the diverting member 220. When the diverting member 220 is turned to the position shown by the solid line, the transport path is put in an open state, so that the leading edge of the sheet is guided to the nip portion of the guide rollers 210 and the pinch rollers 215.

The guide rollers 210 can be driven to rotate both forward and backward and also can be driven intermittently so that it can guide sheets toward the sheet collecting section 200 and take sheets out of the sheet collecting section 200. The drive mechanism of the guide rollers 210 is herewith explained referring to FIGS. 4 and 5. Further, this drive mechanism also functions to drive register rollers 330 and 331 in the refeeding section 320.

A timing belt 260 is laid between a timing roller 195*b* which is integrated with the timing pulley 195*a* fitted on the supporting shaft 192 of the intermediate transport rollers 190, and a timing pulley 261*a* which is fitted on the rear frame 111 via a shaft 263. A gear 261*b*, which is rotated together with the timing pulley 261*a*, engages with a gear 264 of a clutch CL1. The clutch CL1 is provided on a supporting shaft 332 of the register rollers 330. The clutch gear 264 is capable of rotating at all times, and further it engages with a gear 266*b* fitted on the rear frame 111 via a shaft 265. A timing belt 268 is laid between a timing pulley 266*a*, which is rotated together with the gear 266*b* and a timing pulley 271*a*, which is rotatably fitted on a shaft 270 fixed on the rear frame 111. Further, a gear 271*b* and a bracket 273 are rotatably fitted on the shaft 270, and the gear 271*b* is capable of rotating together with the pulley 271*a*.

Gears 274, 275 and 276 are rotatably fitted in the bracket 273, and the gear 275 engages with the gears 271*b* and 276. A clutch CL2 is provided on the supporting shaft 211 of the guide rollers 210 at the end, and its gear 280 is capable of engaging with either the gear 274 or the gear 276 alternatively. The bracket. 273 is urged in the direction of the arrow (i) by a coil spring 277 and also connected to a plunger of a solenoid SL5 fixed on the rear frame 111. When the solenoid SL5 is off, the bracket 273 is turned in the direction of the arrow (i) by the elasticity of the coil spring 277, and thereby the gear 276 engages with the clutch gear 280. When the solenoid SL5 is turned on, the bracket 273 is turned in the direction reverse to the arrow (i), and thereby the gear 274, not the gear 276 engages with the clutch gear 280.

Both of the clutches CL1 and CL2 function to transmit the rotations of the gears 264 and 280 to the register roller supporting shaft 332 and the guide roller supporting shaft 211 respectively, when they are off. When they are turned on, the transmission of the rotations is discontinued.

With the arrangement above, the driving force of the timing belt 151 is transformed into the force to rotate the timing belt 260 in the direction of the arrow (e) via the pulleys 195*a* and 195*b*, and further the force is transmitted to the timing belt 268 via the pulley 261*a*, the gear 261*b*, the clutch gear 264, the gear 266*b* and the pulley 266*a* so that the timing belt 268 is rotated in the direction of the arrow (e). Furthermore, the rotation of the timing belt 268 is transmitted to the clutch gear 280 via the pulley 271*a* and the gears 271*b*, 275 and 276, when the solenoid SL5 is off, and thereby the guide rollers 210 are rotated in the direction of the arrow (j'). On the other hand, when the solenoid SL5 is turned on, the bracket 273 is turned in the direction reverse to the arrow (i), and accordingly the gear 274 comes into engagement with the clutch gear 280. Thereby, the guide rollers 210 are rotated in the direction of the arrow (j).

The pinch rollers 215 and 216 are so made that they rotate following the guide rollers 210. The pinch rollers 215 are disposed on the guide cover 201, and the pinch rollers 216 are disposed on the arms 217, which are protruding from the both ends of the supporting shaft 211 of the guide rollers 210, via a shaft 218.

Figure 3:
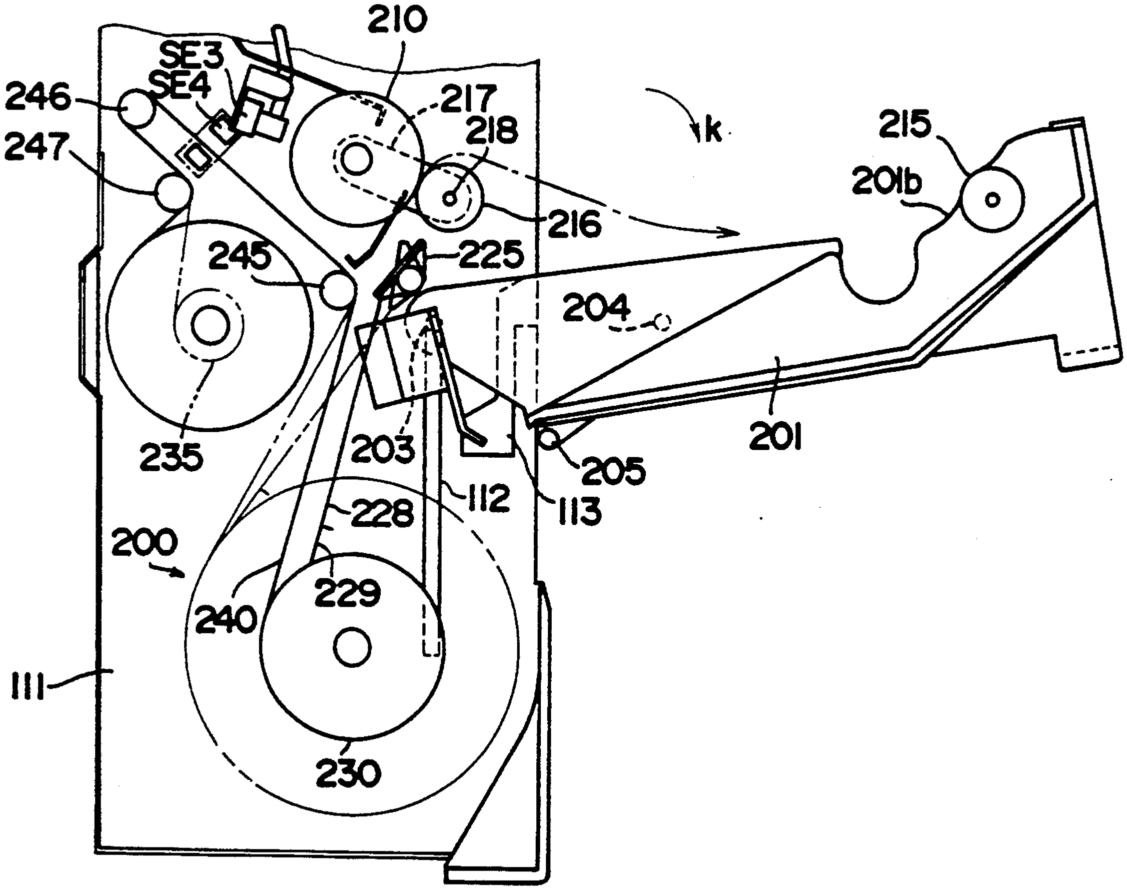
FIG. 3 is a partial internal constitution view of a guide cover in an open state.

The guide cover 201 has a sheet guide portion 201*b*, and it is usually in position as shown by the solid line in FIG. 2, so that the right side of the sheet refeeding unit 100 is covered with the guide cover 201. When such a trouble as a paper jam takes place, as shown in FIG. 3, the guide cover 201 is pulled outside to be put in approximately the horizontal posture, so that the sheet collecting section 200 is disclosed. Specifically, pins 203, 204 and 205 are fixed on both the front and rear portions of the guide cover 201, and guide grooves 112 and 113 are formed on both of the front and the rear frames 101 and 111. The pins 203 engage with the guide grooves 112, and the pins 204 engage with the guide grooves 113. The pins 205 engage with the right edges of the front and the rear frames 101 and 111. When the pins 203 come into engagement with the lower edges of the guide grooves 112, magnets 114 disposed on the front and the rear frames 101 and 111 attract a magnetic plate adhered on the upper portion of the guide cover 201, and thereby the guide cover 201 is set as shown in the solid line in FIG. 2. When opening the guide cover 201 outward, an operator needs to grasp a handle 207 disposed at the upper portion of the guide cover 201 and turn the guide cover 201 slightly in the direction of the arrow (k) on the pins 203 so that the magnetic plate 206 can disengage from the magnets 114. In this moment, the pins 204 come to the vertical portions of the respective guide grooves 113. Next, the operator needs to pull the guide cover 201 upward, and when the pin 204 are relieved of the engagement with the respective guide grooves 113, the guide cover 201 moves in the direction of the arrow (k) by the gravity. When the pins 203 come into engagement with the upper edges of the guide grooves 112, and the pins 205 come into engagement with the right edges of the frames 101 and 111, the guide cover 201 is finally put in the horizontal posture as shown in FIG. 3, so that the sheet collecting section 200 is disclosed.

In this state, a jammed sheet is removed from the sheet collecting section 200 or the refeeding section 320. Also, the guide cover 201 which is in the horizontal posture functions as a tray for receiving copy sheets, when coercive sheet ejection is performed to eject copy sheets which were wound around the bobbin 230 from the refeeding unit 100 outside without feeding the copy sheets back to the copying machine 1. This coercive sheet ejection is executed when an operator turns on a switch SW which is disposed on the side of the sheet refeeding unit 100 and operable outside and the detailed control system will be described later.

Figure 28:
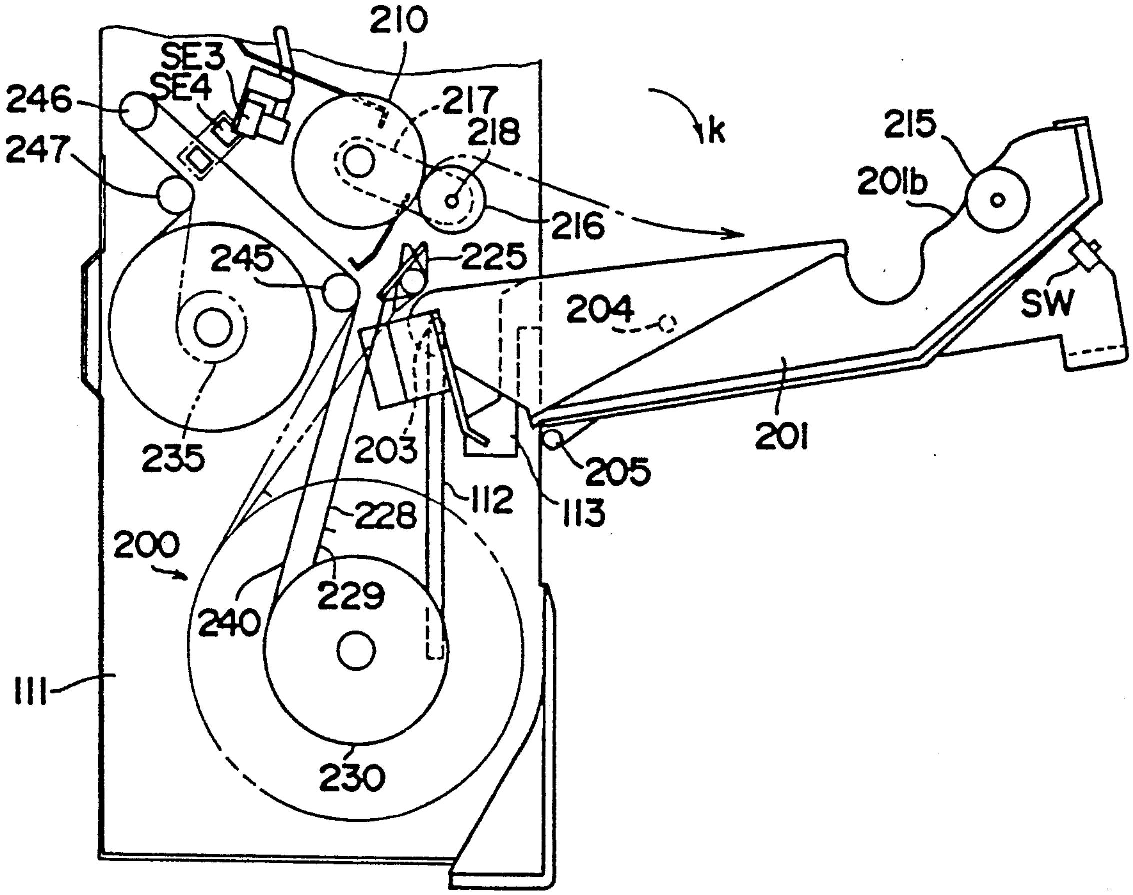
FIG. 28 shows another internal constitution of the sheet refeeding unit.

Further, it may be preferable to dispose the switch SW on the upper surface of the guide cover 201 as shown in FIG. 28 so that the switch SW is disclosed only when the guide cover 201 is put in an open state. This arrangement may prevent such a trouble as the switch SW is misoperated when the guide cover 201 is closed.

Also, a photosensor SE5 is installed in the sheet collecting section 200 to detect the open and closed state of the guide cover 201.

The belt 240 for placing copy sheets in the sheet collecting section 200 and the bobbins 230 and 235 for holding the sheets are hereinafter described.

The bobbins 230 and 235 are respectively fitted on the shaft 231 and 236 laid between the front frame 101 and the rear frame 111. The bobbin 230 has a circumference as shown by the solid line in FIG. 2, and the bobbin 235 has a circumference as shown by the two-dot and a chain line. The both ends of the belt 240 are fixed on the bobbins 230 and 235 respectively. The idle rollers 245, 246 and 247 are connected by the belt 240, and the belt 240 is capable of being rolled up around the bobbin 230 and the bobbin 235. In the initial state, the belt 240 is rolled up around the bobbin 235 as shown by the solid line in FIG. 2. Then, as the bobbin 230 is driven to rotate in the direction of the arrow (m), the bobbin 235 rotates in the direction of the arrow (m'). Thereby, the belt 240 becomes wound around the bobbin 230, and finally the belt 240 is rolled up around the bobbin 230 as shown by the two-dot and a chain line. Thereafter, as the bobbin 235 is driven to rotate in the direction of the arrow (m), the bobbin 230 rotates in the direction of the arrow (m'), and the belt 240 is returned to the initial state.

The bobbins 230 and 235 are driven by a motor M3 which is capable of rotating forward and backward and changing the speed steplessly. The drive mechanism is hereinafter described referring to FIGS. 4 and 5.

The motor M3 is mounted on the rear frame 111 via a bracket 281, and a timing belt 286 is laid between a timing pulley 282 fixed on the output shaft of the motor M3 and a timing pulley **284*a* rotatably fitted on a shaft 283 fixed on the rear frame 111. The shaft 283 is further fitted with a gear 284*b*, a bracket 287, gears 288*a* and 288*b*, and the pulley 284*a* and the gear 284*b* are rotated in a body. Also, the gears 288*a* and 288*b* are rotated in a body. A shaft 290 fixed on the rear frame 111 is so fitted with gears 291*a* and 291*b* that the gears 291*a* and 291*b* rotate freely. The gear 284*b* which is rotated together with the pulley 284*a* engages with the gear 291*a*, and the gear 291*b* which is rotated together with the gear 291*a* engages with the gear 288*a*. Further, the gear 288*b* which is rotated together with the gear 288*a* engages with the gear 293 which is rotatably fitted on the bracket 287**.

Shafts 250, 252 and 254 are fixed on the rear frame 111. The shaft 250 and 252 are so fitted with gears 251 and 253 respectively that the gears 251 and 253 rotate freely, and the shaft 254 is fitted with gears **255*a* and 255*b* which are rotated in a body. The gear 251 engages with a gear 237 fixed on the bobbin supporting shaft 236 at the end, the gear 253 engages with the gear 255*a*, and the gear 255*b* engages with a gear 232 fitted on the bobbin supporting shaft 231** at the end.

The bracket 287 is urged in the direction of the arrow (n) by a coil spring 294 and connected to a plunger of a solenoid SL4 mounted on the rear frame 111. When the solenoid SL4 is off, the bracket 287 is turned in the direction of the arrow (n) by the elasticity of the coil spring 294, and accordingly the gear 293 engages with the gear 251. When the solenoid SL4 is turned on, the bracket 287 is turned in the direction reverse to the arrow (n), and thereby the gear 293 disengages from the gear 251 and comes into engagement with the gear 253.

With the constitution above, the solenoid SL4 is turned on so that the gear 293 will engage with the gear 253, and thereby the motor M3 is rotated in the direction of the arrow (o). Accordingly, the bobbin 230 is rotated in the direction of the arrow (m) to be wound with the belt 240. In this case, the driving force of the motor M3 is transmitted from the pulley 282 to the timing belt 286, the pulley **284*a* and the gear 284*b* in order, and further the force is transmitted to the gears 291*a*, 291*b*, 288*a*, 288*b* to rotate the gear 293 in the direction of the arrow (p). The rotation of the gear 293 is transmitted to the bobbin gear 232 and the bobbin supporting shaft 231 via the gears 255*a* and 255*b*, and thereby the bobbin 230 is rotated In the direction of the arrow (m). At that time, the gear 251 is free, and the bobbin 235 is rotated in the direction of the arrow (m') because of the belt 240. Meanwhile, the solenoid SL4 is turned off so that the gear 293 will engage with the gear 251, and thereby the motor M3 is rotated reversely in the direction of the arrow (o'). Accordingly, the bobbin 235 is rotated in the direction of the arrow (m) to be rewound with the belt 240. In this case, the driving force of the motor M3 is transmitted to the gear 293 to rotate in the direction of the arrow (p') through the above-mentioned transmission path. The rotation of the gear 293 is transmitted to the bobbin gear 237 and the bobbin supporting shaft 236 via the gear 251, and thereby the bobbin 235 is rotated in the direction of the arrow (m). At that time, the gear 253 is free, and the bobbin 230 is rotated in the direction of the arrow (m') because of the belt 240**.

Incidentally, when either one of the bobbins 230 or 235 is driven to rotate to be wound with the belt 240, and the other bobbin rotates just following it, the belt 240 becomes loose. Therefore, in this embodiment, as shown in FIGS. 6 and 7, pulleys 233 and 238 are fitted on the bobbin supporting shafts 231 and 236 at the ends by the front frame 101 respectively, and they are connected by a belt 257 whose cross section is a circle. The belt 257 applies resistance to either one of the bobbins 230 or 235 which rotates following the other bobbin, and thereby the belt 240 is prevented from becoming loose. For example, as the bobbin 230 is rotated in the direction of the arrow (m), the other bobbin 235 is rotated in the arrow (m') pulled by the belt 240, and on the other hand, the rotating force in the direction of the arrow (m) is transmitted to the pulley 238 from the pulley 233 via the belt 257. Accordingly, the belt 257 slips on the pulleys 233 and 238, and as a result the belt 240 maintains proper tension, so that the belt 240 never becomes loose. When the bobbin 235 is rotated in the direction of the arrow (m), the same effect is obtained. Therefore, the space is used efficiently when the belt 240 is rolled up.

Copy sheets transported from the intermediate transport section 180 are wound around the bobbin 230 to be stored therein as described in detail later. At that time, the roll of the belt 240 is increasing in circumference as the number of sheets wound around the bobbin 230 is increasing. Accordingly, if the motor M3 is rotated at a fixed speed, the travel speed of the belt 240 would be increasing, and the speed deference between the sheet transport in the intermediate transport section 180 and that by the belt 240 would be larger gradually. Therefore, in this embodiment, the idle roller 246, which rotates following the travel of the belt 240, is coated with frictional material such as rubber. Thereby, the feature of the idle roller 246 of following the belt 240 is maintained, and further the rotating speed of the idle roller 246 is detected. The detected speed of the idle roller 246 is fed back to the motor M3, and based on it, the traveling speed of the belt 240 (the speed of collecting sheets in the bobbin 230) is controlled to be fixed all the time.

Figure 8:
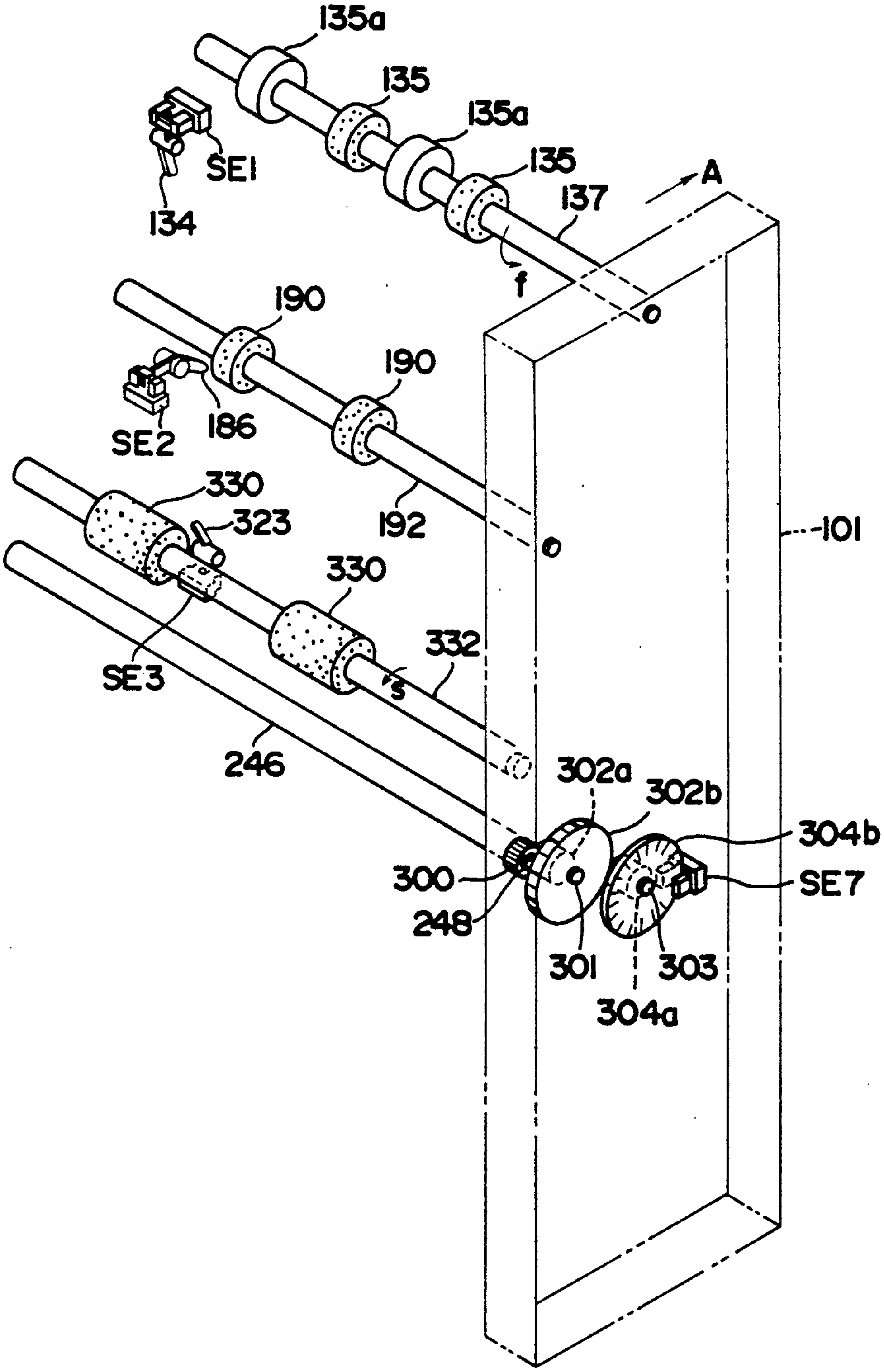
FIG. 8 is a perspective view of the other part of the internal constitution of the sheet refeeding unit from the side of the front frame.

Specifically, as shown in FIGS. 6 and 8, a gear 300 is fitted on the supporting shaft 248 of the idle roller 246 at the end, and a shaft 301 fixed on the front frame 101 is so fitted with gears 302*a* and 302*b* that they are rotated in a body. A shaft 303 fixed on the front frame 101 is so fitted with a gear 304*a* and a pulse disc 304*b* that they are rotated in a body. The gear 300 engages with the gear 302*a*, and the gear 302*b* engages with the gear 304*a*. The following rotation of the idle roller 246 is transmitted from the shaft 248 to the gear 300 and to the pulse disc 304*b* via the gears 3O2*a*, 302*b* and 304*a*. A photosensor SE7 is so disposed that it faces the circumference of the pulse disc 304*b*. The number of rotation of the pulse disc 304*b* is counted by the photosensor SE7.

Figure 9:
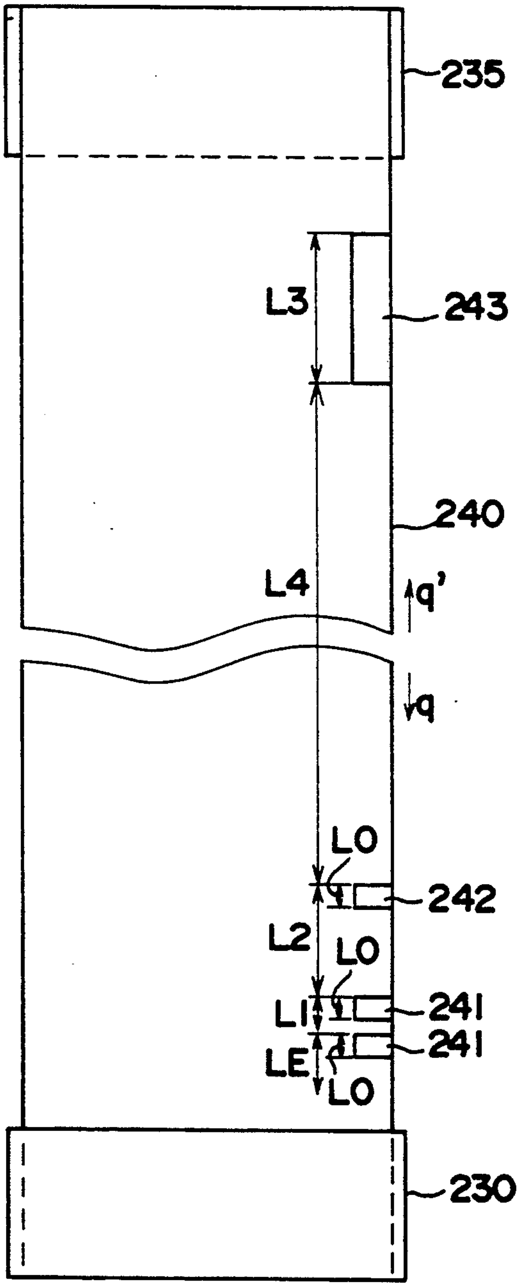
FIG. 9 is a plan view of a sheet collecting belt.

In order to detect a wind/rewind state of the belt 240, as shown in FIG. 2, a transmission type photosensor SE4 is installed, and the belt 240 has overrun marks 241 and 241, a stand-by mark 242 and an end mark 243 as shown in FIG. 9. The transparent belt 240 is colored with black paint at the rear side of the unit 100 so that the marks 241, 242 and 243 are formed slightly aside of the rear side of the biggest size of a copy sheet to be received on the belt 240. The marks 241, 242 and 243 are detected by the sensor SE4 near the idle roller 246.

As described later in detail, when the sheet refeeding unit 100 starts to be supplied with power, first the belt 240 becomes rolled up around the bobbin 235, that is, the belt 240 is returned to the initial position. In this moment, the belt 240 moves in the direction of the arrow (q') in FIG. 9, and when the sensor SE4 detects the stand-by mark 242, the drive of the motor M3 is stopped. In a case that the power source of the refeeding unit 100 was turned off after the stand-by mark 242 passed the sensor SE4, when the power source is turned on again, the sensor SE4 never detects the stand-by mark 242 in spite of the rotation of the bobbin 235 in the direction of the arrow (m). Therefore, in this embodiment, to eliminate such a trouble, the overrun marks 241 and 241 which have a different pattern from the stand-by mark 242 are provided for the belt 240 at the upstream portion in the direction of rewinding. Therefore, the motion of rewinding the belt 240 around the bobbin 235 is stopped, not only when the sensor SE4 detects the stand-by mark 242, but also when the sensor SE4 detects the overrun marks 241 and 241 in a case that the return of the belt 240 to the initial position is started with a point upstream of the stand-by mark 242.

Incidentally, the widths of the stand-by mark 242 and the overrun marks 241 and 241 are set to be (L0), and the distance (L2) between the stand-by mark 242 and the overrun mark 241 are set to be larger than the distance between the two lines of the overrun marks 241 and 241. Thereby, the marks 241 and 242 are distinguished from each other by means of the sensor SE4 and a timer.

Also, the end mark 243 is given to the belt 240 at the end near the bobbin 235. As the belt 240 moves in the direction of the arrow (q), copy sheets are placed in the sheet collecting section 200, and when the sensor SE4 detects the end mark 243, it is judged that the belt 240 is full of sheets. The length (L3) of the end mark 243 is longer than the length of the biggest size of a sheet to be transported by the belt 240. Accordingly, even when the copy sheet, which was fed from the feed section to the copying machine 1 right before the sensor SE4 detects the leading edge of the end mark 243, are received by the belt 240, the end mark 243 is still detected by the sensor SE4.

Next, the diverting member 225 is hereinafter described referring to FIGS. 2, 6 and 7.

The diverting member 225 is fixed on a shaft 226 laid between the frames 101 and 111. A pulley 227 fitted on the shaft 226 at the end is linked with a pulley 212 fitted on the supporting shaft 211 of the guide rollers 210 at the end by a belt 258 whose cross section is a circle. In placing copy sheets in the sheet collecting section 200, the guide rollers 210 are driven to rotate in the direction of the arrow (j), which is followed by the rotations of the pulley 212, the belt 258 and the pulley 227. Thereby, the diverting member 225 is turned in the direction of the arrow (r) and regulated by a stopper not shown in the drawings, and thus it is positioned as shown by the solid line in FIG. 2. The diverting member 225, when in the position shown by the solid line, functions to guide each sheet transported by the guide rollers 210 to between the belt 240 and the scraper 228 by means of the guide surface 225*a*. On the other hand, in feeding copy sheets out of the sheet collecting section 200, the guide rollers 210 are driven to rotate in the direction of the arrow (j') intermittently. Thereby, the diverting member 225 is turned in the direction reverse to the arrow (r) via the same way and regulated by another stopper, and thus it is positioned as shown by the two-dot and a chain line. Then, the diverting member 225 guides each sheet taken off the belt 240 to the nip portion of the guide rollers 210 and the pinch rollers 216 by means of the guide surface 225*a* .

While the guide rollers 210 are driven to rotate either in the direction of the arrow (j) or in the direction of the arrow (j') as described above, the belt 258 slips on either the pulley 212 or 227. Therefore, no unnecessary stress is applied to the diverting member 225 which is either in the position shown by the solid line or the position shown by the two-dot and a chain line.

The scraper 228 is a stiff thin plate, and a resin flexible film 229 is adhered on the surface of the scrape 228. Also, the scraper 228 is pivoted on the diverting member 225. The edge of the film 229 is in contact with the circumference of the bobbin 230 and the belt 240, which is wound around the bobbin 230, because of gravity. The film 229 changes its shift from the position shown by the solid line to the position shown by the two-dot and a chain line in accordance with the size of the roll of the belt 240, so that the film 229 guides each sheet properly both in placing copy sheets in the sheet collecting section 200 and in feeding copy sheets out thereof.

Sheet Collecting Operation

Sheet collecting operation is performed in the same way in both cases of duplex copying and composite copying.

Referring to FIG. 2, a copy sheet transported by the sport rollers 190 and 191 in the intermediate transport section 180 first comes into contact with the guide surface 220a of the diverting member 220, and thereby the diverting member 220 is turned to the position shown by the solid line. Then, the sheet is guided by the guide surface 220a and a ribbed surface 201b of the guide cover 201 and transported to between the guide rollers 210 and the pinch rollers 215. The guide rollers 210 are driven to rotate in the direction of the arrow (j), and the pinch rollers 215 and 216 rotate following the guide rollers 210. Therefore, the sheet is transported in the direction of the arrow (j) around the guide rollers 210, and goes between the guide plate 219 and the guide surface 225a of the diverting member 225 positioned as shown by the solid line. Then, the sheet goes between the belt 240 connecting the idle roller 246 to the bobbin 230 and the scraper 228 and is transported downward. The solenoid SL4 is turned on, and thereby the gear 293 comes into engagement with the gear 253. Then, the leading edge of the sheet is detected by the sensor SE2, and at predetermined timing the motor M3 is started to rotate in the direction of the arrow (o), so that the bobbin 230 is driven to rotate in the direction of the arrow (m). Thereby, the sheet is wound around the bobbin 230 together with the belt 240. The motor M3 is turned off to stop the rotation of the bobbin 230 at predetermined timing based on the detection of the trailing edge of the sheet by the sensor SE2 so that the sheet is completely wound around the bobbin 230. The above-described motion is repeated in collecting the successive sheets, and thus the sheets are wound around the bobbin 230 together with the belt 240 one after another.

The purpose of stopping the bobbin 230 every time a sheet is completely wound around the bobbin 230 is to reduce the intervals among sheets as much as possible when they are received on the belt 240, which may enlarge the storing capacity of the bobbin 230 and save the space.

Refeeding Section

The refeeding section 320 comprises a guide plate 321, a guide frame 325 provided with a guide plate 329, the register rollers 330 and 331 and the diverting member 220. The register rollers 330, as mentioned above, are driven to rotate in the direction of the arrow (s) via the clutch CL1 (refer to FIGS. 4 and 5) The register rollers 331 are fitted on the guide frame 325, and the rollers 331 are in contact with the respective rollers 330 and rotate following the rollers 330. The guide frame 325 is pivoted on a shaft 326 which is laid between the frames 101 and 111. The guide frame 325 is capable of turning upward after the guide frame 182 and the guide cover 201 are turned outward, so that the refeeding section 320 is disclosed.

Also, the guide plate 321 is fitted with a photosensor SE3 via a bracket 322. The sensor SE3 protrudes its actuator 323 into a path which is formed of the guide surface 220b of the diverting member 220 and the guide plate 321, so that it detects a sheet passing the path.

Refeeding Operation

The following is a description of an operation to feed copy sheets collected in the roll of the belt 240 wound around the bobbin 230 into the refeeding path 40 in the copying machine 1 one after another. This refeeding operation is performed in the same way in both cases of duplex copying and composite copying.

All the copy sheets printed on each one side are wound around the bobbin 230, and thereafter when an operator requires for refeed of the sheets, that is, when a print switch 61 is turned on (refer to FIG. 10), the solenoid SL4 is turned off, and thereby the gear 293 comes into engagement with the gear 251. Then, the motor M3 is started to rotate in the direction of the arrow (o'), and the bobbin 235 is driven to rotate in the direction of the arrow (m). Thereby, the belt 240 moves back from the bobbin 230, and at the same time the leading edge of a sheet is removed from the belt 240 because of the stiffness of the sheet itself and the help of the film 229 adhered on the scraper 228. Thus, the sheet is reversing and fed out of the bobbin 230. The sheet is guided by the belt 240 leading to the idle roller 245 and the scraper 228 and transported upward. The travel direction of the belt 240 is diverted at the idle roller 245 suddenly, and thereby the sheet is separated from the belt 240. Further, the sheet is guided by the guide plate 219 and the guide surface 225a of the diverting member 225 and transported between the guide rollers 210 and the pinch rollers 216. In this moment, the guide rollers 210 are reversely rotated in the direction of the arrow (j'). Accordingly, the sheet is transported in the direction of the arrow (j') around the guide rollers 210, goes between the guide surface 220b of the diverting member 220 and the guide plate 321 and reaches the register rollers 330 and 331. The register rollers 330 and 331 are stopped rotating by turning on the clutch CL1 immediately before the leading edge of the sheet reaches there, while the guide rollers 210 and the bobbin 235 are continued rotating. Therefore, the leading edge of the sheet is stuck between the register rollers 330 and 331, and a small loop is formed. After the formation of the loop, the clutch CL2 is turned on to stop the rotation of the guide rollers 210, and the motor M3 is turned off to stop the rotation of the bobbin 235. This control is taken into practice by a combination of a leading edge detection signal generated from the sensor SE3 and a timer.

Next, the clutches CL1 and CL2 are turned off to rotate the register rollers 330 and 331, and the motor M3 is turned on to rotate the guide rollers 210, and thereby the sheet is fed into the refeeding path 40 in the copying machine 1, guided by the guide frame 325 and the guide plate 329. The purpose of forming a loop by pushing the sheet against the nip portion of the register rollers 330 and 331 is to diskew the sheet. In order to ensure the effect, the transporting force (the sheet holding force) of the register rollers 330 and 331 is set larger than the transporting force of the guide rollers 210 and pinch rollers 215 and 216.

After that, the above-described motion is repeated based on the refeeding signal generated from the copying machine 1. When all the sheets are fed out of the bobbin 230, the belt 240 is controlled to return to the initial state of being wound around the bobbin 235.

Measures against Bending Habits of Sheets

In this embodiment, the ejection rollers 135 and 136 which function as means of turning over each sheet in a case of composite copying are disposed upstream of the sheet collecting section 200, and each sheet is wound around the bobbin 230 in the direction of the arrow (m) which is the same as the rotating direction (a) of the photosensitive drum 10 in the copying machine 1. Therefore, when the sheet is supplied to the photosensitive drum 10 again, the curvature in the opposite direction is provided for the sheet, so that the sheet is cured of a habit of bending into which it fell during the sheet collecting operation. Thereby, the sheet is easily removed from the photosensitive drum 10 after the transference of a second image.

Specifically, in a case of the duplex copying, each sheet is transported into the sheet collecting section 200 with its printed side facing right in FIG. 2, and the sheet is wound around the bobbin 230 with the printed side in. Accordingly, the sheet falls into a habit of bending toward the printed side. Then, after the refeeding operation, the other side (blank side) of the sheet sticks to the surface of the photosensitive drum 10 to get a second image.

In a case of composite copying, each sheet is turned over by the switch rotation of the ejection rollers 135 and 136 and transported into the sheet collecting section 200 with its printed side facing left in FIG. 2, and the sheet is wound around the bobbin 230 with the printed side out. Therefore, the sheet falls into a habit of bending toward the blank side. Then, after the refeeding operation, the printed side of the sheet sticks to the surface of the photosensitive drum 10, and a second image is transferred onto the same side of the sheet.

Thus, in both cases of duplex copying and composite copying, each sheet is wound around the bobbin 230 with its side to be provided with a second image out. When the sheet is supplied to the photosensitive drum 10 again, the sheet is cured of the habit of bending because the photosensitive drum 10 provides the sheet with the curvature in the opposite direction, so that the sheet is easily removed from the photosensitive drum 10.

Control Panel

Figure 10:
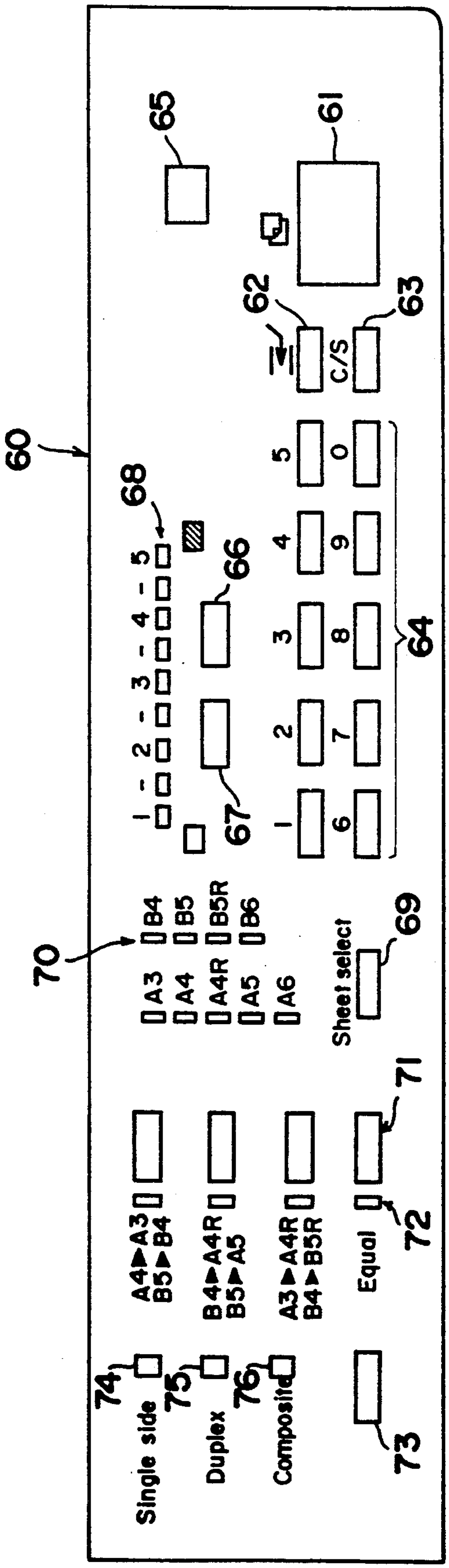
FIG. 10 is a plan view of a control panel.

As shown in FIG. 10, a control panel 60 is disposed on the copying machine 1 at the front part. The control panel 60 comprises a print key 61 for starting a copying operation, an interrupt key 62 for interrupting a multiple copying operation, a clear/stop key 63 for discontinuing a copying operation and canceling a set number, a ten-key 64 for setting the number of copies to be made, a seven-segment indicator 65 for indicating the number of copies and the condition of the copying machine 1, up and down keys 66 and 67 for setting the density, an LLD group 68 for indicating the density, a sheet size selection key 69 for selecting the size of copy sheets, an LED group 70 for indicating the selected sheet size, a magnification selection key group 71 for selecting a magnification ratio, an LED group 72 for indicating the selected magnification rate, a copying mode selection key 73 for selecting either a single side, duplex or composite copying mode, an LFD 74 for indicating that the single side copying mode has been selected, an LED 75 for indicating that the duplex copying mode has been selected, and an LED 76 for indicating that the composite copying mode has been selected.

Control Circuitry

Figure 11A:
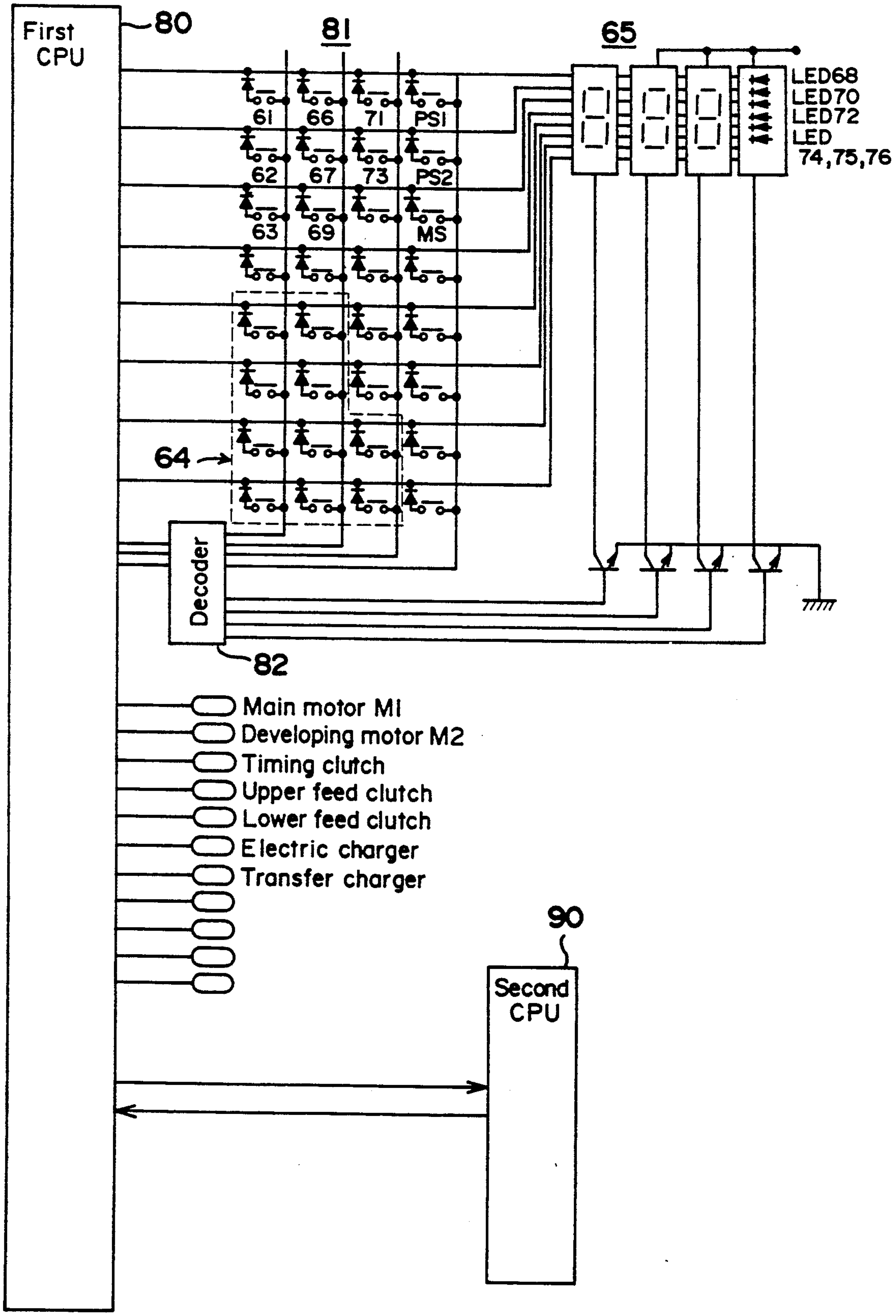
FIGS. 11*a* and 11*b* are block diagrams showing a control circuitry.
Figure 11B:
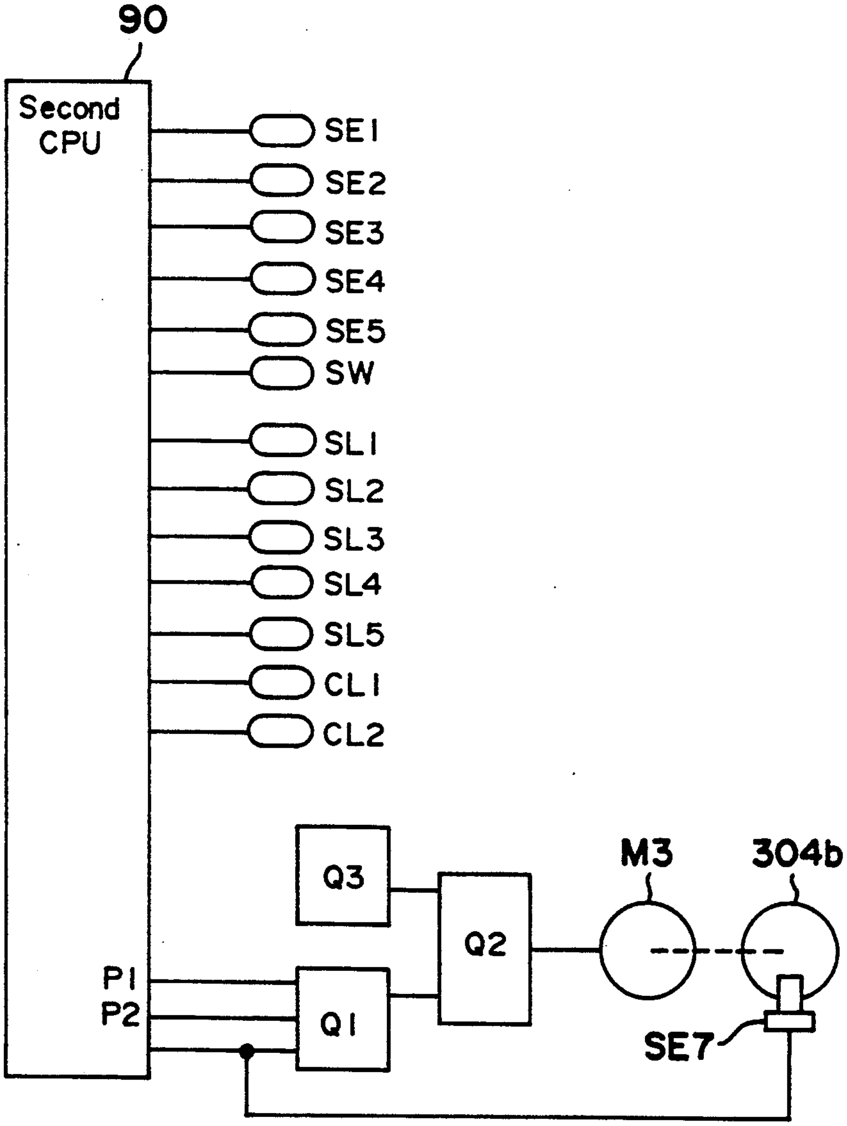

FIGS. 11*a* and 11*b* show a control circuitry of the copying apparatus, and the circuitry is mainly formed of a first microcomputer 80 for controlling the copying machine 1 and a second microcomputer 90 for controlling the sheet refeeding unit 100.

The CPU 80 is connected to a switch matrix 81, an indication section 65, and the LEDs 68, 70, 72, 74, 75 and 76 via a decoder 82. The switch matrix 81 is composed of not only respective switches incorporated in the keys 61 through 64, 66, 67, 69, 71 and 73 on the control panel 60 but also the copy sheet sensors PS1 and PS2 the switch MS for detecting whether the sheet refeeding unit 100 is attached, and so on. Signals are transmitted from the CPU 80 to the main motor M1, the developing motor M2, the timing clutch, the feed clutch, the electric charger, the transfer charger, etc.

Signals from the sheet sensors SE1, SE2 and SE3, the belt mark sensor SE4, the sensor SE5 for detecting the open/closed state of the guide cover 201 and a coercive ejection switch SW are entered into the CPU 90. Signals are transmitted from the CPU 90 to the solenoids SL1 through SL5 and the clutches CL1 and CL2 which drive the copy sheet transport system. The motor M3 for driving the bobbins 230 and 235 is controlled to rotate at a fixed speed by circuits Q1, Q2 and Q3 connected to the CPU 90. The circuit Q1 receives a signal from the sensor SE7 for detecting the number of rotation of the idle roller 246 by means of the pulse disc 304*b*, and a speed signal through either one of output ports P1 and P2. A speed signal for driving the bobbin 235 is transmitted to the circuit Q1 through the output port P1, and a speed signal for driving the bobbin 230 is transmitted through the output port P2. These signals are converted into values of voltage respectively in the circuit Q1, and the values are sent to the circuit Q2. Also, the circuit Q2 receives a standard waveform of voltage to maintain the pulse disc 304*b* rotating at a fixed speed from the circuit Q3. In the circuit Q2, the values of voltage sent from the circuits Q1 and Q3 are compared with each other, and a proper waveform voltage is figured out to be transmitted to the motor M3. The travel speed of the belt 240 to be driven by the motor M3 is set to be a little faster than the sheet transport speed during the sheet collecting operation, while set to be a little slower than the sheet transport speed during the sheet refeeding operation.

The CPUs 80 and 90 are communicable with each other. Information set with the keys on the control panel 60 is sent from the CPU 80 to the CPU 90. A signal indicating that there are copy sheets enough for the copying operation, a wait signal for preventing the copying operation from starting, etc. are sent from the CPU 90 to the CPU 80. Although it is omitted in FIGS. 11*a* and 11*b*, the CPU 80 is connected with a CPU controlling the original scan optical system 20, and further when the sorter 400 is attached, the CPU 80 is connected with a CPU controlling the sorter 400.

Control Procedure

A procedure of controlling the copying machine 1 and the sheet refeeding unit 100 by the CPUs 80 and 90 is hereinafter described referring to FIG. 12 and the following figures. In the following paragraphs, the term "on-edge" is defined as a change in status, where a switch, a sensor, a signal or the like changes from off to on, and the term "off-edge" is defined as a change in status, where a switch, a sensor, a signal or the like changes from on to off.

Flags and Signals

First, flags and signals used in the following procedures are explained.

Jam Flag:

A jam flag is to indicate the occurrence of a paper jam in the copying machine 1 or in the sheet refeeding unit 100. Under the control of the CPU 80, in the subroutine for detecting a paper jam and reacting to it which is executed at step S12, the jam flag is set when a paper jam is detected, and it is reset when the jammed paper is removed. Under the control of the CPU 90, when a paper jam is detected, the jam flag is set (refer to step S384), and when a jam reaction operation is completed, it is reset (refer to step S392).

Jam A Flag:

When the sheet refeeding unit 100 starts to be supplied with power, a jam A flag indicates that any sheet is left behind in the sheet collecting section 200 in case. This flag is set at step S234 and reset at steps S392 and S412.

Jam B Flag:

A jam B flag indicates that a paper jam takes place while a sheet is traveling in the sheet refeeding unit 100. This flag is set at steps S374, S376, S378 and S381 and reset at step S392.

Copy Flag:

A copy flag indicates that the copying machine 1 is performing a copying operation. This flag is set at step S98 and reset at steps at S111, S116 and S120.

Single Side Mode Flag:

A single side mode flag requests a copying operation in the single side copying mode. This flag is set at steps S23 and S30 and reset at step S27.

Duplex Mode Flag:

A duplex mode flag requests a copying operation of a first image on a first side of each copy sheet in the duplex copying mode. This flag is set at step S27 and reset at steps S23 and S29.

Composite Mode Flag:

A composite mode flag requests a copying operation of a first image in the composite copying mode. This flag is set at step S29 and reset at steps S23 and S30.

Upper Feed Flag:

An upper feed flag requests a supply of copy sheets from the upper cassette 30. This flag is set at step S46 and S412 and reset at steps S45 and S116.

Lower Feed Flag:

A lower feed flag requests a supply of copy sheets from the lower cassette 32. This flag is set at step S45 and reset at steps S46 and S116.

Refeed Start Flag:

A refeed start flag requests a copying operation toward copy sheets fed from the sheet refeeding unit 100. This flag is set at step S116 and reset at steps S120, S366 and S407.

Empty Signal:

An empty signal indicates that there are no sheets in the cassette 30 or 32. This signal is set at step S55 and reset at step S51.

Stop Flag:

A stop flag requests a discontinuance of the current copying operation. This flag is set at steps S53, S66 and S101 and reset at steps S58, S64 and S96.

Judgment Completion Flag:

A judgment completion flag is operated in the duplex copying and in the composite copying, and it indicates that the comparison of the number of copies per original (set number) with the storing capacity (N) of the sheet collecting section 200 has been completed. This flag is set at step S80 and reset at steps S74 and S83.

Copying permission Flag:

A copying permission flag indicates that a copying operation is available with no trouble. Especially, when the storing capacity (N) of the sheet collecting section 200 is less than the set number, this flag is reset to inhibit a copying operation. This flag is set at step S79 and reset at step S80.

Feed Inhibition Signal:

A feed inhibition signal indicates that the belt 240 has been wound around the bobbin 230 to the end, and the following operations are inhibited. This signal is set at step S303 and reset at steps S116 and S412.

Feed Wait Signal:

A feed wait signal indicates that the sheet refeeding unit 100 is not ready for receiving copy sheets, and it inhibits a supply of copy sheets from the feed section. This signal is set at step S227 and reset at steps S249 and S255.

Sheet Existence Flag:

A sheet existence flag is set when a predetermined number of copy sheets are stored in the sheet collecting section 200 (at step S310), and it is reset when all the sheets have been fed out of the sheet collecting section 200 (at steps S308, S363 and S412).

Pre-operation Flag:

When a copying operation is about to start, a pre-operation flag requests a return of the belt 240 in the sheet refeeding unit 100 to the initial position. This flag is set at step S223 and reset at steps S249 and S255.

Stand-by Flag:

A stand-by flag indicates that the belt 240 has returned to the initial position. This flag is set at steps S249 and S255 and reset at step S310.

Drive Request Signal:

A drive request signal requests the CPU 80 to start the main motor M1. This signal is set at steps S227, S293, S323 and S407 and reset at steps S249, S255, S310, S329 and S409.

Rewind Flag:

A rewind flag indicates that the sensor SE4 has detected the stand-by mark 242 and the overrun marks 241 and 241 while the belt 240 is returning to the initial position. This flag is set at steps S246, S252 and S254 and reset at steps S249 and S255.

Position A Flag:

A position A flag indicates that the part L2 of the belt 240 is in the detection point of the sensor SE4. This flag is set at step S246 and reset at step S249

Position B Flag:

A position B Flag indicates that a part of the belt 240 which is downstream of the part L1 in the winding direction, that is, the part LE shown in FIG. 9 is in the detection point of the sensor SE4. This flag is set at steps S252 and S254 and reset at step S255.

Copying Machine Ejection Signal:

A copying machine ejection signal indicates that a copy sheet has been detected by the sensor disposed in the neighborhood of the ejection rollers 38 and 39 in the copying machine 1.

Refeed Flag:

A refeed flag indicates that copy sheets are being fed back to the copying machine 1 from the sheet refeeding unit 100. This flag is set at step S323 and reset at steps S329 and S363.

Transport Permission Signal:

A transport permission signal allows a sheet to be fed out of the refeeding section 320.

Ejection Flag:

An ejection flag indicates that an operator has requested ejection of sheets from the sheet collecting section 200 directly outside. This flag is set at step S407 and reset at step S412.

Control of the Copying Machine

Figure 12:
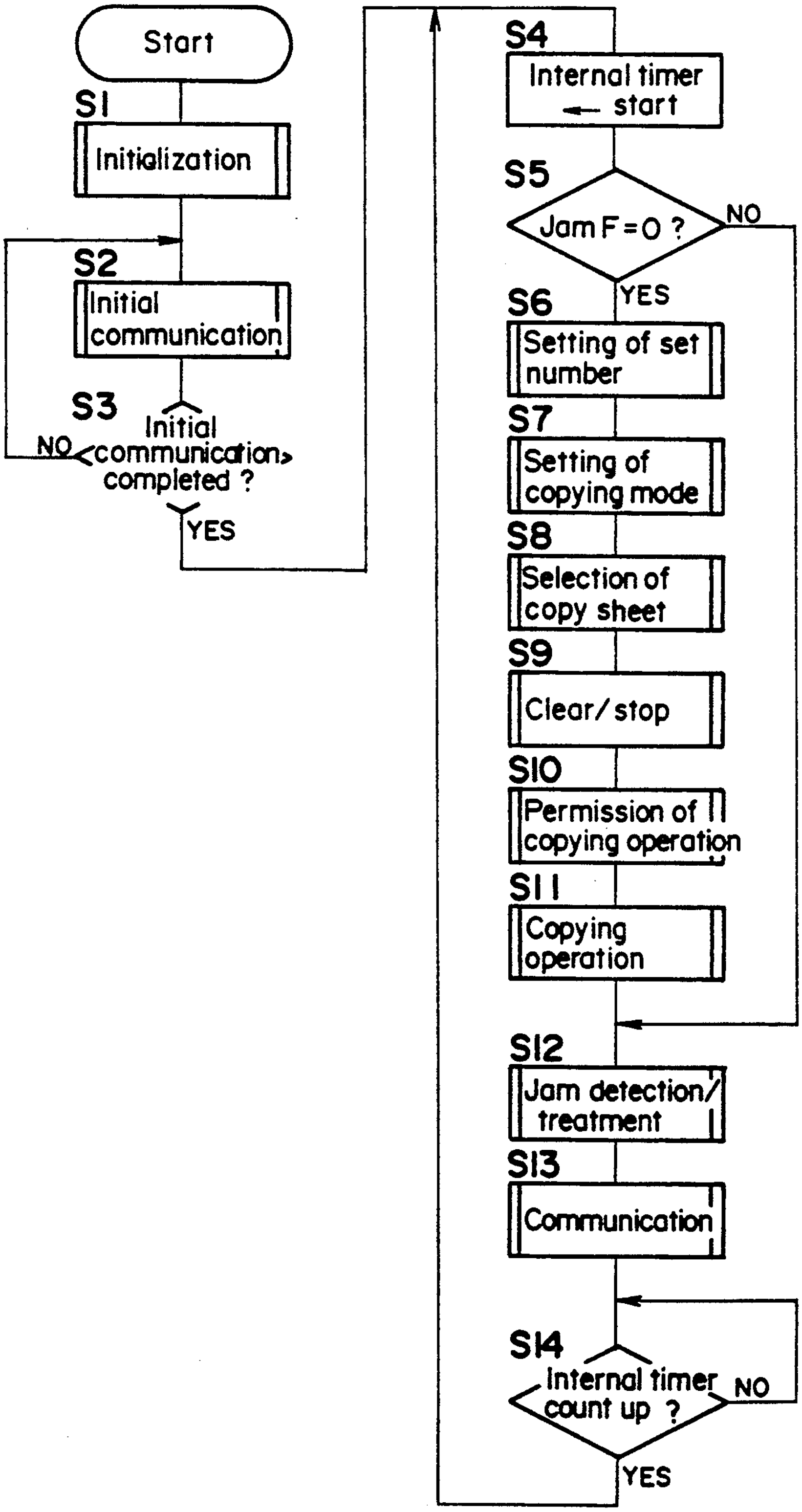
FIG. 12 is a flowchart showing a main routine of a microcomputer controlling the copying machine.

FIG. 12 shows a main routine of the CPU 80.

When power starts to be supplied for the CPU 80, at step S1 the CPU 80 is reset, a random access memory (RAM) is cleared, every register, timer, counter, etc is initialized, and each device is set to the initial mode. Next, at step S2, the CPU 80 communicates with the CPU 90. When the completion of the initial communication is confirmed at step S3, an internal timer is started at step S4. This internal timer determines a time required for one cycle of the main routine, and it is also a standard of timers used in the following subroutines.

At step S5, the jam flag is checked whether "0" or not. When the flag is "1", the processing goes to step S12 immediately, and when the flag is "0", subroutines are called at steps S6 through S13 in order.

At step S6, the number of copies per original set with the ten-key 64 is entered. At step S7, a copying mode (either single side, duplex or composite) selected with the switch 73 is entered. At step S8, a size of copy sheets selected with the switch 69 is entered. A clear or a stop request applied with the switch 63 is entered at step S9. When either the duplex copying mode or the composite copying mode is selected, at step S10 it is judged from the set number of copies whether or not the sheet refeeding unit 100 will be able to receive all copies to be made. Based on the result, the copying operation is allowed or inhibited. At step S11, a copying operation is performed under the selected conditions. At step S12, a paper jam in the copying machine 1 is detected and treated Specifically, a jam timer set at step S11 is checked, and a paper jam is detected as a result, the jam flag is set to "1". Thereafter, the removal of the jammed sheet is confirmed, and the copying machine 1 is reset to an operable state. At step 13, the CPU 80 communicates with the CPU 90.

After the subroutines were called in order, the completion of the internal timer is confirmed at step S14, and the processing returns to step 84.

Figure 13:
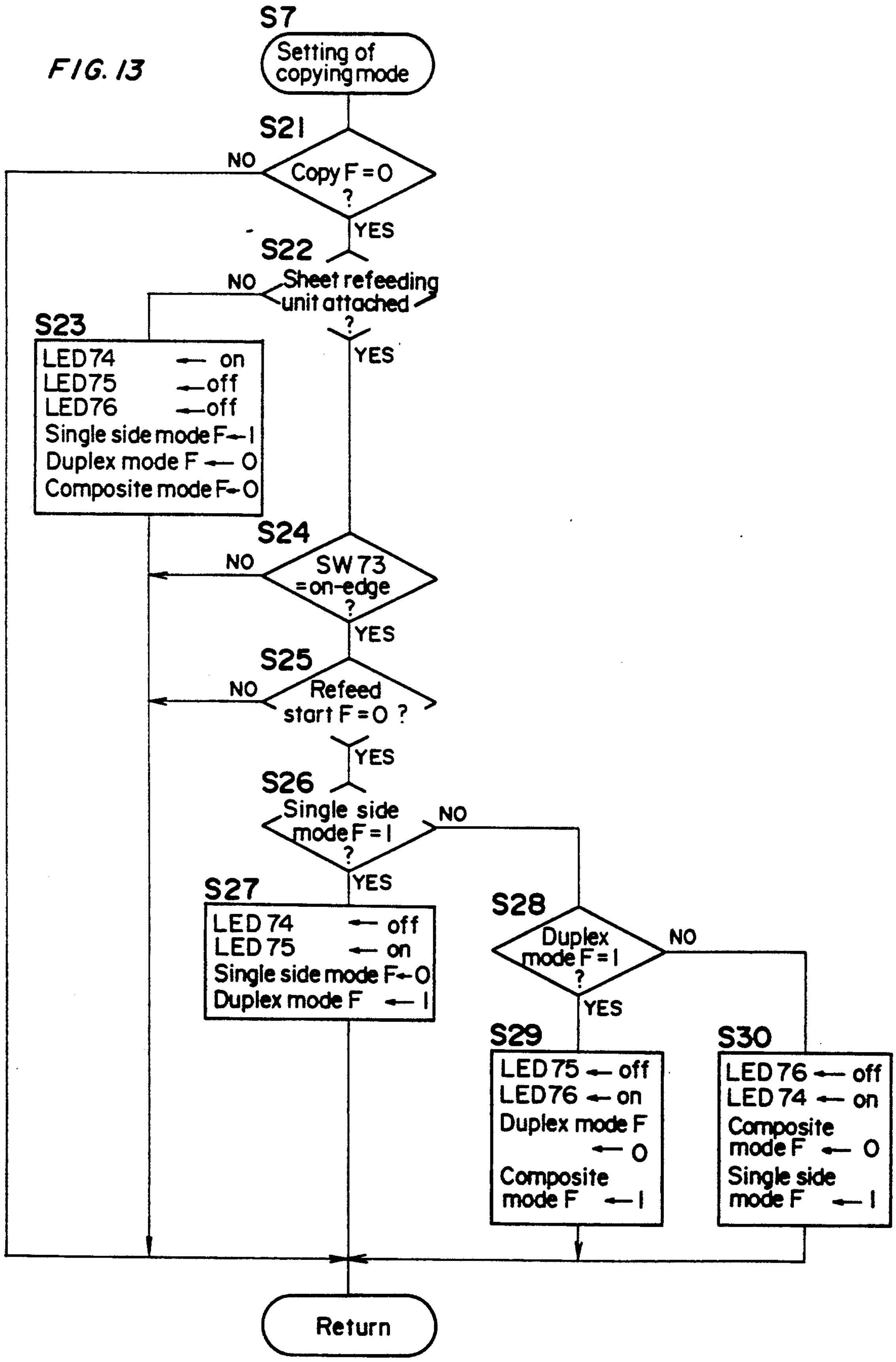
FIG. 13 is a flowchart showing a subroutine for setting a copying mode.

FIG. 13 shows a subroutine for setting a copying mode which is executed at step S7 in the main routine of the CPU 80.

First, it is confirmed at step S21 that the copy flag is "0". Then, at step S22 it is judged from an on/off signal of the microswitch MS whether or not the sheet refeeding unit 100 is attached to the copying machine 1. When the sheet refeeding unit 100 is not attached, at step S23 the LED 74 is turned on, the single side mode flag is set to "1" the LEDs 75 and 76 are turned off, the duplex mode flag and the composite mode flag are reset to "0", and this subroutine is completed. On the other hand, when the sheet refeeding unit 100 is attached, the copying mode selection switch 73 is checked at step S24 whether on-edge or not, and at step S25 the refeed start flag is checked whether "0" or not. When both of the results are "YES", the copying machine 1 is not performing a copying operation ("YES" at step S21), and not going to perform a copying operation of a second image in the duplex or the composite copying mode. In this state, every time the mode selection switch 73 is turned on, the processing follows the steps after step S26 to change the copying mode. The copying mode is initially set to the single side mode, and thereafter it is changed to the duplex mode and then the composite mode in rotation.

Specifically, the single side mode flag is checked at step S26 whether "1" or not. When the flag is "1", at step S27, the LED 74 is turned off, the LED 75 is turned on, the single side mode flag is reset to "0", and the duplex mode flag is set to "1". When the single side mode flag is "0", the duplex mode flag is checked at step S28 whether "1" or not. When the flag is "1", at step S29, the LED 75 is turned off, the LED 76 is turned on, the duplex mode flag is reset to "0", and the composite mode flag is set to "1". When the single side mode flag and the duplex mode flag are both "0", at step S30, the LED 76 is turned off, the LED 74 is turned on, the composite mode flag is reset to "0", and the single side mode flag is set to "1".

Figure 14A:
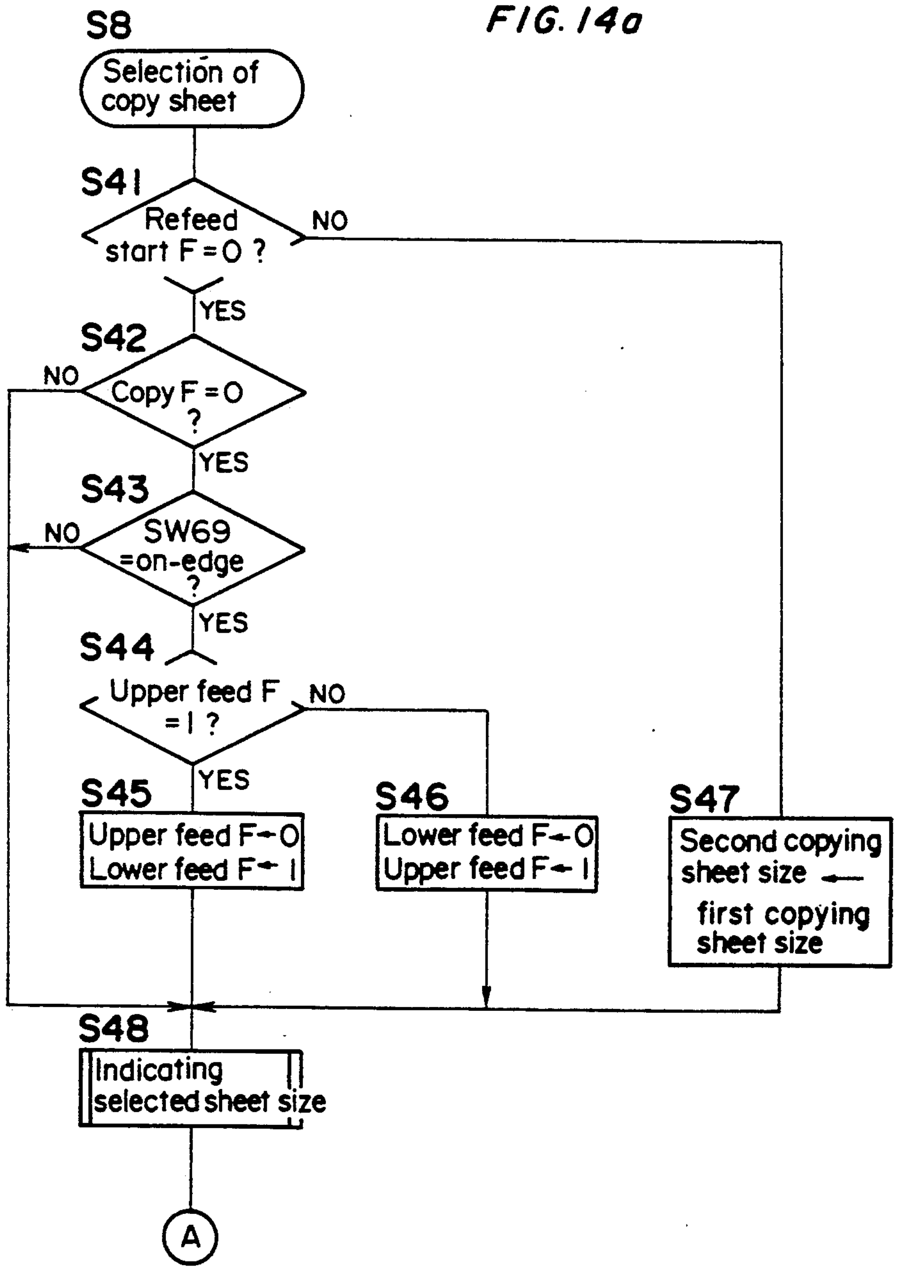
FIGS. 14*a* and 14*b* are flowcharts showing a subroutine for selecting a size of copy sheets.
Figure 14B:
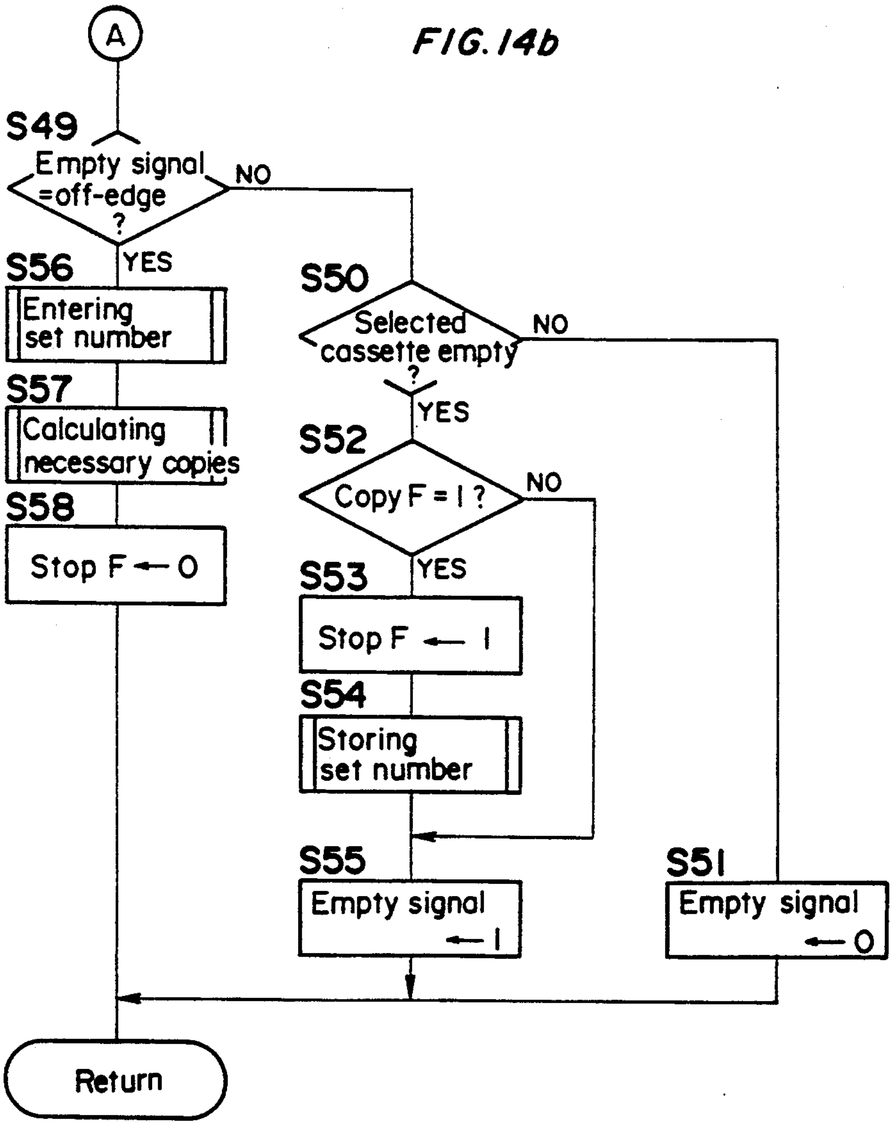

FIGS. 14*a* and 14*b* show a subroutine for selecting a size of copy sheets, which is executed at step S8 in the main routine of the CPU 80.

First, the refeed start flag is checked at step S41 whether "0" or not. When the flag is "0", it is checked at step S42 that the copy flag is "0". Then, the sheet size selection switch 69 is checked at step S43 whether on-edge or not. When it is on-edge, the resource of copy sheets is changed to the upper or the lower cassette alternatively Specifically, when the upper feed flag is judged "1" at step S44, the upper feed flag is reset to "0" at step S45, and the lower feed flag is set to "1". On the other hand, when the upper feed flag is judged "0" at step S44, at step S46, the lower feed flag is reset to "0", and the upper feed flag is set to "1". Then, at step S48, the size of copy sheets stored in the selected cassette is indicated on the LED group 70. When the results at steps S42 and S43 are "NO", the processing follows the step S48.

On the other hand, when the refeed start flag is judged "1" at step S41, a copying operation toward copy sheets fed from the refeeding unit 100 is about to start. Therefore, the size of copy sheets used in the copying operation of a first image is entered into the RAM as the sheet size in the copying operation of a second image at step S47, and the processing goes to step S48.

Next, at step S49 the empty signal is checked whether off-edge or not. When it is not off-edge, which means that is not a moment copy sheets have been loaded in the selected cassette, the processing goes to step S50 to check whether or not there are copy sheets in the selected cassette. When there are copy sheets in the cassette, at step S51 the empty signal is reset to "0". However, when there are no copy sheets in the selected cassette, the processing goes to step S52 to check the copy flag whether "1" or not. When the flag is "1", which means a copying operation is performed, at step S53 the stop flag is set to "1" to discontinue the operation, and at step S54 the set number (the predetermined number of copies) is stored in the RAM. Then, the empty signal is set to "1" at step S55.

When the empty signal is judged off-edge at step S49, which means copy sheets have been loaded in the cassette, the set number which was stored in the RAM at step S54 is entered at step S56 Then, at step S57 it is calculated how many more copies are necessary, and at step S58 the stop flag is reset to "0" in order to resume the copying operation.

Figure 15:
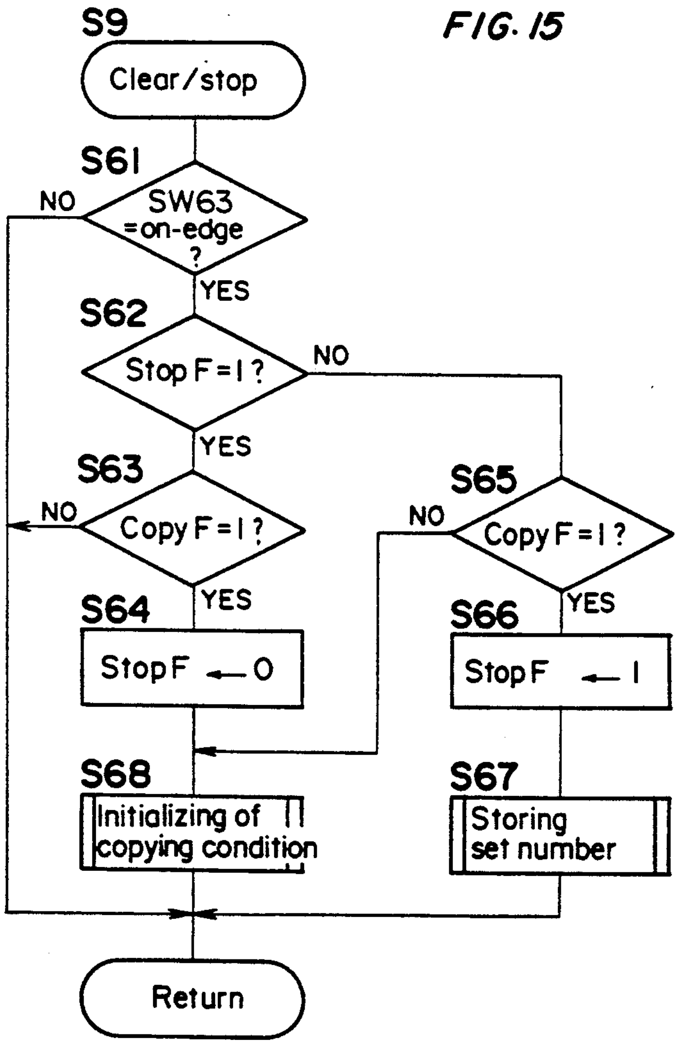
FIG. 15 is a flowchart showing a subroutine for judging the condition of a clear/stop switch.

FIG. 15 shows a subroutine for discontinuing a copying operation and changing copying conditions according to the state of the clear/stop switch 63, which is executed at step S9 in the main routine of the CPU 80.

The clear/stop switch 63 has the following functions.

(1) In a case that a copying operation is not performed, every time the clear/stop switch 63 is turned on, the copying conditions are reset to the initial ones.

(2) During a copying operation, when the clear/stop switch 63 is turned on for the first time, the copying operation is discontinued. When it is turned on for the second time, the copying conditions are reset to the initial ones. When the print switch 61 is turned on after the clear/stop switch 63 was turned on for the first time, the copying operation is resumed.

(3) In a case that the feed cassette is emptied of copy sheets during a copying operation of a first image in either the duplex or the composite copying mode, when the clear/stop switch 63 is turned on, the copying conditions are set for a copying operation of a second image. In addition, when the print switch 61 is turned on after copy sheets were loaded in the cassette, the copying operation of the first image is resumed.

In this subroutine, when the switch 63 is judged on-edge at step S61, the processing goes to step S62 to check the stop flag whether "1" or not. When the flag is "1", at step S63 the copy flag is checked whether "0" or not. When the flag is "0" at step S63, which means a copying operation is performed, at step S64 the stop flag is reset to "0", and at step S68 the copying conditions are reset to the initial ones.

When the stop flag is "0" ("NO" at step 862), and also the copy flag is judged "0" at step S65, the processing goes to step S68. When the copy flag is judged "1" at step S65, which means a copying operation is performed, at step S66 the stop flag is set to "1", and at step S67 the set number (the predetermined number of copies) is stored in the RAM.

Figure 16:
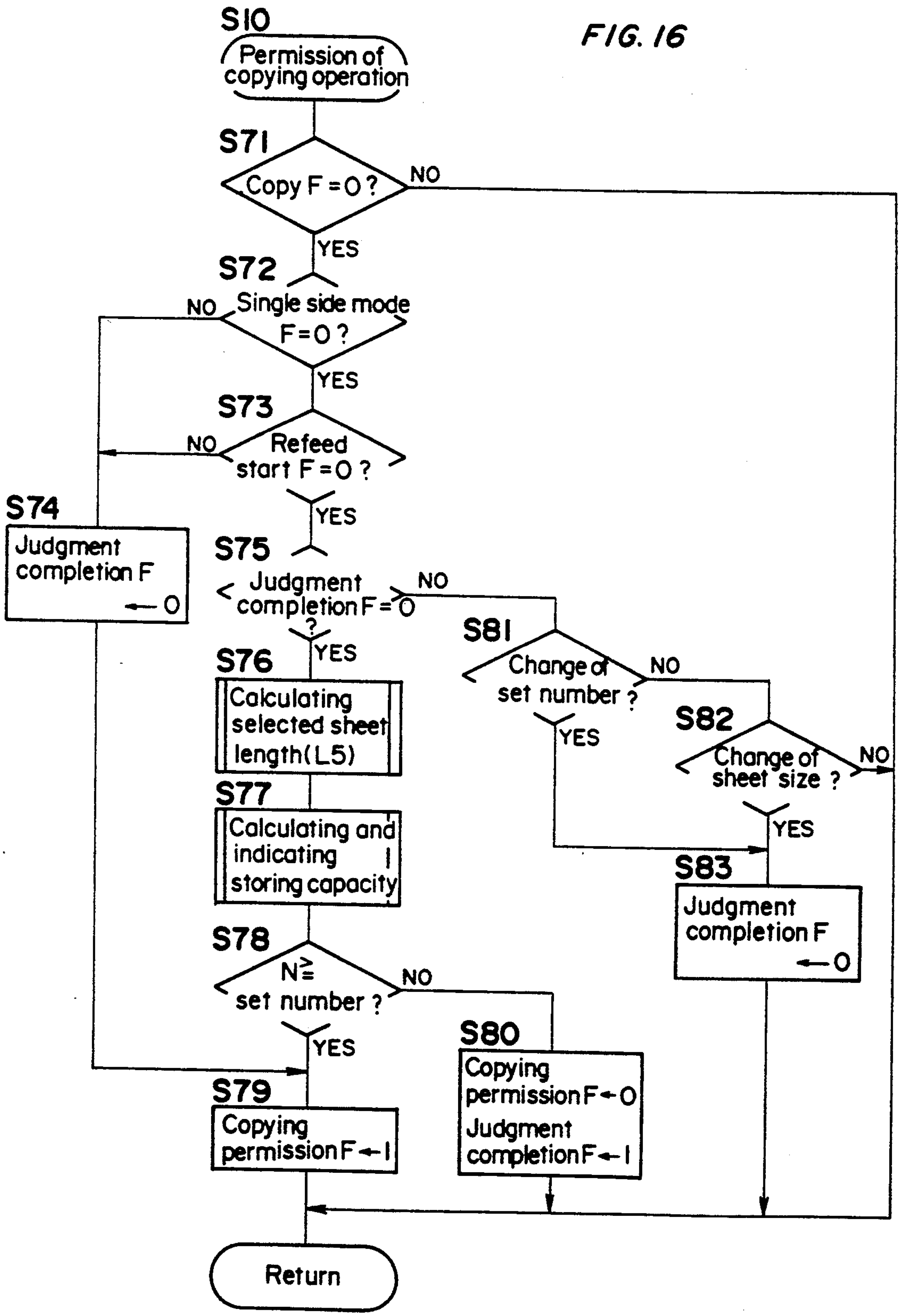
FIG. 16 is a flowchart showing a subroutine for judging whether a copying operation is inhibited or permitted.

FIG. 16 shows a subroutine for judging whether or not to allow a copying operation to start, which is executed at step S10 in the main routine of the CPU 80.

In this subroutine, it is judged whether or not the sheet collecting section 200 has a capacity enough to receive the number of copies determined at the time of selecting the duplex or the composite copying mode.

When the copy flag is judged "0" at step S71, which means a copying operation is not performed, the following steps are executed. The single side mode flag is checked whether "0" or not at step S72, and the refeed start flag is flags is "1", that is, when the single side copying mode is selected, or when a copying operation of a first image in either the duplex or the composite copying mode has been completed, at step S74 the judgment completion flag is reset to "0", and at step S79 the copying permission flag is set to "1".

On the other hand, when the results at steps S72 and S73 are both "YES", that is, before a copying operation of a first image in the duplex or the composite copying mode is started, at step S75, the judgment completion flag is checked whether "0" or not. When the flag is "0", the length (L5) of selected copy sheets is calculated at step S76, and at step S77, how many copy sheets (N) will be able to be stored in the sheet collecting section 200 is calculated as follows.

$$N = L4/(L5 + L6) \quad (1)$$

L4: significant length of the belt 240 (distance between the stand-by mark 242 and the end mark 243)

L5: length of the copy sheets to be stored in the sheet collecting section 200 in the direction of the transport L6: intervals among copy sheets while they are traveling to the sheet collecting section 200

Further, information of L4 and L6 is transmitted from the CPU 90 to the CPU 80 at step S2.

Next, the storing capacity (N) calculated according to the equation (1) is compared with the set number (predetermined number of copies) at step S78. When the capacity (N) is the same or over the set number, at step S79 the copying permission flag is set to "1". When the capacity (N) is smaller than the set number, at step S80 the copying permission flag is reset to "0" to inhibit the copying operation, and the judgment completion flag is set to "1".

Further, even after the judgment above was completed, when the set number or the size of copy sheets is changed, the same judgment is repeated. Specifically, when the judgment completion flag is judged "1" at step S75, it is checked at step S81 whether or not the set number has been changed, and it is checked at step S82 whether or not the size of copy sheets has been changed. When either one of the results is "YES", the judgment completion flag is reset to "0" at step S83.

Figure 17A:
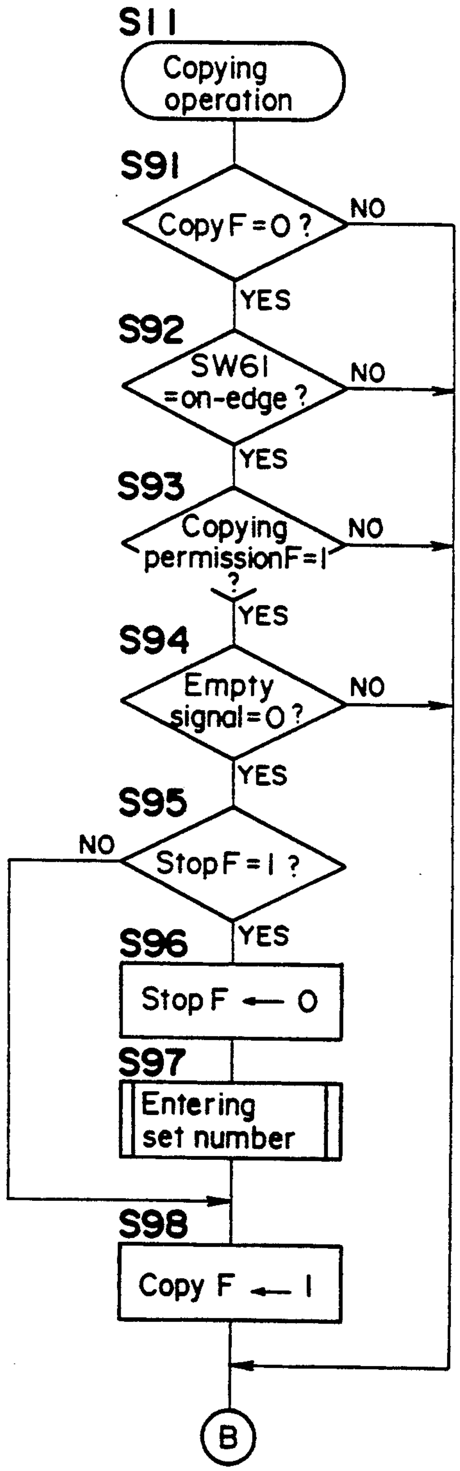
FIGS. 17*a*, 17*b*, and 17*c* are flowcharts showing a subroutine for performing a copying operation.
Figure 17B:
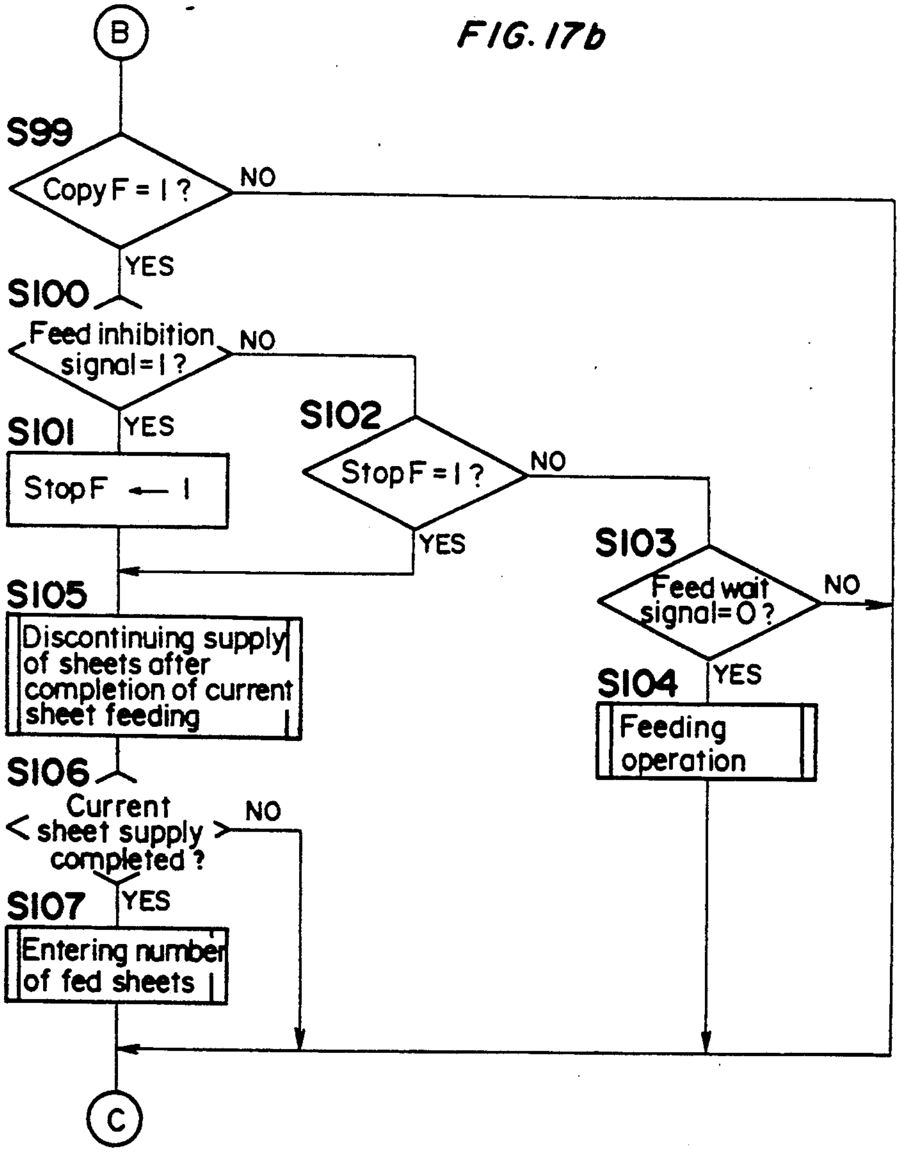
Figure 17C:
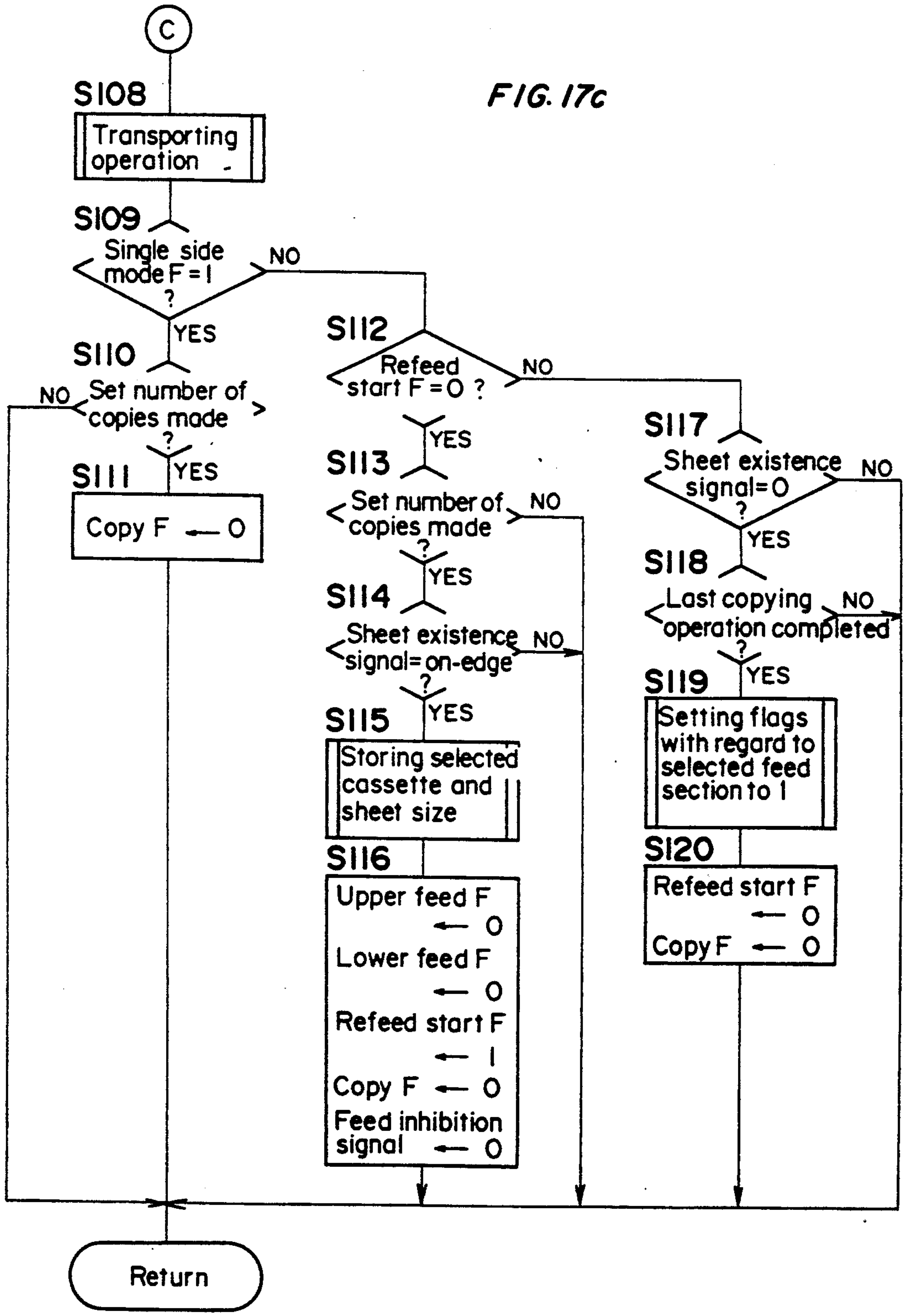

FIGS. 17*a*, 17*b* and 17*c* show a subroutine for performing a copying operation, which is executed at step S11 of the main routine of the CPU 80.

First, at step S91 the copy flag is checked whether "0" or not. When the flag is "0", which means a copying operation is not performed, at step S92 the print switch 61 is checked whether on-edge or not. When the print switch 61 is on-edge, at step S93 the copying permission flag is checked whether "1" or not, and further when the flag is "1", at step S94 the empty signal is checked whether "0" or not. When the empty signal is "0", at step 895 the stop flag is checked whether "1" or not. When the flag is "1", at step S96 the stop flag is reset to "0", and at step S97 the set number (predetermined number of copies) is entered and it is calculated how many more copies have to be made. Then, at step S98 the copy flag is set to "1". When the stop flag is judged "0" at step S95, the processing goes to step S98 immediately.

Next, the copy flag is checked whether "1" or not at step S99. When the flag is "0", the processing goes to step S108 immediately. When the copy flag is "1", at step S100 the feed inhibition signal is checked whether "1" or not. When the signal is "1", which means any trouble has occurred in the sheet refeeding unit 100, at step S101 the stop flag is set to "1", and at step S105 the supply of copy sheets from the feed section is discontinued after the current feeding of the copy sheet has been completed. Also, when the feed inhibition signal is judged "0" at step S100, the stop flag is checked whether "1" or not at step S102, and when the flag is judged "1", the processing goes to step S105. Next, when it is confirmed at step S106 that the supply of copy sheets has been discontinued, at step S107 the number of copy sheets which have been fed to the image transfer section is entered, and the processing goes to step S108.

On the other hand, the stop flag is judged "0" at step S102, at step S103 the feed wait signal is checked whether "0" or not. When the signal is "0", at step S104 a supply of copy sheets from a selected cassette 30 or 32 is started, and the processing goes to step S108. When the feed wait signal is "1", the processing goes to step S108 immediately.

Next, at step S108 the copying operation and the sheet transporting operation are executed so that an image is formed on a fed sheet. Thereafter, at step S109 the single side mode flag is checked whether "1" or not. When the flag is "1", which means the current copying operation is performed in the single side copying mode, at step S110 it is judged whether or not the set number of copies have been made. When the set number of copies have been made, at step S111 the copy flag is reset to "0".

When the single side mode flag is judged "0" at step S109, which means the current copying operation is performed in either the duplex or the composite copying mode, at step S112 the refeed start flag is checked whether "0" or not. When the flag is "0", which means the current operation is a copying operation of a first image, it is judged at step S113 whether or not the set number of copies have been made. When the set number of copies have been made, at step S114 the sheet existence signal is checked whether on-edge or not. When the signal is on-edge, which means all the copies have been stored in the sheet collecting section 200, at step S115 the selected cassette and the sheet size are stored in the RAM. Further, at step S116 the upper and the lower feed flags are reset to "0", the refeed start flag is set to "1", the copy flag and the feed inhibition signal are reset to "0", and this subroutine is completed.

On the other hand, when the refeed start flag is judged "1" at step S112, which means the current operation is the copying operation of a second image, at step S117 the sheet existence signal is checked whether "0" or not. When the signal is "0", which means all the copy sheets have been fed out of the sheet collecting section 200, it is checked at step S118 whether or not the second image has been copied onto the last copy sheet fed out of the sheet collecting section 200. When it is confirmed that the last sheet has obtained the second image, at step S119 the flags with regard to the selected feed section are set to "1". Further, at step S120 the refeed start flag and the copy flag are reset to "0", and this subroutine is completed.

Control of the Sheet Refeeding Unit

Figure 18:
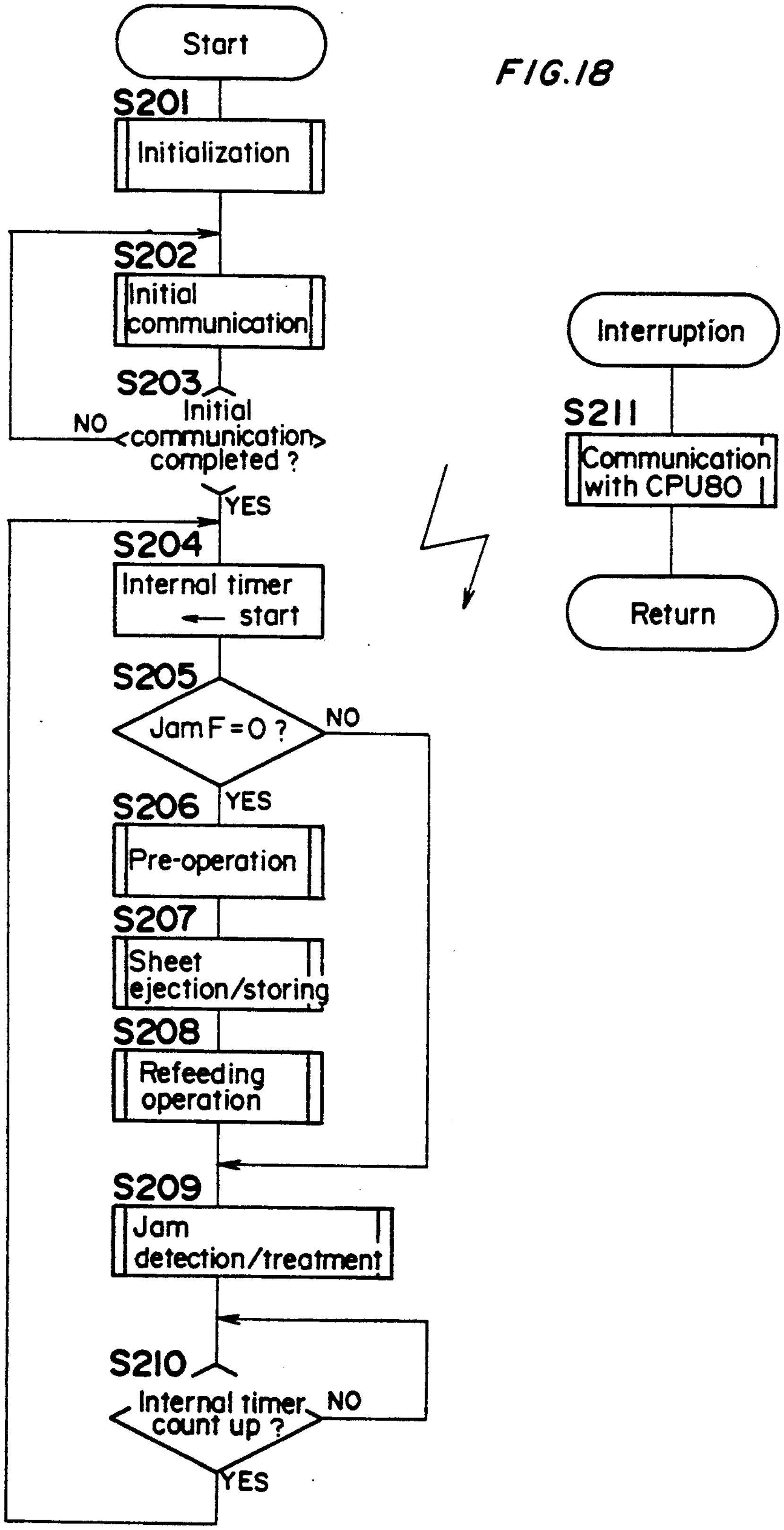
FIG. 18 is a flowchart showing a main routine of a microcomputer controlling the sheet refeeding unit.

FIG. 18 shows a main routine of the CPU 90

When the CPU 90 starts to be supplied with power, at step S201 the CPU 90 is reset, a random access memory (RAM) is cleared, registers, timers, counters, etc. are initialized, and every device is set to the initial mode. Next, at step S202 the CPU 90 communicates with the CPU 80. When the completion of the initial communication is confirmed at step S203, at step S204 an internal timer is started. This internal timer has the same functions as the internal timer of the CPU 80.

At step S205 the jam flag is checked whether "0" or not. When the flag is "1", the processing goes to step S209 immediately. When the jam flag is "0", subroutines are called at steps S206 through S209 in order.

At step S206, the belt 240 is returned to the initial position before a supply of copy sheets in the copying machine 1. At step S207, copy sheets are ejected to either the tray 175, the sorter 400 or stored in the sheet collecting section 200. At step S208, copy sheets are fed out of the sheet collecting section 200 one by one. At step S209, a paper jam in the sheet refeeding unit 100 is detected and treated.

All the subroutines are called, and when the completion of the internal timer is confirmed at step S210, the processing returns to step S204.

Further, when the CPU 80 makes an interruption request, at step S211 the CP0 90 communicates with the CPU 80.

Figure 19A:
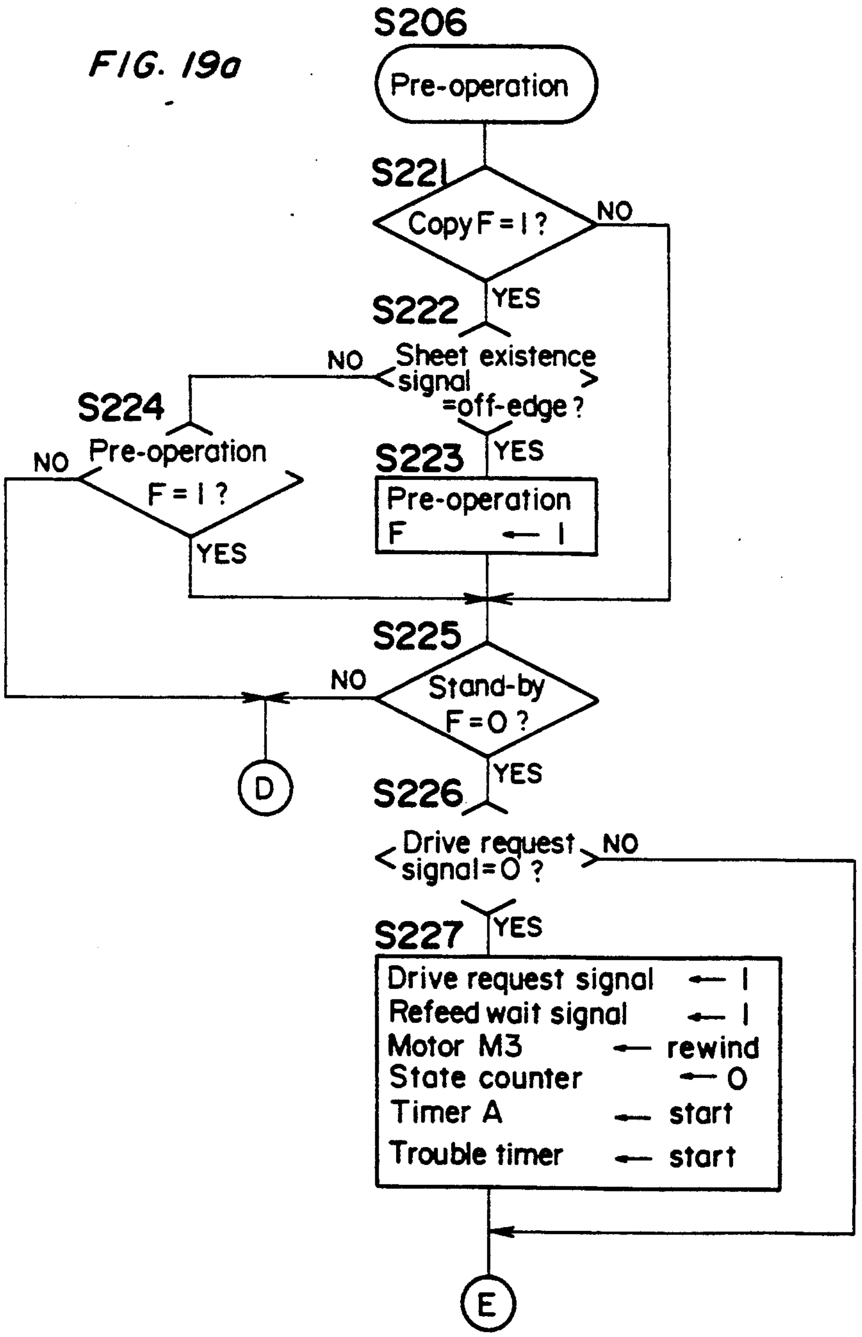
FIGS. 19*a* and 19*b* are flowcharts showing a subroutine for operating the sheet refeeding unit preliminary.
Figure 19B:
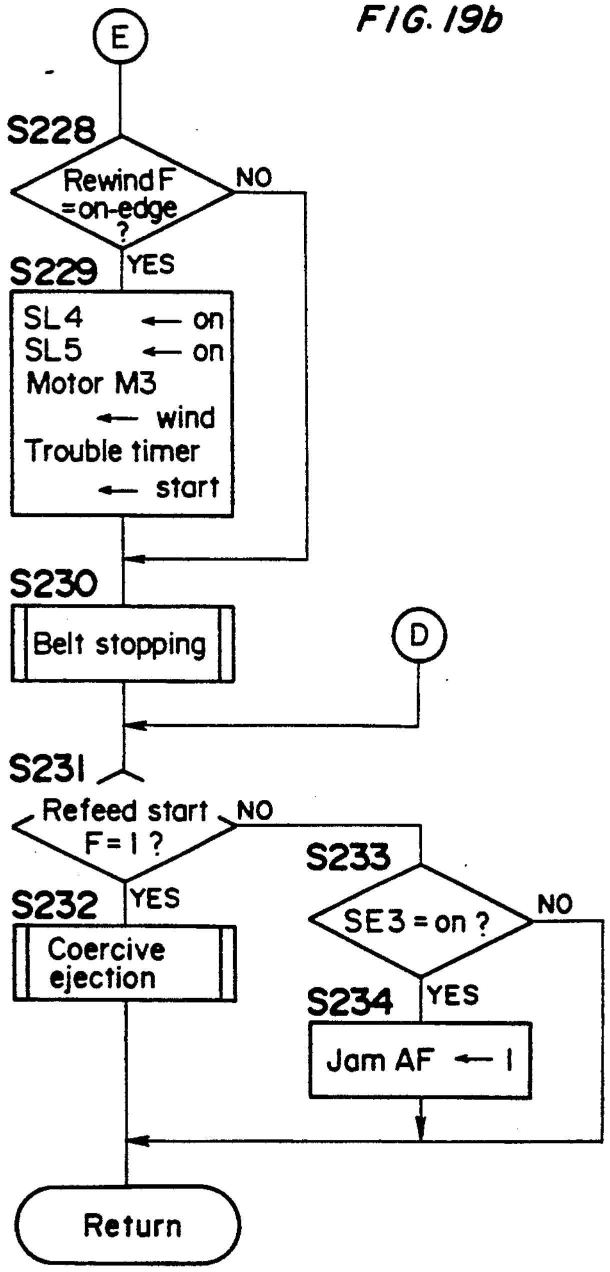

FIGS. 19*a* and 19*b* show a subroutine for arranging the condition of the sheet refeeding unit 100 preliminary, which is executed at step S206 in the main routine of the CPU 90.

First, at step S221 the copy flag is checked whether "1" or not. When the flag is "0", the processing goes to step S225. When the copy flag is "1", at step S222 the sheet existence signal is checked whether off-edge or not. When the signal is off-edge, which means all the copy sheets have been fed out of the sheet collecting section 200, at step S223 the pre-operation flag is set to "1", and the processing goes to step S225. When the sheet existence signal is not off-edge, at step S224 the pre-operation flag is checked whether "1" or not. When the flag is "1", the processing goes to step S225, and when the pre-operation flag is "0", the processing goes to step S231.

At step S225 the stand-by flag is checked whether "0" or not. When the flag is "1", which means the belt 240 has been already returned to the initial position, the processing goes to step S231 immediately When the stand-by flag is "0", at step S226 the drive request signal is checked whether "0" or not. When the signal is "0", at step S227 the drive request signal and the feed wait signal are set to 1, and the motor M3 is driven in order to rewind the belt 240. Simultaneously, a state counter used in the following steps (S230) is reset to "0", and a timer A and a trouble timer are started. In this moment, the bobbin 235 is rotated in the direction of the arrow (m), and accordingly the belt 240 is getting rolled around the bobbin 235. The belt 240 which started to be rolled around the bobbin 235 at step S227 overruns the initial position once, and thereafter the bobbin 230 pulls the belt 240 to put the belt 240 in the initial position while the processing follows steps S228 through S230 as described later. The timer A will be explained in detail together with the explanation of a subroutine to be executed at step S230 (refer to FIGS. 20*a* and 20*b*). When the belt 240 does not move after the motor M3 was driven within a certain time, which is set in the trouble timer, it is judged that a trouble has occurred.

Next, at step S228 the rewind flag is checked whether on-edge or not. The on-edge of the rewind flag means it has been confirmed at step S230, which will be described later, that either the stand-by mark 242 or the overrun mark 241 of the belt 240 has been detected by the sensor SL4. Therefore, when the rewind flag is on-edge, at step S229 the solenoids SL4 and SL5 are turned on, the motor M3 is driven to move the belt 240 toward the bobbin 230, and the trouble timer is started. Thereby, the bobbin 230 is rotated in the direction of the arrow (m), and the belt 240 is getting rolled around the bobbin 230. Then, at step S230, the subroutine for stopping the belt 240 at the initial position is executed.

At step S231 the refeed start flag is checked whether "1" or not. When the flag is "1", at step S232 a subroutine for ejecting copy sheets from the sheet collecting section 200 outside coercively at the request of an operator is called. When the refeed start flag is "0", at step S233 the sensor SE3 is checked whether on or not.

When the sensor SE3 is on, it is judged that the sheet existence signal is reset because the supply of power was discontinued before or during a copying operation of a second image. Accordingly, at step S234 the jam A flag is set to "1".

Figure 20A:
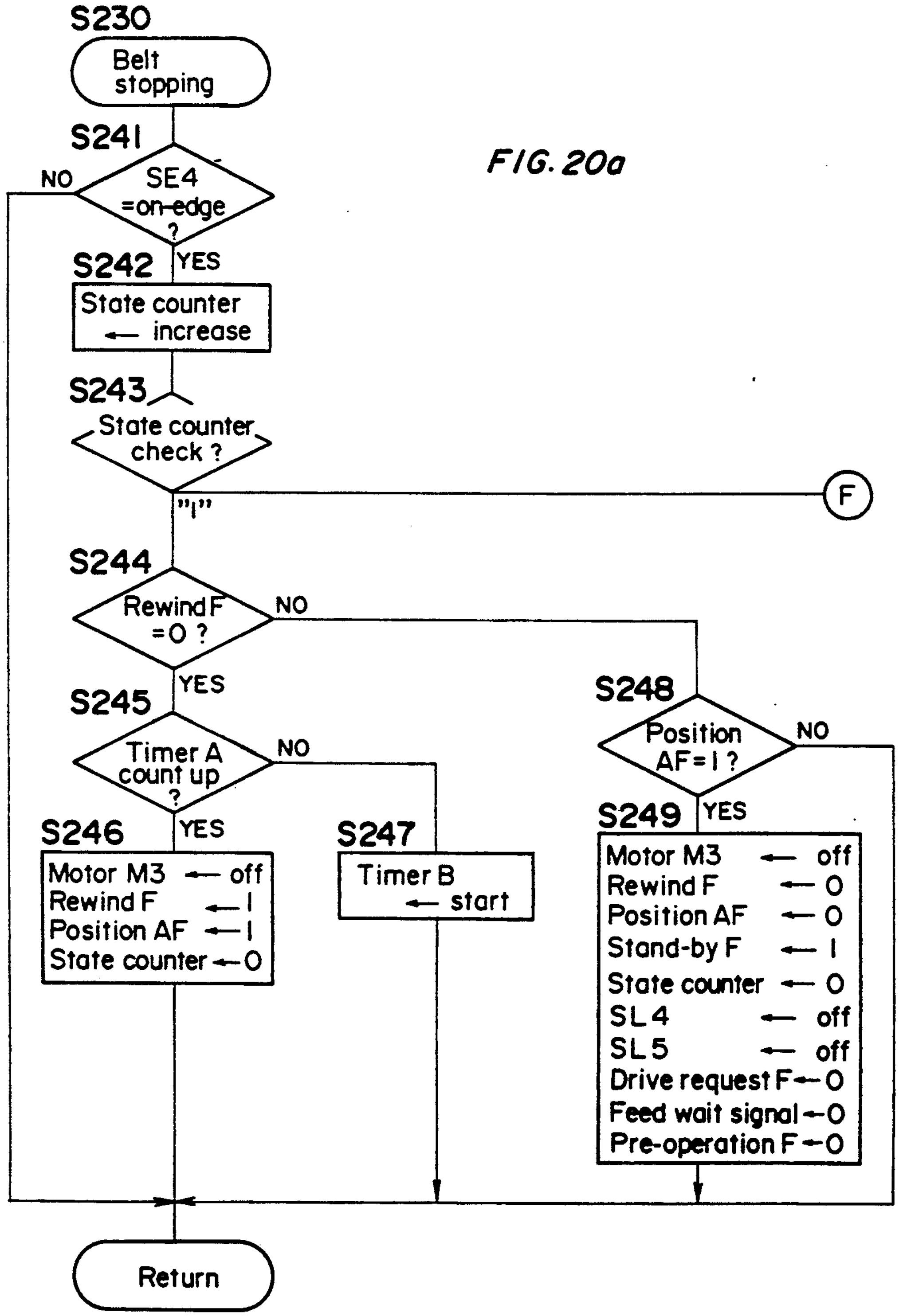
FIGS. 20*a* and 20*b* are flowcharts showing a subroutine for stopping the belt the initial position.
Figure 20B:
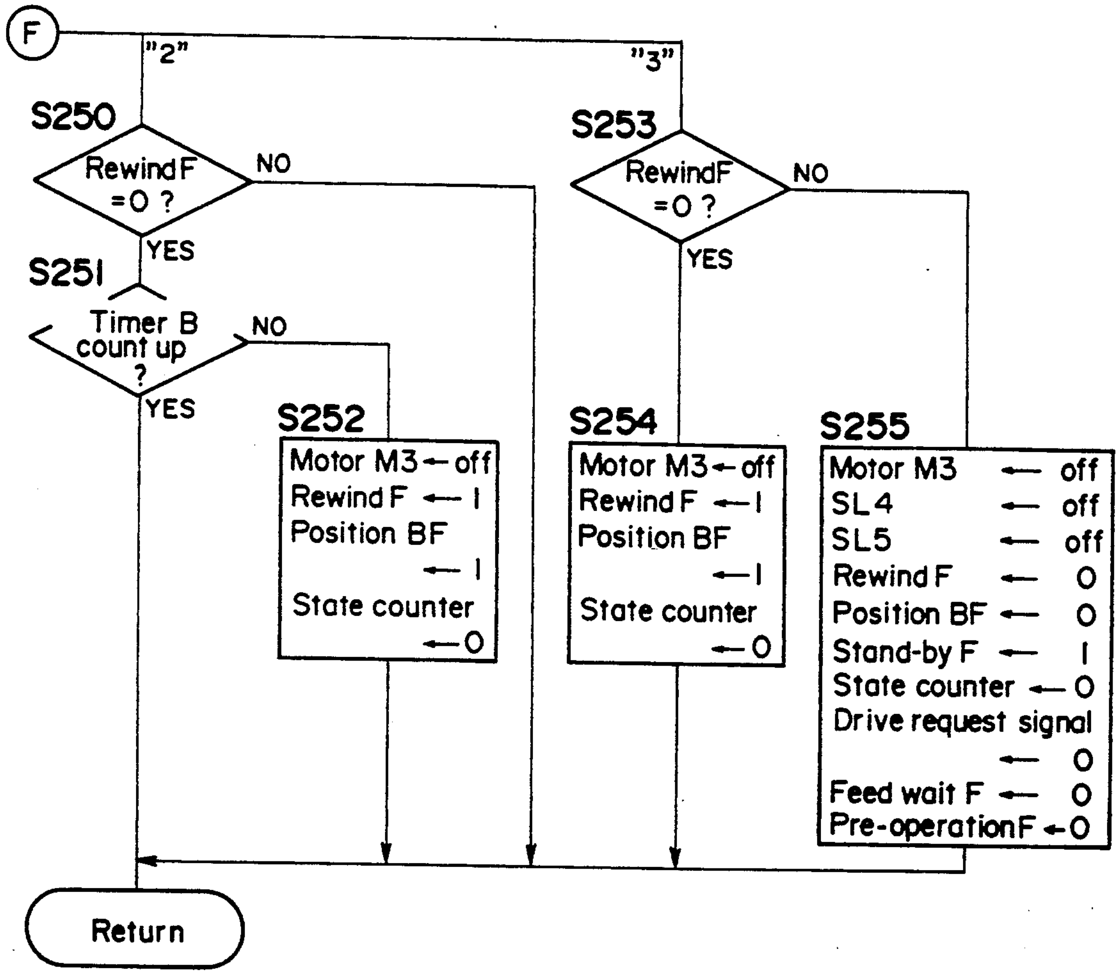

FIGS. 20*a* and 20*b* show the subroutine for stopping the belt 240 at the initial position, which is called at step S230 in the pre-operation subroutine to be executed at step S206 in the main routine.

In this subroutine, the motor M3 is turned off which was driven at steps S227 and step S229. Times to be set in timers A and B used in this subroutine are determined as follows.

$$\text{timer } A > L2/V \quad (2)$$

$$\text{timer } A > \text{timer } B > L1/V \quad (3)$$

V:travel speed of the belt 240

L1: interval between the lines of the overrun mark 241

L2: distance between the stand-by mark 242 and the overrun mark 241

Every time the sensor SE4 is judged on-edge at step S241 by detecting both the marks 241 and 242, at step S242 the state counter gains an increment, and the value of the state counter is checked at step S243. According to the value of the state counter, the processing follows the following control procedure.

When the value of the state counter is "1", which means the sensor SE4 has been judged on-edge for the first time after the motor M3 was driven to rewind the belt 240, at step S244 the rewind flag is checked whether "0" or not. When the flag is "0", it is checked at step S245 whether or not the timer A completes counting. When the timer A is confirmed complete counting at step S245, it is judged that a point downstream of the stand-by mark 242 of the belt 240 (a point within the part L4 of the belt 240) faced the detection point of the sensor SE4 before the motor M3 was driven to rewind the belt 240. In other words, the first on-edge of the sensor SE4 is judged the detection of the stand-by mark 242. Accordingly, at step S246 the motor M3 is turned off, the rewind flag and the position A flag are set to "1", and the state counter is reset to "0".

Further, there is a slight time lag between the time when the sensor SE4 has detected the stand-by mark 242 and the time when the motor M3 and the belt 240 actually stop because of the time required for operating in the CPU 90, the inertia of the drive mechanism and so on. Specifically, after the sensor SE4 detected the stand-by mark 242, the belt 240 moves by a distance which is a little longer than the width L0 of the stand-by mark 242 and stops. As described later, in stopping the motor M3 when the sensor SE4 detects the overrun mark 241, the belt 240 actually stops when the overrun mark 241 passes through the detection point of the SE4, likewise.

When the timer A is not confirmed complete counting at step S245, it is judged a point within the part L2 or a point slightly downstream of the part L2 of the belt 240 faced the detection point of the sensor SE4 before the motor M3 was driven. Then, at step S247 the timer B is started.

When the rewind flag is judged "1" at step S244, it is confirmed at step S248 that the position A flag is "1", and at step S249 the motor M3 is turned off. Thereby, the rewind of the belt 240 is stopped. Simultaneously, the rewind flag and the position A flag are reset to "0", the stand-by flag is set to "1", and the state counter is reset to "0". Also, the solenoids SL4 and SL5 are turned off, and the drive request signal, the feed wait signal and the pre-operation flag are reset to "0".

When the value of the state counter becomes "2" after the timer B was started at step S247, that is, when the second on-edge of the sensor SE4 is detected, it is confirmed at step S250 that the rewind flag is "0", and it is checked at step S251 whether or not the timer B completes counting. When the timer B is detected complete counting at step S251, he processing repeats the same procedure till the third on-edge of the SE4 is detected. When the timer B is not detected complete counting at step S251, it is judged that a point within the part L2 of the belt 240 faced the detection point of the sensor SE4 before the motor M3 was driven. At step S252 the motor M3 is turned off, and thereby the rewind of the belt 240 is stopped. At the same time, the rewind flag and the position B flag are set to "1", and the state counter is reset to "0".

When the value of the state counter becomes "3" after the timer B was detected complete counting, that is, when the third on-edge of the sensor SE4 is detected, at step S253 the rewind flag is checked whether "0" or not. When the flag is "0", at step S254 the motor M3 is turned off, the rewind flag and the position B flag are set to "1", and the state counter is reset to "0". When the rewind flag is "1", at step S255 the motor M3 is turned off, the solenoids SL4 and SL5 are turned off, the rewind flag and the position B flag are reset to "0", and the stand-by flag is set to "1". Also, the state counter is reset to "0", and the drive request signal, the feed wait signal, the pre-operation flag are reset to "0".

Figure 21:
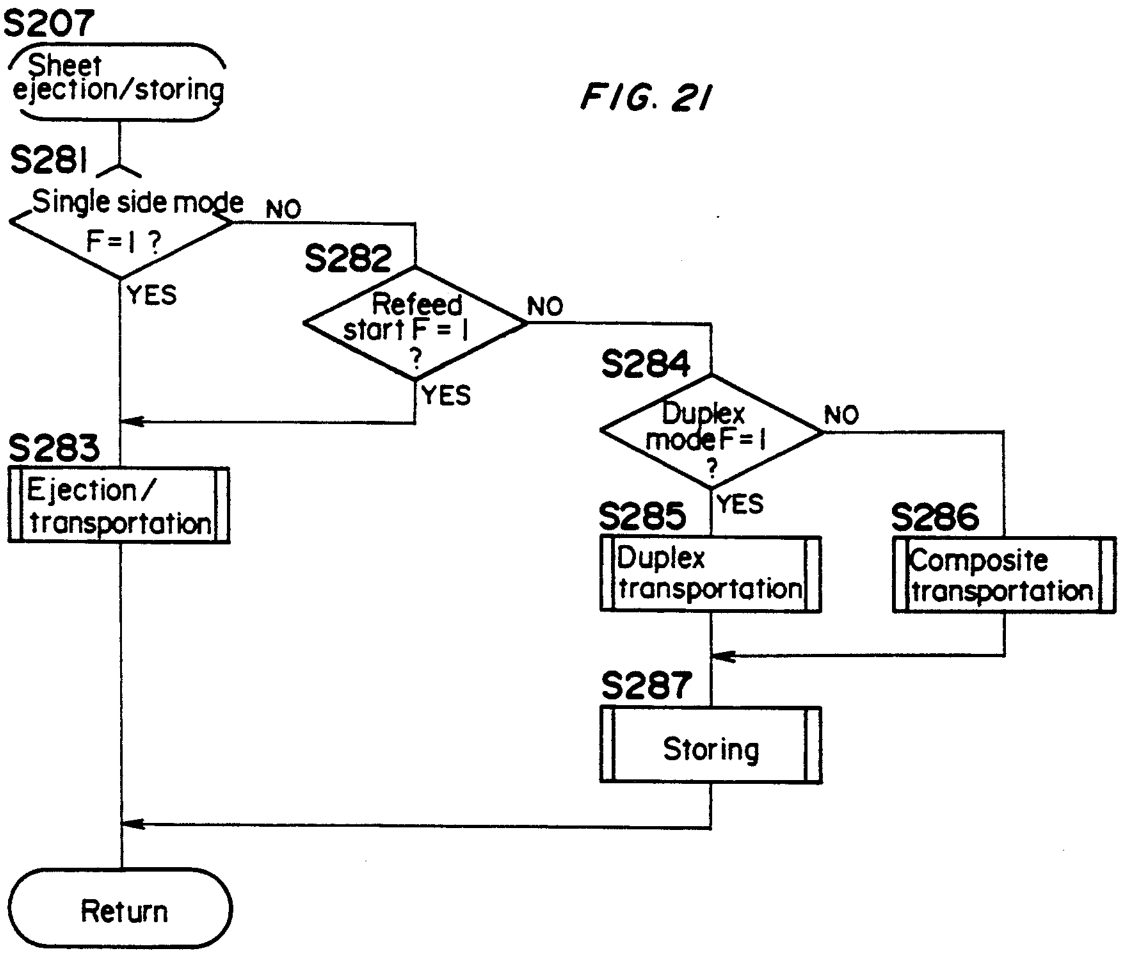
FIG. 21 is a flowchart showing a subroutine for ejecting copy sheets to a tray or a sorter and transporting the sheets to a sheet collecting section.

FIG. 21 shows the subroutine for ejecting copy sheets to the tray 175 or the sorter 400 and transporting them to the sheet collecting section 200, which is executed at step S207 in the main routine of the CPU 90

Basically, the single side mode flag, the refeed start flag and the duplex mode flag are checked at steps S281, S282 and S284 respectively to judge the current copying mode, and according to the copying mode, the processing follows the following control procedure.

During a copying operation in the single side copying mode ("YES" at step S281) and during a copying operation of a second image either in the duplex or the composite copying mode ("YES" at step S282), at step S283 copy sheets are ejected to either the tray 175 or the sorter 400 directly. During a copying operation of a first image in the duplex copying mode ("YES" at step S284), at step S285 copy sheets are transported to the sheet collecting section 200, and at step S287 the sheets are stored therein. During a copying operation of a first image in the composite copying mode ("NO" at step S284), at step S286 copy sheets are switchbacked by the ejection rollers 135 and 136, turned over and transported to the sheet collecting section 200, and at step S287 the sheets are stored therein.

Further, the detailed description of the control procedure at steps S283, S285 and S286 is omitted.

Figure 22A:
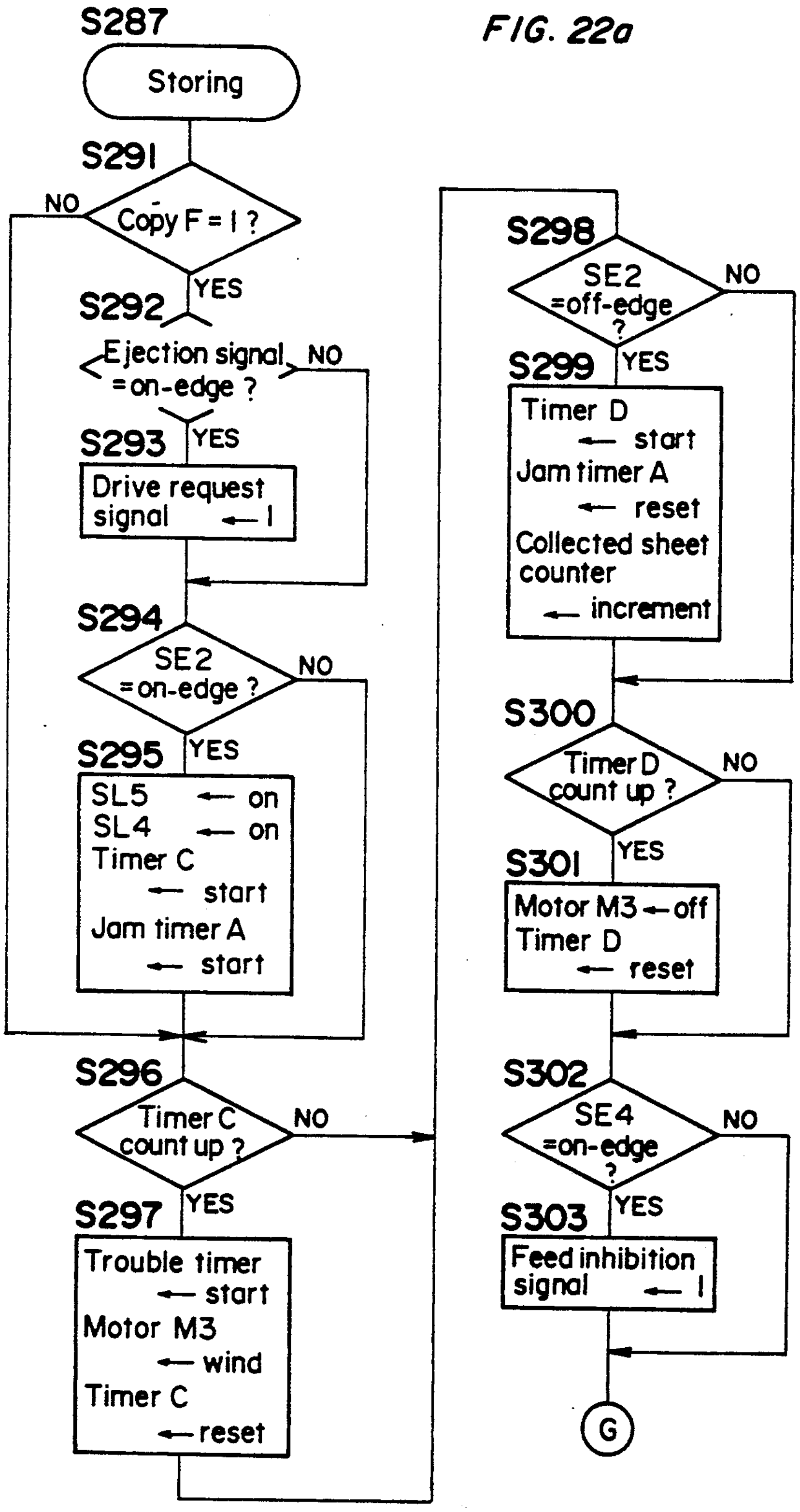
FIGS. 22*a* and 22*b* are flowcharts showing a subroutine for storing copy sheets in the sheet collecting section.
Figure 22B:
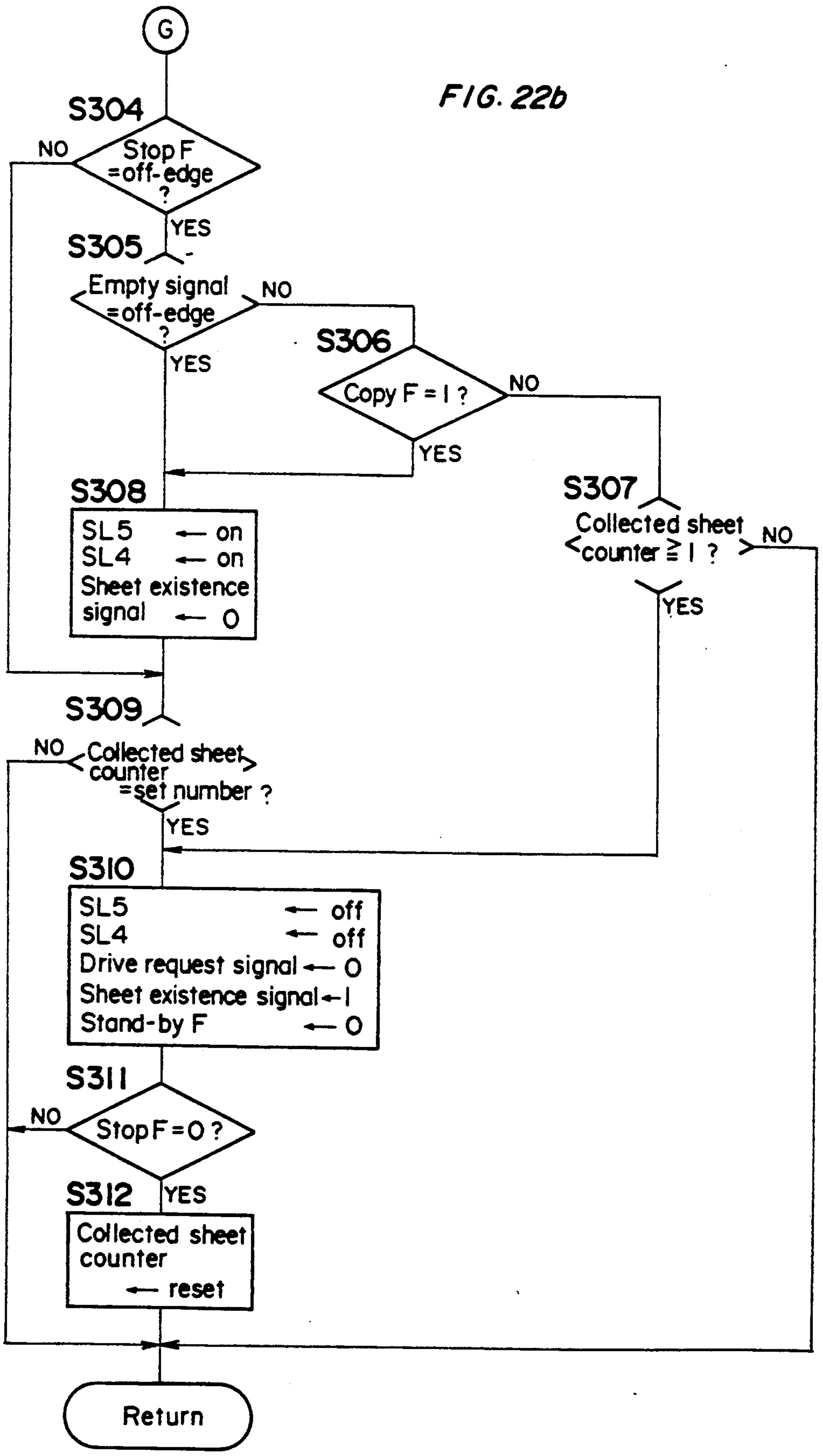
Figure 23A:
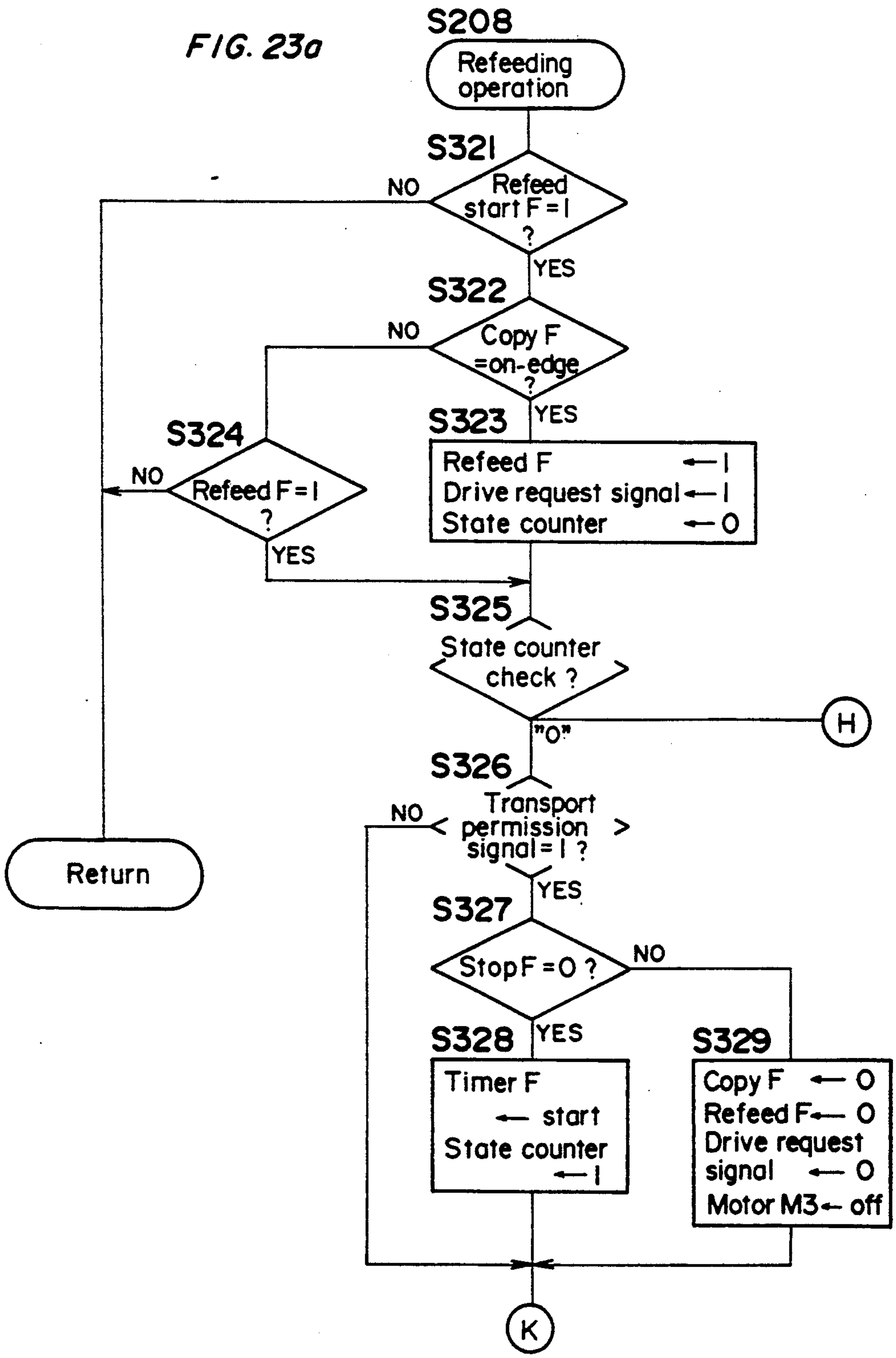
FIGS. 23*a*, 23*b*, 23*c* and 23*d* are flowcharts showing a subroutine for feeding copy sheets out of the sheet collecting section back to the copying machine.
Figure 23B:
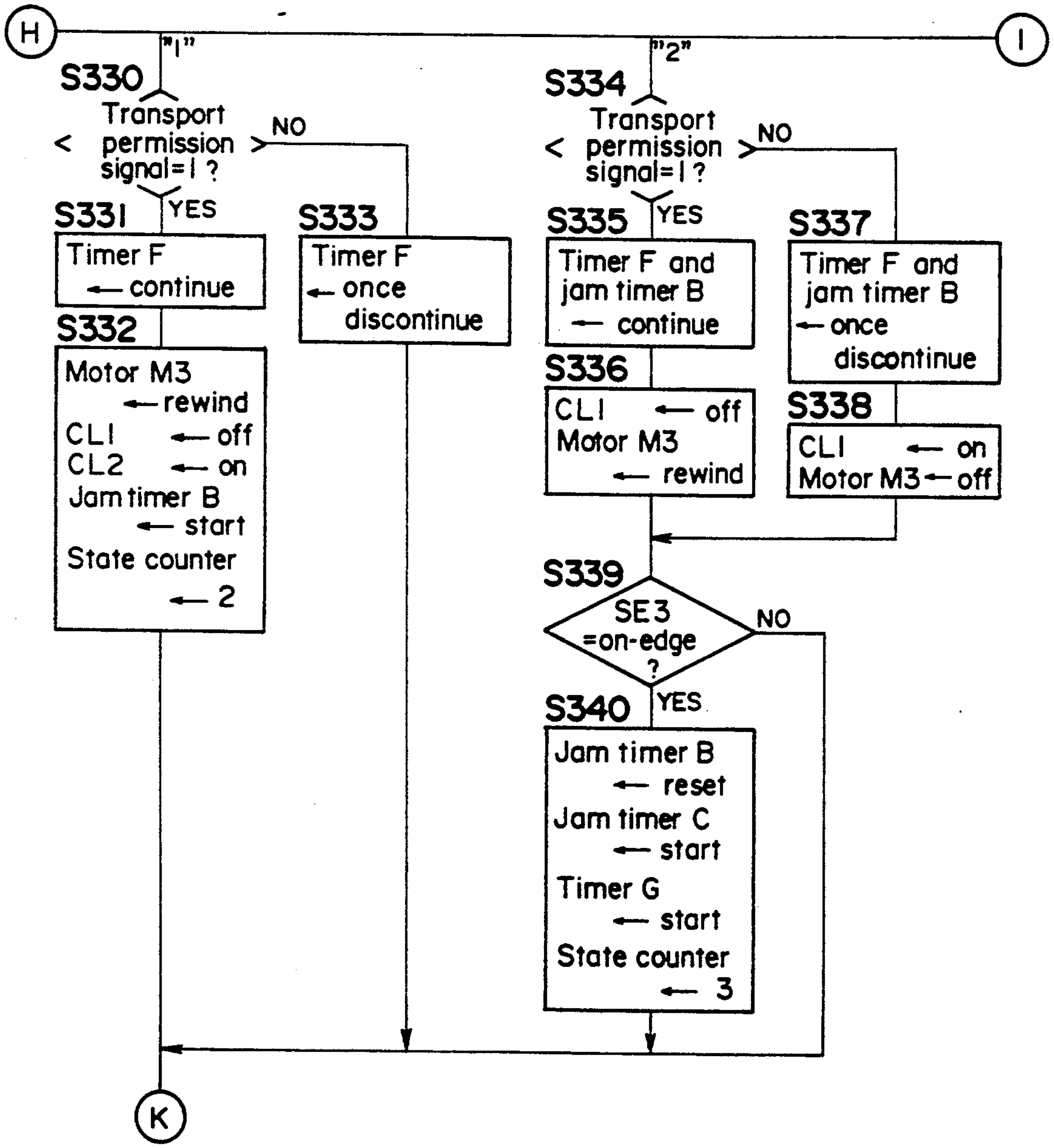
Figure 23C:
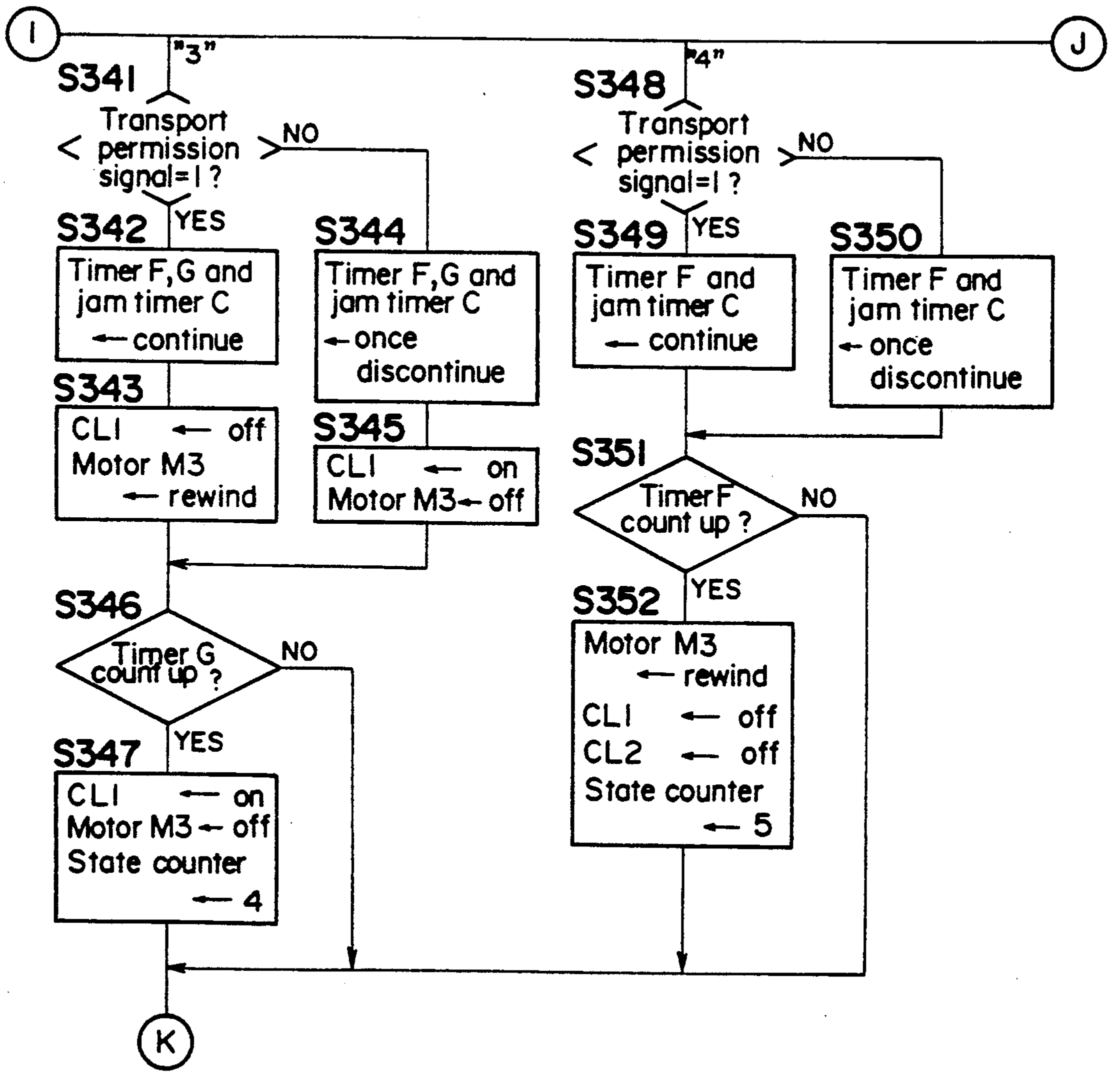
Figure 23D:
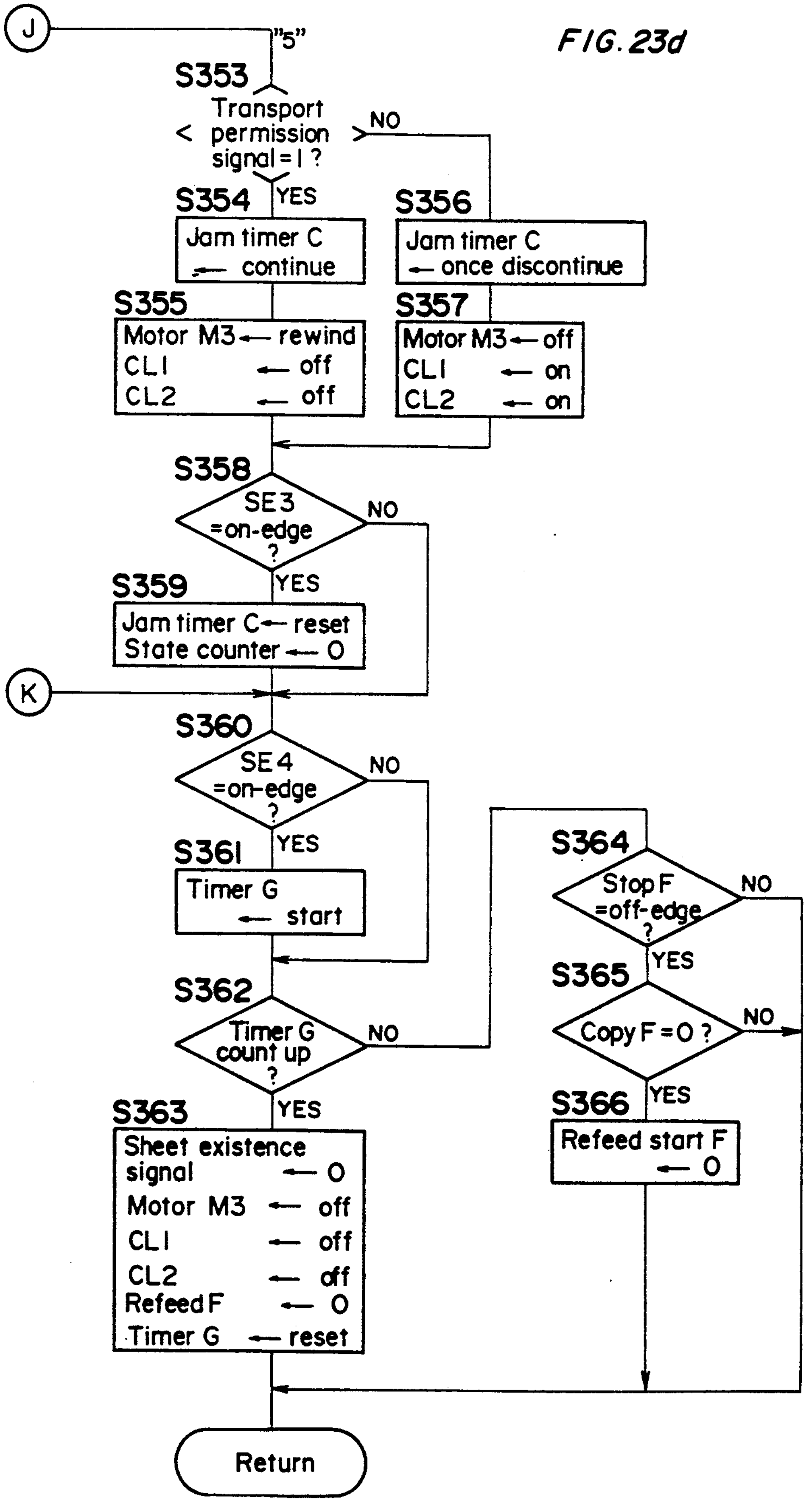

FIGS. 22*a* and 22*b* show a subroutine for storing copy sheets in the sheet collecting section 200, which is executed at step S287.

First, at step S291 the copy flag is checked whether "1" or not. When the flag is "0", the processing goes to step S296. When the copy flag is "1", at step S292 the copying machine ejection signal is checked whether on-edge or not. When the signal is on-edge, that is, when the leading edge of a copy sheet has reached the ejection portion of the copying machine 1, at step S293 the drive request signal is set to "1" Subsequently, when the on-edge of the sensor SE2 is confirmed at step S294, that is, when the leading edge of the copy sheet which was received by the sheet refeeding unit 100 and transported directly into the intermediate transport section 180 through the diverting member 125 has reached the detection point of the sensor SE2 (in a case of duplex copying), or when the leading edge of the copy sheet which was switchbacked by the ejection rollers 135 and 136, turned over and transported into the intermediate transport section 180 has reached the detection point of the sensor SE2 (in a case of composite copying), at step S295 the solenoids SL4 and SL5 are turned on, and a timer C for determining the timing of starting the motor M3 and the jam timer A are started. Thereby, the guide rollers 210 are rotated in the direction of the arrow (j), and the motor M3 gets ready for rotating the bobbin 230.

Next, when the completion of the timer C is confirmed at step S296, at step S297 the trouble timer for checking the condition of the motor M3 is started, the motor M3 is driven to wind the belt 240 around the bobbin 230, and the timer C is reset. Then, when the sensor SE2 is detected off-edge at step S298, that is, when the trailing edge of the sheet is detected by the sensor SE2, at step S299 a timer D for determining the timing of turning off the motor M3 is started, the jam timer A is reset, and a collected sheet counter gains an increment. The collected sheet counter counts the number of sheets collected in the sheet collecting section 200.

During these steps, a sheet is guided by the guide rollers 210, the pinch rollers 215 and 216, the belt 240 and the scraper 288, and rolled up around the bobbin 230 together with the belt 240. Thereafter, when the completion of the timer D is confirmed at step S300, at step S301 the motor M3 is turned off, and the timer D is reset. At step S302 the sensor SE4 is checked whether on edge or not. The on-edge of the sensor SE4 at step 302 means that the sensor SE4 has detected the end mark 243 of the belt 240, and accordingly when it is on-edge, it is judged that the belt 240 has been rolled up. Then, at step S303 the feed inhibition signal is set to "1" to inhibit the succeeding feed of copy sheets.

At step S304 the stop flag is checked whether off-edge or not, and at step 8305 the empty signal is checked whether off-edge or not. When the results are both "YES", which means the feed portion which was emptied of sheets has been supplied with copy sheets, at step S308 the solenoids SL4 and SL5 are turned on, the sheet existence signal is reset to "0", and the processing goes to step S309. When the empty signal is not off-edge, at step S306 the copy flag is checked whether "1" or not. When the flag is "1", it is judged that a copying operation was resumed after the stop/clear switch 63 was turned on once. So, the processing goes to step S308 and then to step S309. When the copy flag is "0", it is judged that the previous copying conditions were canceled, and at step S307 the value of the collected sheet counter is checked. When the value is "1" or more than "1", the processing goes through steps S310 and S311, and thereafter the collected sheet counter is reset to "0" at step S312. When it is checked that the value of the counter is "0" at step S307, this subroutine is completed immediately.

At step S309 when the value of the collected sheet counter becomes equal to the set number (the predetermined number of copies) during a copying operation of a first image, it is judged that the predetermined number of copy sheets have been placed in the bobbin 230. Accordingly, at step S310 the solenoids SL4 and SL5 are turned off, the drive request signal is reset to "0", the sheet existence signal is set to "1", and the stand-by flag is reset to "0". Further, when the stop flag is judged to be "0" at step S312, this subroutine is completed.

FIGS. 23*a*, 23*b*, 23*c* and 23*d* show a subroutine for feeding sheets out of the sheet collecting section 200 back to the copying machine 1, which is executed at step S208 in the main routine of the CPU 90.

First at step S321 the refeed start flag is checked whether "1" or not. When the flag is "0", this subroutine is completed immediately. When the refeed start flag is "1", at step S322 the copy flag is checked whether on-edge or not. When the flag is on-edge, at step S323 the refeed flag and the drive request flag are set to "1", a state counter is reset to "0". Then the processing goes to step S325. Once the processing goes through step S323, the refeed flag is checked at step S234, and so long as the refeed flag is "1", the processing goes to step S325. At step S325 the value of the state counter is checked, and according to the value, the motor M3, the clutches CL1 and CL2, etc. are controlled.

When the state counter is "0" (in the initial state), at step S326 the transport permission signal is checked whether "1" or not. When the signal is "0", the processing goes to step S360. When the transport permission signal is "1", at step S327 the stop flag is checked whether "0" or not. A refeeding operation is prepared only when the stop flag is "0". As the preparation for the refeeding operation, at step S328 a timer F for determining the intervals among sheets to be fed is started, and the state counter is set to "1". When the stop flag is "1", at step S329 the copy flag, the refeed flag, and the drive request flag are reset to "0" and the motor M3 is turned off to discontinue the refeeding operation.

When the value of the state counter is "1", at step S330 the transport permission signal is checked "1" or not. When the signal is "1", at step S331 the timer F continues counting, and at step S332 the motor M3 is driven to rewind the belt 240 around the bobbin 235, the clutch CL1 is turned off, the clutch CL2 is turned on, a jam timer 8 for detection of the occurrence of a paper jam in the refeeding section 320 is started, and the state counter is set to "2". Thereby, the register rollers 330 and 331 are stopped rotating, and a sheet starts coming out of the bobbin 230 while the guide rollers 210 are rotated in the direction of the arrow (j'). When the transport permission signal is judged "0" at step S330, at step S333 the timer F discontinues counting once.

When the value of the state counter is "2", at step S334 the transport permission signal is checked whether "1" or not. When the signal is "1", at step S335 the timer F and the jam timer B continue counting, at step S336 the clutch CL1 is kept off and the rotation of the motor M3 for rewind of the belt 240 is continued, and the processing goes to step S339. When the transport permission signal is "0", at step S337 the counts of the timer F and the jam timer B are discontinued once, and at step S338 the clutch CL1 is turned on to stop the rotation of the guide rollers 210, and the motor M3 is turned off.

Then the processing goes to step S339. When the sensor SE3 is confirmed on-edge at step S339, that is, when the leading edge of a sheet fed out of the bobbin 230 has been detected by the sensor SE3, at step S340 the jam timer B is reset, and a jam timer C and a timer G for determining the size of a paper loop to be formed immediately before the register rollers 330 and 331 are started, and the state counter is set to "3".

When the value of the state counter is "3", at step S341 the transport permission signal is checked whether "1" or not. When the signal is "1", at step S342 the timers F and G and the jam timer C are kept on counting, and at step S343 the clutch CL1 is kept off, and the motor M3 is kept on rotating for rewind of the belt 240. Then the processing goes to step S346 When the transport permission signal is "0", at step S344 the counts of the timers F and G and the jam timer C are discontinued once, and at step S345 the clutch CL1 is turned on and the motor M3 is turned off. Then the processing goes to step S346. When the completion of the timer C is confirmed at step S346, at step S347 the clutch CL1 is turned on, the motor M3 is turned off, and the state counter is set to "4". Thereby the motion of the bobbin 230 for sheet feeding is discontinued, and the leading edge of a sheet is stuck into the nip portion of the register rollers 330 and 331, so that a paper loop is formed.

When the value of the state counter is "4", at step S348 the transport permission signal is checked whether "1" or not. When the signal is "1", at step S349 the timer F and the jam timer C are kept on counting, and the processing goes to step S351. When the transport permission signal is "0", at step S350 the timer F and the jam timer C are discontinued counting once, and the processing goes to step S351. Then when it is judged at step S351 that the timer F completes counting, at step S352 the motor M3 is resumed rotating for rewind of the belt 240, the clutches CL1 and CL2 are turned off, and the state counter is set to "5". Thereby the guide rollers 210 are driven to rotate in the direction of the arrow (j'), and simultaneously the register rollers 330 and 331 are driven to rotate, so that the sheet is fed out of the feeding section 320.

When the value of the state counter is "5", at step S353 the transport permission signal is checked whether "1" or not. When the signal is "1", at step S354 the jam timer C is kept on counting, and at step S355 the motor M3 is kept on rotating for rewind of the belt 240 and the clutches CL1 and CL2 are kept off. Then the processing goes to step S358. When the transport permission signal is "0", at step S356 the jam timer C is discontinued counting once, and at step S357 the motor M3 is turned off, and the clutches CL1 and CL2 are turned on. Then the processing goes to step S358. When the sensor SE3 is confirmed off-edge at step S358, that is, when the trailing edge of the sheet has been detected by the sensor SE3, at step S359 the jam timer C is reset, and the state counter is reset to "0". Thus, one sheet has been fed from the sheet collecting section 200 into the refeeding path 40 in the copying machine 1.

Next, at step S360 when the sensor SE4 is judged on-edge, that is, when the stand-by mark 242 has been detected by the sensor SE4, and accordingly it is judged that the belt 240 has been rewound and gets to the initial position, at step S361 the timer G is started. A sheet to be fed out of the sheet collecting section 200 at that time is the last sheet. At least a time required for the last sheet to pass through the nip portion of the register rollers 330 and 331 is set in the timer G. At step S362 it is checked whether or not the timer G completes counting When the timer G has not completed yet, or when the timer G is not in operation, at step S364 the stop flag is checked whether on-edge or not. When the flag is on-edge and further when the copy flag is judged "0" at step S365, at step S366 the refeed start flag is reset to "0". On the other hand, when the completion of the timer G is confirmed at step S362, at step S363 the sheet existence signal is reset to "0" the motor M3 and the clutches CL1 and CL2 are turned off, the refeed flag is reset to "0", and the timer G is reset. Thus, this subroutine is completed.

Figure 24A:
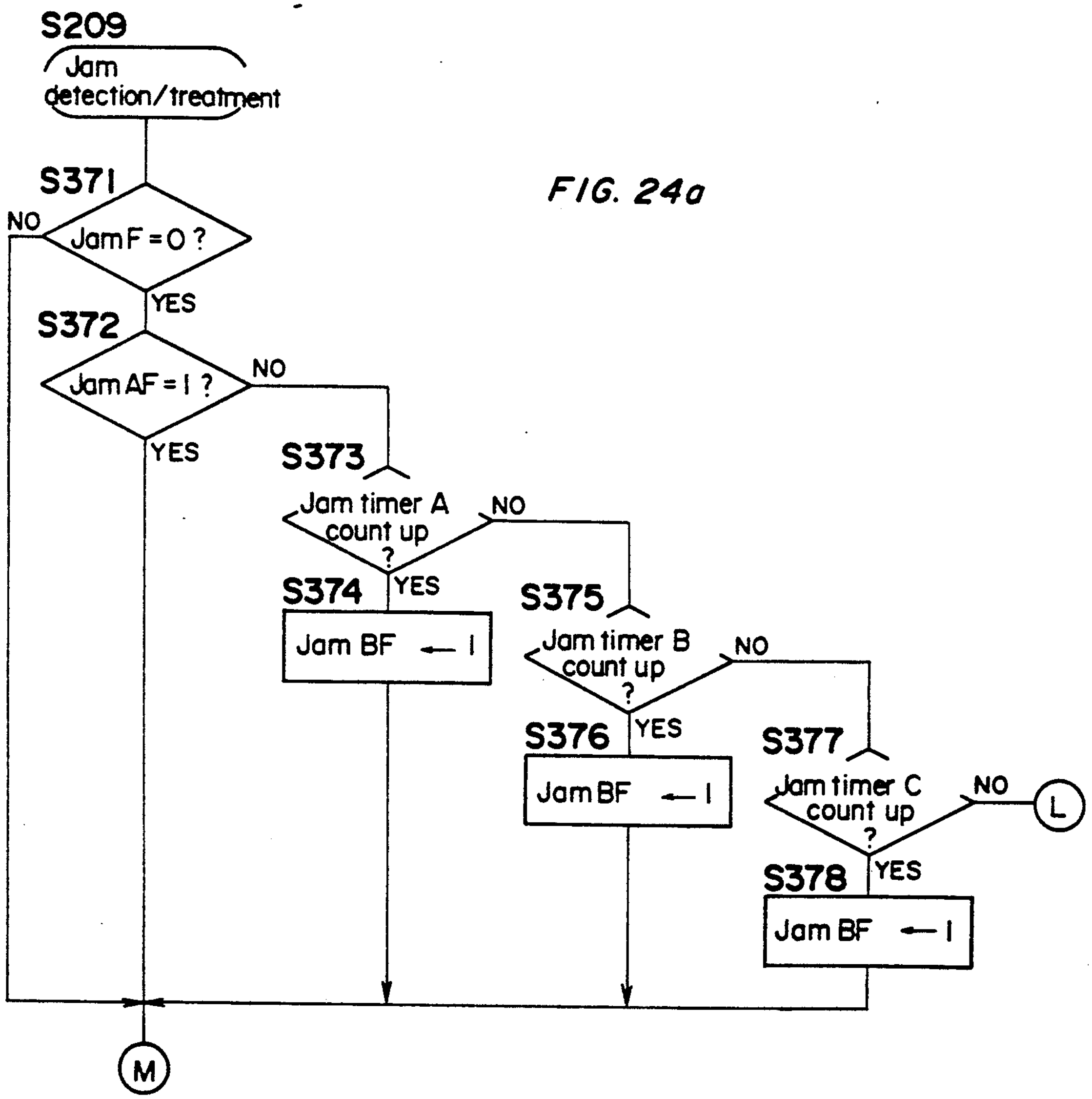
FIGS. 24*a* and 24*b* are flowcharts showing a subroutine for detecting and treating a paper jam.
Figure 24B:
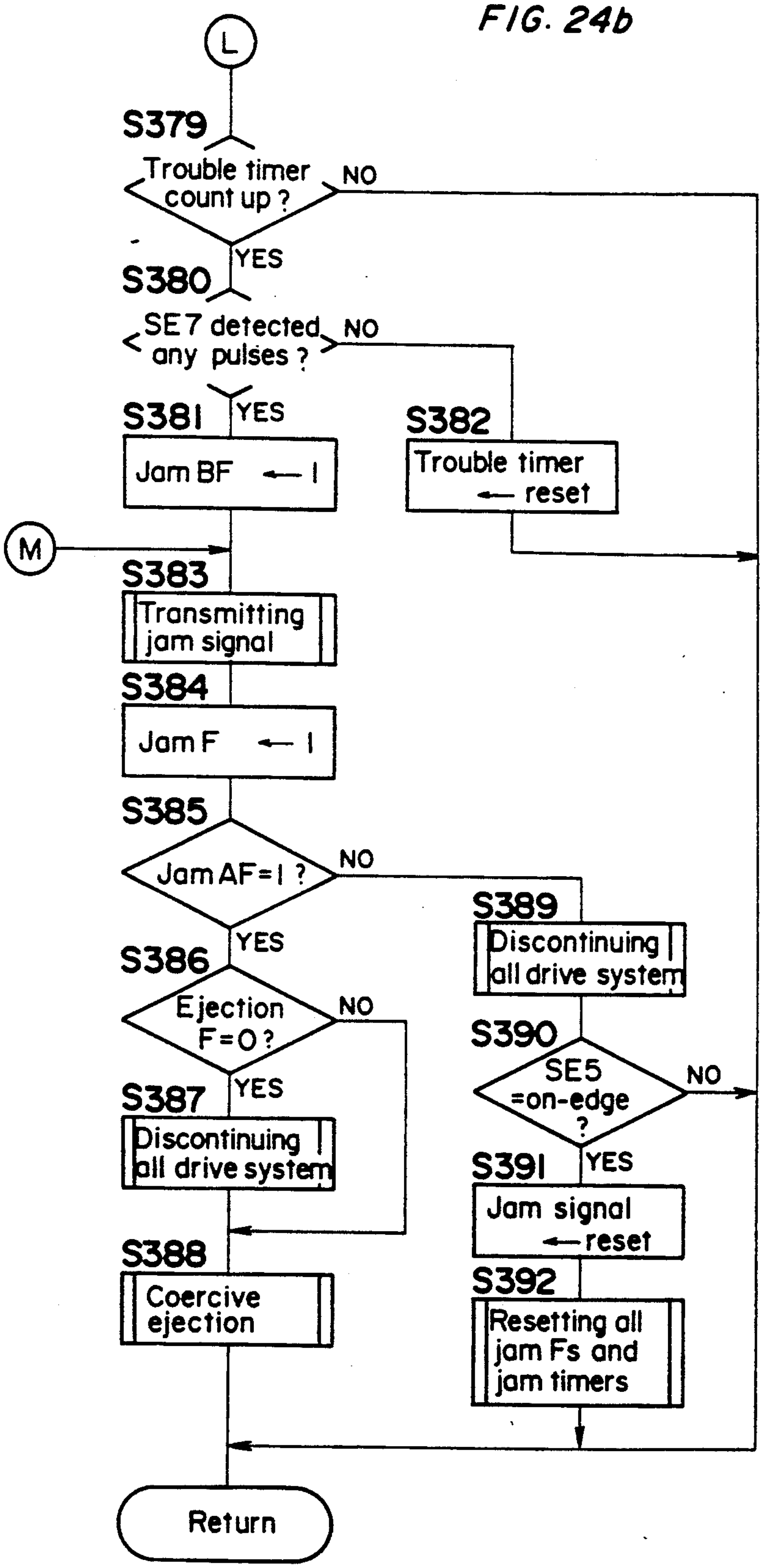

FIGS. 24*a* and 24*b* show the subroutine for detecting and treating a paper jam, which is executed at step S209 in the main routine of the CPU 90.

In this subroutine, when the occurrence of a paper jam in the sheet refeeding unit 100 is detected, an alarm is raised to order an operator to remove the jammed sheet, and after the jammed sheet is removed, all the devices are reset.

First at step S371 the jam flag is checked whether "0" or not. When the flag is "1", which means a paper jam has occurred, the processing goes to step S383 immediately. When the jam flag is "0", at step S372 the jam A flag is checked whether "1" or not. When the flag is "1", the processing goes to step S383. When the jam A flag is "0", the jam timers A, B and C are checked at steps S373, S375 and S377 respectively. When either one of the jam timers A, B and C completes counting, it is judged that a paper jam has occurred, and the jam B flag is set to "1" at either step S374, S376 or S378. Then the processing goes to step S383. Also, the trouble timer (refer to steps S227 and S229) is checked at step S379, and when the completion of the trouble timer is confirmed, it is checked at step S380 whether or not the sensor SE7 for monitoring the idle roller 246 has received any pulses. When it has received no pulses, it is judged that the motor M3 is not in a normal state. Therefore, at step S381 the jam B flag is set to "1", and the processing goes to step S383. On the other hand, when the sensor SE7 has received any pulse, at step S382 the trouble timer is reset, and this subroutine is completed.

At step S383 a jam signal is transmitted to the CPU 80, and thereafter the jam flag is set to "1" at step S384. The jam signal is received and handled by the CPU 80, so that the indication section 65 on the control panel 60 alarms a paper jam. Then, at step S385 the jam A flag is checked whether "1" or not. When the flag is "1", and further the ejection flag is judged "0" at step S386, at step S387 all the motions of the drive system are discontinued, and at step S388 the coercive ejection subroutine for ejecting sheets from the sheet collecting section 200 directly outside is called. Even when the jam A flag is judged "0" at step S385, at step S389 all the motions of the drive system are discontinued since the jam B flag is "1". In this moment, an operator needs to open the guide cover 201 and remove the jammed sheet. An open or closed state of the guide cover 201 is detected by the sensor SE5, and when the sensor SE5 is judged off-edge at step S390, it is judged that the guide cover 201 has come to a closed position after the jammed sheet was removed. Accordingly, the jam signal is reset at step S391. Further, at step S392 all the jam flags and the jam timers are reset, and this subroutine is completed.

Figure 25:
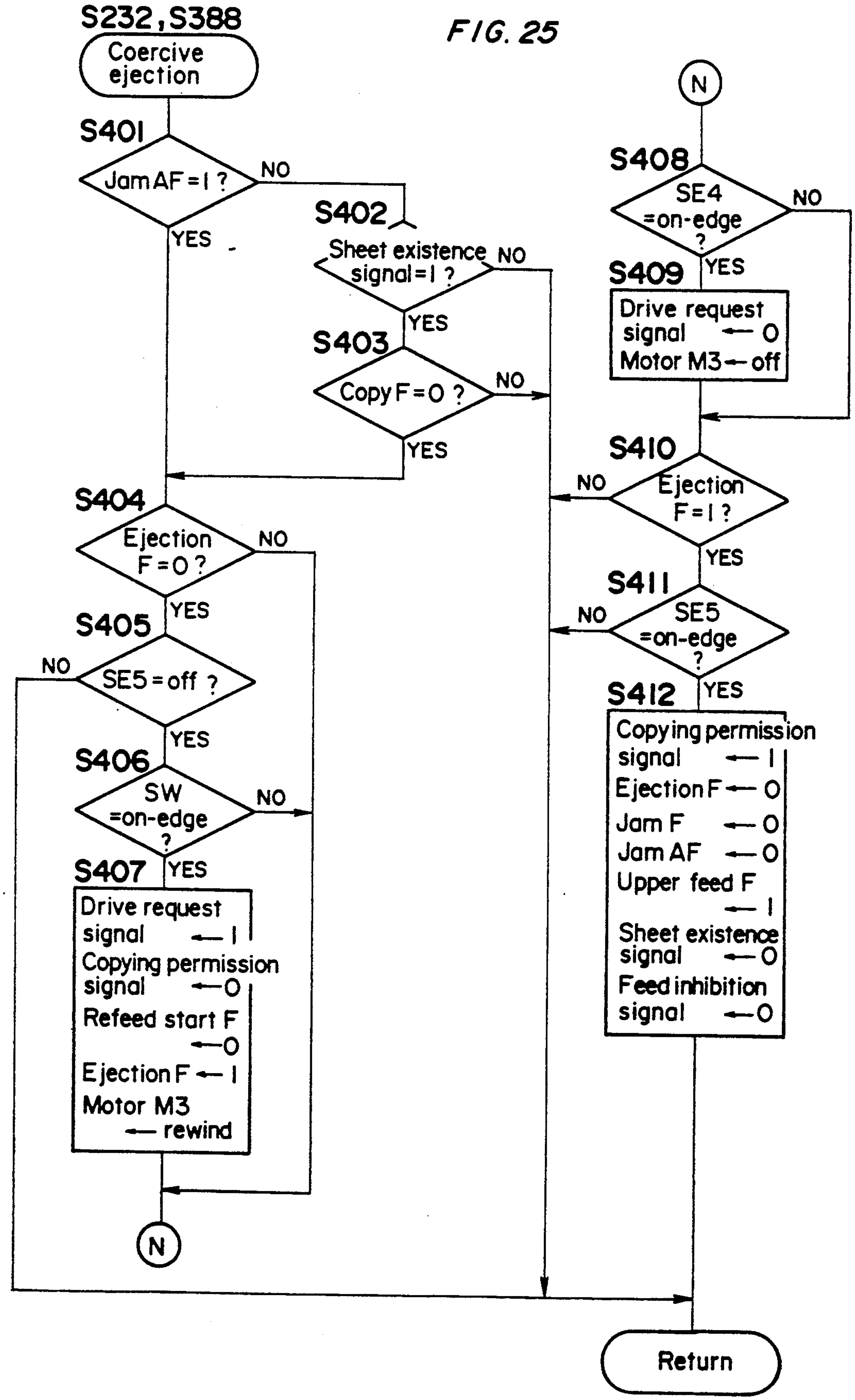
FIG. 25 is a flowchart showing a subroutine for performing coercive ejection of copy sheets.
Figure 26A:
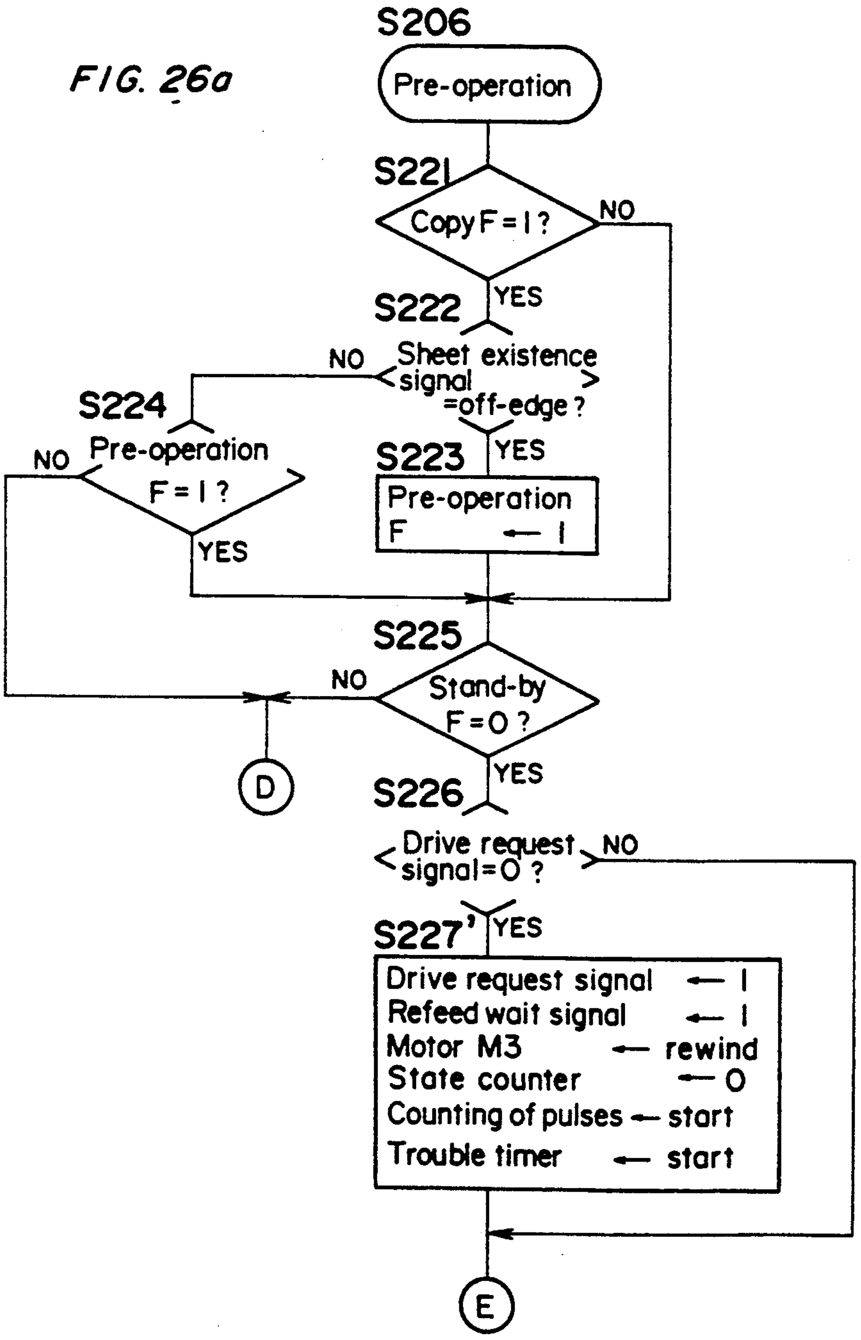
FIGS. 26*a* and 26*b* are flowcharts showing a subroutine for operating the sheet refeeding unit preliminary according to the second embodiment.
Figure 26B:
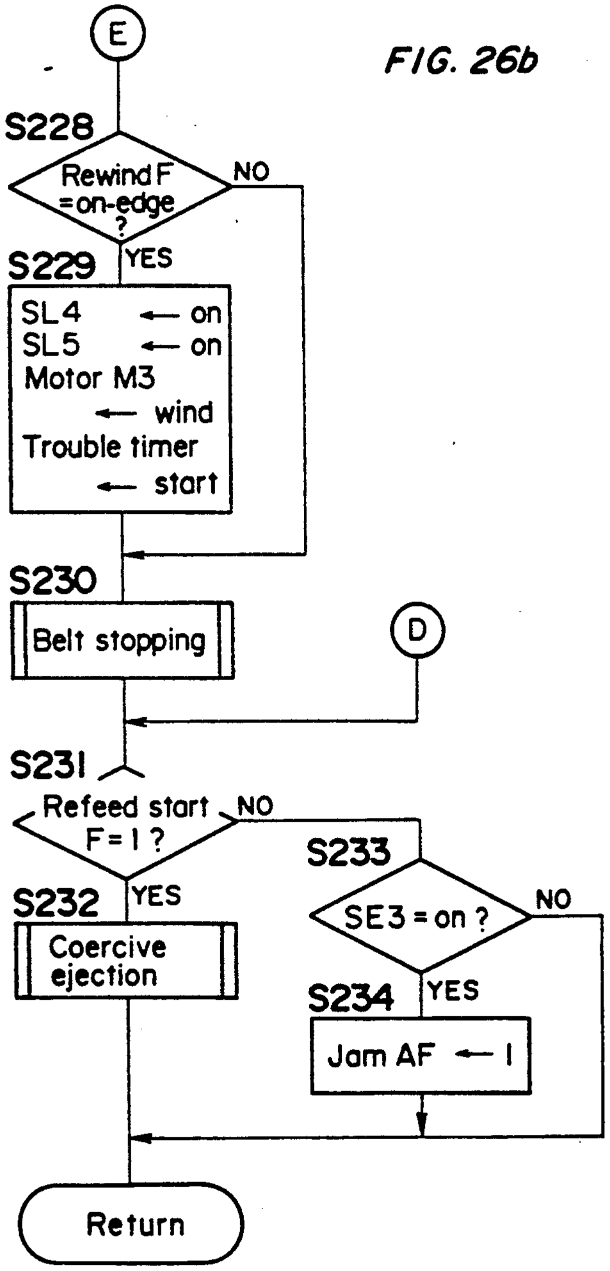
Figure 27A:
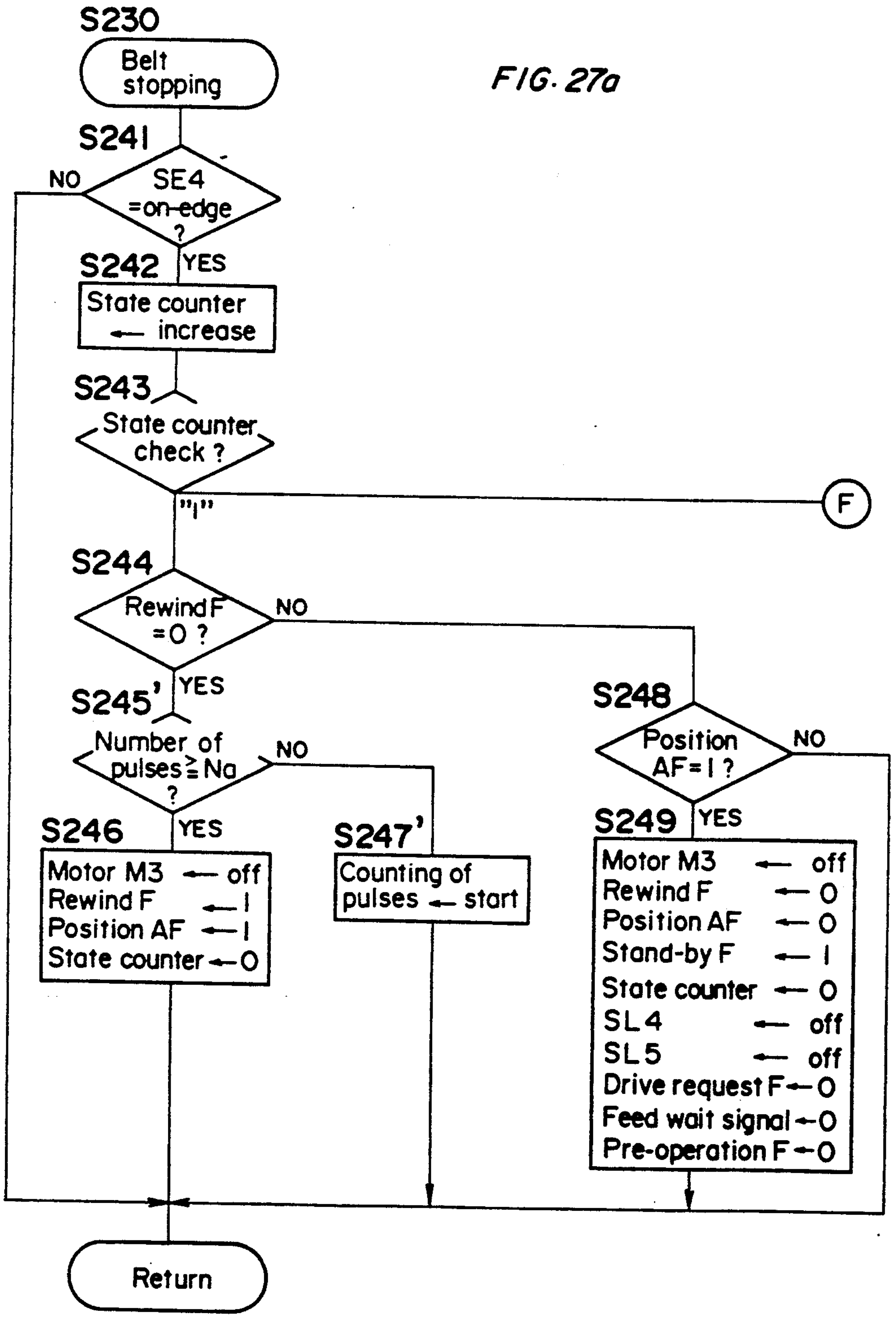
FIGS. 27*a* and 27*b* are flowcharts showing a subroutine for stopping the belt at the initial position according to the second embodiment.
Figure 27B:
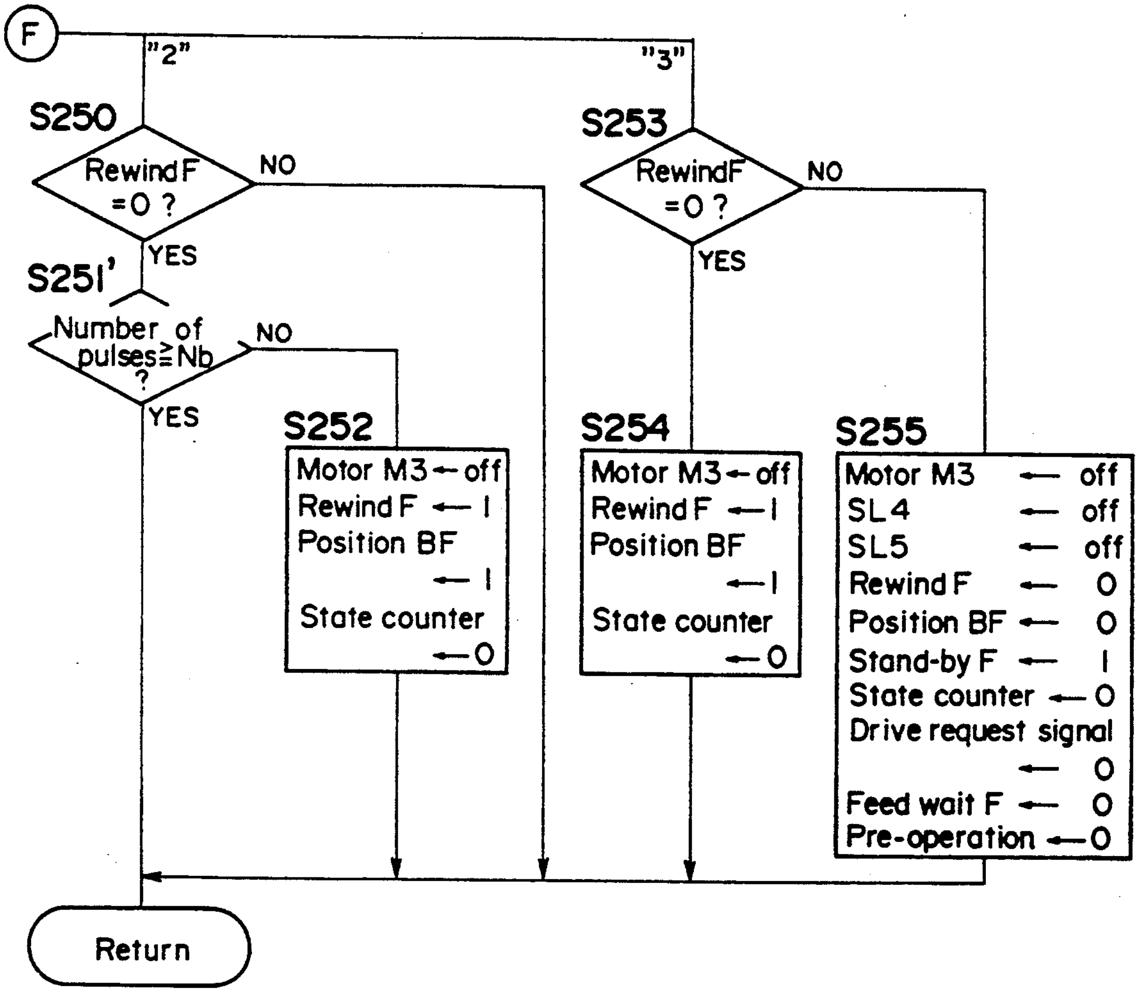

FIG. 25 shows the coercive ejection subroutine, which is called at step S232 in the pre-operation subroutine and at step S388 in the jam detection/treatment subroutine.

In this subroutine, in response to an opening motion of the guide cover 201 or a turning-on of the switch SW, sheets collected in the sheet collecting section 200 are ejected therefrom to the outside of the sheet refeeding unit 100 by rewinding the belt 240 from the bobbin 230.

First, the jam A flag, the sheet existence flag and the copy flag are checked at steps S401, S402 and S403 respectively. The coercive sheet ejection is performed when the jam flag is "1" or when the sheet existence flag and the copy flag are "1" and "0" respectively. In either one of the cases, at step S404 the ejection flag is checked whether "0" or not. When the flag is "0", the sensor SE5 is checked whether off or not at step S405, and the switch SW is checked whether on-edge or not at step S406. The sensor SE5 is turned off when the guide cover 201 comes into an open state. Therefore, if the sensor SE5 is not turned off, this subroutine is completed. The switch SW is operated by an operator, and when an on-edge of the switch SW is confirmed, at step S407 the drive request signal is set to "1", and the copying permission signal is reset to "0". Simultaneously, the refeed start flag is reset to "0", the ejection flag is set to "1", and the motor M3 is driven for rewind of the belt 240. Thereby sheets collected in the bobbin 230 are fed out thereof one after another, and as shown in FIG. 3 the sheets are guided by the guide rollers rotating in the direction of the arrow (j') and the pinch rollers 216 and received on the guide cover 201.

Next, the sensor SE4 is checked whether on-edge or not at step S408. When it is on edge, that is, when the stand-by mark 242 of the belt 240 has been detected by the sensor SE4, it is judged that the rewind of the belt 240 has been completed. Accordingly, at step S409 the drive request signal is reset to "0", and the motor M3 is turned off. Further, when the ejection flag is judged "1" at step S410, at step S411 the sensor SE5 is checked whether on-edge or not. When the guide cover 210 is closed, and accordingly an on-edge of the sensor SE5 is confirmed at step S411, at step S412 the copying permission signal is set to "1", the ejection flag and the jam A flag are reset to "0", the upper feed flag is set to "1", and the sheet existence signal and the feed inhibition flag are reset to "0". Then, this subroutine is completed.

Second Embodiment

In the above-described embodiment, the timers A and B are used for measuring the travel of the belt 240 in the pre-operation subroutine for returning the belt 240 to the initial position (refer to FIGS. 19*a* and 19*b*) and in the belt stop subroutine (refer to FIGS. 20*a* and 20*b*) which is executed at step S230 in the pre-operation subroutine. If the speed of the belt 240 is not fixed, the timers A and B may be replaced by the pulse signal (which corresponds to the travel of the belt 240) of the sensor SE7 which monitors the idle roller 246. Therefore, such a control procedure is herewith explained as a second embodiment. The control procedure in the second embodiment is basically the same as that shown in FIGS. 12 through 25, but the flowcharts shown in FIGS. 19*a*, 19*b*, 20*a* and 20*b* are replaced with flowcharts shown in FIGS. 26*a*, 26*b*, 27*a* and 27*b* respectively.

In this embodiment, the counting of pulses of the sensor SE7 is started at steps S227' and S247'. At step S245', the number of pulses is checked whether larger than a standard (Na), and at step S251', the number of pulses is checked whether larger than a standard (Nb). The standards (Na) and (Nb) are determined as follows.

$$Na \times P > L2 \tag{4}$$

$$Na \times P > Nb \times P > L1 \tag{5}$$

P:travel of the belt 240 per pulse

L1 intervals between the lines of the overrun mark 241

L2: distance between the stand-by mark 242 and the overrun mark 241

Although the present invention has been described in connection with the preferred embodiments thereof, it is to be noted that various changes and modifications are apparent to those who are skilled in the art. Such changes and modifications are to be understood as included within the scope of the present invention as defined by the appended claims, unless they depart therefrom.

What is claimed is:

1. An image forming apparatus comprising:

an image carrying member which rotates in a specified direction;

means for transferring an image held on the image carrying member onto a sheet;

sheet refeeding means which includes a belt laid between a first shaft and a second shaft to be wound and rewound around the shafts and drive means for rotating the first and the second shafts, wherein as the first shaft is rotated in the same direction as that of the rotation of the image carrying member for winding the belt around the first shaft, copy sheets onto which the image was transferred by the transferring means are wound around the first shaft, and as the belt is rewound around the second shaft, the copy sheets wound around the first shaft together with the belt are fed out from the first shaft for supplying the copy sheets to the transferring means again; and turn-over means for turning over a copy sheet onto which the image was transferred, the turn-over means turning over the copy sheet before the winding of the copy sheet around the first shaft.

2. An image forming apparatus as claimed in claim 1, further comprising means, which is disposed between the transferring means and the turn-over means, for diverting the travel of copy sheets selectively to guide sheets either to the turn-over means or directly to the sheet refeeding means without turning over the sheets.

3. A sheet refeeding apparatus to be attached to an image forming apparatus which includes an image carrying member rotating in a specified direction and means for transferring an image held on the image carrying member onto a sheet, wherein copy sheets ejected from the image forming apparatus are collected to be fed back to the image forming apparatus afterwards, the sheet refeeding apparatus comprising:

means for rolling up copy sheets ejected from the image forming apparatus one after another in the same direction as that of the rotation of the image carrying member and for feeding the sheets out thereof starting with the last rolled-up sheet;

means for turning over a copy sheet, which is disposed upstream of the sheet roll-up means; and means for setting the turn-over means for selectively performing a sheet turn-over operation or for not performing a sheet turn-over operation.

4. A method of forming an image by an image forming apparatus which includes an image carrying member rotating in a specified direction and means for transferring an image held on the image carrying member onto a sheet, the method comprising the steps of:

transferring a first image onto one side of a sheet by the transferring means;

turning over the sheet whose one side obtained the first image;

rolling up the turned-over sheets in the same direction as that of the rotation of the image carrying member one after another with sheet roll-up means;

feeding the rolled-up sheets out of the sheet roll-up means one after another, starting with the last rolled-up sheet; and transferring a second image onto the same side of each of the sheets by the transferring means.

5. A sheet refeeding apparatus for receiving copy sheets from an image forming apparatus to collect the sheets in a sheet collecting section and for feeding the sheets from the sheet collecting section back to the image forming apparatus, the sheet refeeding apparatus comprising:

sheet collecting means which includes a belt laid between a first shaft and a second shaft to be wound and rewound around the shafts and drive means for rotating the first and the second shafts, wherein as the belt is wound around the first shaft, copy sheets on which an image was formed in the image forming apparatus are wound around the first shaft, and as the belt is rewound around the second shaft, the copy sheets wound around the first shaft together with the belt are fed out from the first shaft for supplying the copy sheets to the image forming apparatus again;

a plurality of marks provided on the belt for recognizing the position of the belt;

means for detecting the marks on the belt;

means for measuring travel of the belt; and means for judging the position of the belt by comparing a signal from the belt mark detecting means with a signal from the belt travel measuring means.

6. A sheet refeeding apparatus as claimed in claim 5, further comprising means for controlling the drive means to stop the winding of the belt around the first shaft according to the result of the belt position judging means.

7. A sheet refeeding apparatus for receiving copy sheets from an image forming apparatus to collect the sheets in a sheet collecting section and for feeding the sheets from the sheet collecting section back to the image forming apparatus, the sheet refeeding apparatus comprising:

sheet collecting means which includes a belt laid between a first shaft and a second shaft to be wound and rewound around the shafts and drive means for rotating the first and the second shafts, wherein as the belt is wound around the first shaft, copy sheets on which an image was formed in the image forming apparatus are wound around the second shaft, the copy sheets wound around the first shaft together with the belt are fed out from the first shaft for supplying the copy sheets to the image forming apparatus again;

a plurality of marks provided on the belt for recognizing the position of the belt, said plurality of marks having different patterns;

means for detecting the marks on the belt; and means for judging the position of the belt from a signal generated from the belt mark detecting means.

8. A sheet refeeding apparatus for receiving copy sheets from an image forming apparatus to collect the sheets in a sheet collecting section and for feeding the sheets from the sheet collecting section back to the image forming apparatus, the sheet refeeding apparatus comprising:

sheet collecting means which includes a belt laid between a first shaft and a second shaft to be wound and rewound around the shafts and drive means for rotating the first and the second shafts, wherein as the belt is wound around the first shaft, copy sheets on which an image was formed in the image forming apparatus are wound around the first shaft, and as the belt is rewound around the second shaft, the copy sheets wound around the first shaft together with the belt are fed out from the first shaft for supplying the copy sheets to the image forming apparatus again;

an initial position mark provided on the belt;

means for judging the belt to be in the initial position where a sheet collecting operation is available by detecting the initial position mark on the belt; and means for controlling the drive means to rewind the belt to the initial position in response to a supply of power for the sheet refeeding apparatus.

9. A sheet refeeding apparatus for receiving copy sheets from an image forming apparatus to collect the sheets in a sheet collecting section and for feeding the sheets from the sheet collecting section back to the image forming apparatus, the sheet refeeding apparatus comprising:

sheet collecting means which includes a belt laid between a first shaft and a second shaft to be wound and rewound around the shafts and drive means for rotating the first and the second shafts, wherein as the belt is wound around the first shaft, copy sheets on which an image was formed in the image forming apparatus are wound around the first shaft, and as the belt is rewound around the second shaft, the copy sheets wound around the first shaft together with the belt are fed out from the first shaft for supplying the copy sheets to the image forming apparatus again;

an initial position mark provided on the belt;

means for judging the belt to be in the initial position where a sheet collecting operation is available by detecting the initial position mark on the belt; and means for controlling the drive means to rewind the belt to the initial position on the completion of a sheet refeeding operation.

10. A sheet refeeding apparatus for receiving copy sheets form an image forming apparatus to collect the sheets in a sheet collecting section and for feeding the sheets from the sheet collecting section back to the image forming apparatus, the sheet refeeding apparatus comprising:

sheet collecting means which includes a belt laid between a first shaft and a second shaft to be wound and rewound around the shafts and drive means for rotating the first and the second shafts, wherein as the belt is wound around the first shaft, copy sheets on which the image was formed in the image forming apparatus are wound around the first shaft, and as the belt is rewound around the second shaft, the copy sheets wound around the first shaft together with the belt are fed out from the first shaft for supplying the copy sheets to the image forming apparatus again;

an initial position mark provided on the belt;

means for judging the belt to be in the initial position where a sheet collecting operation is available by detecting the initial position mark on the belt;

means for detecting a sheet being fed out of the sheet collecting means;

means for controlling the drive means to rewind the belt to the initial position in response to a supply of power for the sheet refeeding apparatus; and means for judging that a paper jam has occurred when a sheet is detected by the sheet detecting means during rewind of the belt.

11. A sheet refeeding apparatus for receiving copy sheets from an image apparatus to collect the sheets in a sheet collecting section and for feeding the sheets from the sheet collecting section back to the image forming apparatus, the sheet refeeding apparatus comprising:

sheet collecting means which includes a belt laid between a first shaft and a second shaft to be wound and rewound around the shafts and drive means for rotating the first and the second shafts, wherein as the belt is wound around the first shaft, copy sheets on which an image was formed in the image forming apparatus are wound around the first shaft, and as the belt is rewound around the second shaft, the copy sheets wound around the first shaft together with the belt are fed out from the first shaft for supplying the copy sheets to the image forming apparatus again;

an initial position mark provided on the belt;

means for judging the belt to be in the initial position where a sheet collecting operation is available by detecting the initial position mark on the belt;

means for controlling the drive means to rewind the belt to the initial position in response to a supply of power for the sheet refeeding apparatus and to discontinue rewinding the belt when a sheet is detected by the detecting means during the rewind of the belt.

12. An image forming apparatus comprising:

means for forming an image on a sheet;

sheet refeeding means which includes a belt laid between a first shaft and a second shaft to be wound and rewound around the shafts and drive means for rotating the first and the second shafts, wherein as the belt is wound around the first shaft, copy sheets on which the image was formed by the image forming means are wound around the first shaft, and as the belt is rewound around the second shaft, the copy sheets wound around the first shaft together with the belt are fed out from the first shaft for supplying the copy sheets to the image forming means again;

an initial position mark provided on the belt;

means for judging the belt to be in the initial position where a sheet collecting operation is available by detecting the initial position mark on the belt;

means for detecting a sheet being fed out of the sheet collecting means;

means for controlling the drive means to rewind the belt to the initial position in response to a supply of power for the image forming apparatus and to discontinue rewinding the belt when a sheet is detected by the detecting means during the rewind of the belt; and means for indicating the occurrence of a paper jam when a sheet is detected by the detecting means during rewind of the belt.

13. A sheet refeeding apparatus for receiving copy sheets from an image forming apparatus to collect the sheets in a sheet collecting section and for feeding the sheets from the sheet collecting section back to the image forming apparatus, the sheet refeeding apparatus comprising:

sheet collecting means which includes a belt laid between a first shaft and a second shaft to be wound and rewound around the shafts and drive means for rotating the first and the second shafts, wherein as the belt is wound around the first shafts, copy sheets on which an image was formed in the image forming apparatus are wound around the first shaft, and as the belt is rewound around the second shaft, the copy sheets wound around the first shaft together with the belt are fed out from the first shaft for supplying the copy sheets to the image forming apparatus again;

a sheet ejection section for ejecting copy sheets being fed out of the sheet collecting means directly outside the sheet refeeding apparatus; and diverting means for guiding copy sheets being fed out of the sheet collecting means selectively to the sheet ejection section or to the image forming apparatus.

14. A sheet refeeding apparatus as claimed in claim 13, wherein the diverting means includes a cover member for covering a copy sheet path along which copy sheets are fed out of the sheet collecting means, which is capable of opening and closing, and, when the cover member is put in an open state to disclose the copy sheet path, copy sheets being fed out of the sheet collecting means are guided to the sheet ejection section.

15. A sheet refeeding apparatus as claimed in claim 13, further comprising:

means for requesting ejection of copy sheets from the sheet collecting means directly outside of the sheet refeeding apparatus; and means for controlling the drive means to feed copy sheets out of the sheet collecting means when the ejection request means is operated.

16. A sheet refeeding apparatus as claimed in claim 14, further comprising:

means for detecting that the cover member is in a closed state;

means for requesting ejection of copy sheets from the sheet collecting means directly outside of the sheet refeeding apparatus; and means for controlling the drive means to feed copy sheets out of the sheet collecting means when the ejection request means is operated, and not to feed copy sheets out of the sheet collecting means when the cover member is detected be in a closed state by the detecting means even if the ejection request means is operated.

17. A sheet refeeding apparatus as claimed in claim 14, further comprising:

means for requesting ejection of copy sheets from the sheet collecting means directly outside of the sheet refeeding apparatus, which is so disposed that the ejection request means is disclosed and becomes operable only when the cover member is put in an open state; and means for controlling the drive means to feed copy sheets out of the sheet collecting means when the ejection request means is operated.

18. A sheet refeeding apparatus for receiving copy sheets from an image forming apparatus to collect the sheets in a sheet collecting section and for feeding the sheets from the sheet collecting section back to the image forming apparatus, the sheet refeeding apparatus comprising:

sheet collecting means which includes a belt laid between a first shaft and a second shaft to be wound and rewound around the shafts and drive means for rotating the first and the second shafts, wherein as the belt is wound around the first shaft, copy sheets on which an image was formed in the image forming apparatus are wound around the first shaft, and as the belt is rewound around the second shaft, the copy sheets wound around the first shaft together with the belt are fed out from the first shaft for supplying the copy sheets to the image forming apparatus again;

a cover member for covering a copy sheet path along which copy sheets are fed out of the sheet collecting means, which is capable of opening and closing; and means for ejecting copy sheets form the sheet collecting means onto the cover member when the cover member is in an open state.

19. A sheet refeeding apparatus for receiving copy sheets from an image forming apparatus to collect the sheets in a sheet collecting section and for feeding the sheets from the sheet collecting section back to the image forming apparatus, the sheet refeeding apparatus comprising:

sheet collecting means which includes a belt laid between a first shaft and a second shaft to be wound and rewound around the shafts and drive means for rotating the first and the second shafts, wherein as the belt is wound around the first shaft, copy sheets on which an image was formed in the image forming apparatus are wound around the first shaft, the copy sheets wound around the first shaft together with the belt are fed out from the first shaft for supplying the copy sheets to the image forming apparatus again;

a cover member for covering a copy sheet path along which copy sheets are fed out of the sheet collecting means, which is capable of opening and closing;

means for detecting whether the cover member is in an open or closed state;

first control means for operating the sheet refeeding apparatus either in a refeeding mode wherein copy sheets are collected in the sheet collecting means and thereafter fed therefrom back to the image forming apparatus or in an ejection mode wherein copy sheets collected in the sheet collecting means are ejected therefrom outside of the sheet refeeding apparatus through an open place of the cover member without being fed to the image forming apparatus; and second control means for permitting a selection of the ejection mode and inhibiting a selection of the refeeding mode when the cover member is in an open state.

20. A sheet refeeding apparatus for receiving copy sheets from an image forming apparatus to collect the sheets in a sheet collecting section and for feeding the sheets from the sheet collecting section back to the image forming apparatus, the sheet refeeding apparatus comprising:

sheet collecting means which includes a belt laid between a first shaft and a second shaft to be wound and rewound around the shafts and drive means for rotating the first and the second shafts, wherein as the belt is wound around the first shaft, copy sheets on which an image was formed in the image forming apparatus are wound around the first shaft, and as the belt is rewound around the second shaft, the copy sheets wound around the first shaft together with the belt are fed out from the first shaft for supplying the copy sheets to the image forming apparatus again;

first control means for operating the sheet refeeding apparatus either in a refeeding mode wherein copy sheets collected in the sheet collecting means are fed therefrom back to the image forming apparatus or in a coercive ejection mode wherein copy sheets collected in the sheet collecting means are ejected outside of the sheet refeeding apparatus without subjecting the copy sheets to an image forming operation any more; and second control means for controlling the drive of the belt, when collecting copy sheets, to reduce the intervals among the copy sheets, when feeding copy sheets out of the sheet collecting means in the refeeding mode, to change the intervals among the copy sheets to a specified value, and when feeding copy sheets out of the sheet collecting means in the coercive ejection mode, to keep the intervals among the copy sheets as they were collected.

21. A sheet refeeding apparatus for receiving copy sheets from an image forming apparatus to collect the sheets in a sheet collecting section and for feeding the sheets from the sheet collecting section back to the image forming apparatus, the sheet refeeding apparatus comprising:

sheet collecting means which includes a belt laid between a first shaft and a second shaft to be wound and rewound around the shafts and drive means for rotating the first and the second shafts, wherein as the belt is wound around the first shaft, copy sheets on which an image was formed in the image forming apparatus are wound around the first shaft, and as the belt is rewound around the second shaft, the copy sheets wound around the first shaft together with the belt are fed out from the first shaft for supplying the copy sheets to the image forming apparatus again;

a sheet ejection section for ejecting copy sheets being fed out of the sheet collecting means from the sheet refeeding apparatus directly outside of the sheet refeeding apparatus;

diverting means for guiding copy sheets being fed out of the sheet collecting means selectively to the sheet ejection or to he image forming apparatus; and control means for operating the drive means intermittently when controlling copy sheets and refeeding copy sheets to the image forming apparatus, and for operating the drive means continuously when ejecting copy sheets outside of the sheet refeeding apparatus through the sheet ejecting section.

22. A sheet refeeding apparatus for receiving copy sheets from an image forming apparatus to collect the sheets in a sheet collecting section and for feeding the sheets from the sheet collecting section back to the image forming apparatus, the sheet refeeding apparatus comprising:

sheet collecting means which includes a belt laid between a first shaft and a second shaft to be wound and rewound around the shafts and drive means for rotating the first and the second shafts, wherein as the belt is wound around the first shaft, copy sheets on which an image was formed in the image forming apparatus are wound around the second shaft, the copy sheets wound around the first shaft together with the belt are fed out from the first shaft for supplying the copy sheets to the image forming apparatus again;

means for ejecting copy sheets collected in the sheet collecting means therefrom without subjecting the copy sheets to an image forming operation any more;

means for checking the existence of copy sheets in the sheet collecting means; and control means for inhibiting the operation of the ejection means when there are no copy sheets in the sheet collecting means.

23. A sheet refeeding apparatus as claimed in claim 22, the sheet existence checking means including:

a sensor for detecting a sheet exist in the sheet collecting means on a supply of power for the sheet refeeding apparatus;

a device for generating a paper jam signal when the sensor detects a sheet exist in the sheet collecting means; and a device for generating a sheet existence signal when a predetermined number of copy sheets have been collected in the sheet collecting means during an operation in a mode wherein copy sheets are collected in the sheet collecting means and thereafter fed therefrom to the image forming apparatus or when the mode is canceled before the predetermined number of copy sheets are collected therein, and for extinguishing the sheet existence signal when all the copy sheets have been fed out of the sheet collecting means, wherein the control means permits the operation of the ejection means when either the paper jam signal or the sheet existence signal is generated.

* * * * *

UNITED STATES PATENT AND TRADEMARK OFFICE
CERTIFICATE OF CORRECTION

PATENT NO. : 5,099,269 Page 1 of 7

DATED : March 24, 1992

INVENTOR(S) : Akiyoshi Johdai, et al.

It is certified that error appears in the above-identified patent and that said Letters Patent is hereby corrected as shown below:

In col. 1, line 25, change "have" to --has--.

In col. 2, line 49, change "an" to --a--.

In col. 3, line 8, change "falls" to --fall--.

In col. 3, line 26, before "composite", insert --duplex copying, and with its printed side outward in a case of--.

In col. 4, line 64, after "detected", insert --to--.

In col. 8, line 7, after "disposed", insert --.-- (period).

In col. 8, line 50, after "eraser lamp", insert --11--.

In col. 10, line 58, change "a" to --at--.

In col. 11, line 12, change "(i)" to --(f)--.

In col. 11, line 20, after "191", insert --.-- (period).

UNITED STATES PATENT AND TRADEMARK OFFICE

CERTIFICATE OF CORRECTION

PATENT NO. : 5,099,269

DATED : March 24, 1992

INVENTOR(S) : Akiyoshi Johdai, et al.

It is certified that error appears in the above-identified patent and that said Letters Patent is hereby corrected as shown below:

In col. 11, line 38, change "intermediate transport" to --Intermediate Transport--.

In col. 12, last line, delete "a".

In col. 13, line 50, after "bracket", delete "." (period).

In col. 14, line 50, change "pin" to --pins--.

In col. 15, line 2, after "outside", insert --,-- (comma).

In col. 16, line 24, change "In" to --in--.

In col. 17, line 27, change "3O2a" to --302a--.

In col. 18, line 15, change "are" to --is--.

In col. 18, line 56, change "scrape" to --scraper--.

In col. 19, line 7, change "sport" to --transport--.

In col. 21, line 53, change "LLD" to --LED--.

In col. 21, line 60, change "LFD" to --LED--.

UNITED STATES PATENT AND TRADEMARK OFFICE

CERTIFICATE OF CORRECTION

PATENT NO. : 5,099,269
DATED : March 24, 1992
INVENTOR(S) : Akiyoshi Johdai, et al.

It is certified that error appears in the above-identified patent and that said Letters Patent is hereby corrected as shown below:

In col. 22, line 10, after "PS2", insert --,-- (comma).

In col. 23, line 35, move the heading "Duplex Mode Flag" to begin at the left margin of the column, and indented.

In col. 24, line 52, after "S249", insert --.-- (period).

In col. 25, line 14, after "etc", insert --.-- (period).

In col. 25, line 48, change "84" to --S4--.

In col. 25, line 58, before "the LEDs", insert --,-- (comma).

In col. 26, line 30, after "alternatively", insert --.-- (period).

In col. 26, line 67, after "S56", insert --.-- (period).

UNITED STATES PATENT AND TRADEMARK OFFICE
CERTIFICATE OF CORRECTION

PATENT NO. : 5,099,269

DATED : March 24, 1992

INVENTOR(S) : Akiyoshi Johdai, et al.

It is certified that error appears in the above-identified patent and that said Letters Patent is hereby corrected as shown below:

In col. 27, line 34, change "862" to --S62--.

In col. 27, line 52, after "start flag is", insert --checked whether "0" or not at step S73. When either of the--.

In col. 28, line 41, change "895" to --S95--.

In col. 28, line 63, change "discontinued" to --completed--.

In col. 29, line 49, after "CPU90", insert --.-- (period).

In col. 30, line 29, after "immediately", insert --.-- (period).

In col. 30, line 55, change "SL4" to --SE4--.

In col. 32, line 14, change "he" to --the--.

In col. 32, line 40, after "CPU90", insert --.-- (period).

UNITED STATES PATENT AND TRADEMARK OFFICE

CERTIFICATE OF CORRECTION

PATENT NO. : 5,099,269

DATED : March 24, 1992

INVENTOR(S) : Akiyoshi Johdai, et al.

It is certified that error appears in the above-identified patent and that said Letters Patent is hereby corrected as shown below:

In col. 33, line 6, before "Subsequently", insert --.-- (period).

In col. 33, line 51, change "8305" to --S305--.

In col. 34, line 50, change "8" to --B--.

In col. 35, line 15, after "S346", insert --.-- (period).

In col. 35, line 20, change "C" to --G--.

In col. 36, line 2, before "When", insert --.-- (period).

In col. 36, line 9, before "the motor", insert --,-- (comma).

In col. 37, line 40, change "210" to --201--.

In col. 38, line 12, after "L1", insert --:-- (colon).

In col. 39, line 65 (claim 7, line 14), before "second", insert --first shaft, and as the belt is rewound around the--.

CERTIFICATE OF CORRECTION

PATENT NO. : 5,099,269 Page 6 of 7

DATED : March 24, 1992

INVENTOR(S) : Akiyoshi Johdai, et al.

It is certified that error appears in the above-identified patent and that said Letters Patent is hereby corrected as shown below:

In col. 40, line 59 (claim 10, line 2), change "form" to --from--.

In col. 41, line 21 (claim 11, line 2), after "image", insert --forming--.

In col. 41, between lines 40 and 41 (claim 11, between lines 21 and 22), insert the following paragraph:

--means for detecting a sheet being fed out of the sheet collecting means; and--.

In col. 42, line 18 (claim 13, line 11), change "shafts" to --shaft--.

In col. 43, line 28 (claim 18, line 23), change "form" to --from--.

In col. 43, line 44 (claim 19, line 14), after "first shaft,", insert --and as the belt is wound around the second shaft,--.

UNITED STATES PATENT AND TRADEMARK OFFICE
CERTIFICATE OF CORRECTION

PATENT NO. : 5,099,269

DATED : March 24, 1992

INVENTOR(S) : Akiyoshi Johdai, et al.

It is certified that error appears in the above-identified patent and that said Letters Patent is hereby corrected as shown below:

In col. 44, line 59 (claim 21, line 25), change "he" to --the--.

In col. 44, line 62 (claim 21, line 28), change "controlling" to --collecting--.

In col. 45, line 15 (claim 22, line 14), before "second", insert --first shaft, and as the belt is rewound around the--.

In col. 46, line 6 (claim 23, line 3), change "exist" to --exists--.

In col. 46, line 10 (claim 23, line 7), change "exist" to --exists--.

Signed and Sealed this

Twenty-eighth Day of September, 1993

Attest:

BRUCE LEHMAN

Attesting Officer

Commissioner of Patents and Trademarks